US012669417B2

(12) United States Patent
Mastroianni et al.

(10) Patent No.: US 12,669,417 B2
(45) Date of Patent: Jun. 30, 2026

(54) METHOD FOR ASSAYING A MICRO-OBJECT WITHIN A MICROFLUIDIC DEVICE

(71) Applicant: Bruker Spatial Biology, Inc., Seattle, WA (US)

(72) Inventors: Alexander J. Mastroianni, Alameda, CA (US); Peyton Shieh, Emeryville, CA (US); Kellen C. Mobilia, Livermore, CA (US); Eric K. Sackmann, Berkeley, CA (US); Ke-Chih Lin, Richmond, CA (US); Or Gadish, Pinole, CA (US); Patrick N. Ingram, Emeryville, CA (US); Eric Chun-Jen Shiue, Westford, MA (US); Grayson Thomas Wawrzyn, Oakland, CA (US); Volker L. S. Kurz, Oakland, CA (US); Nathan J. Ver Heul, Oakland, CA (US); Randall D. Lowe, Jr., Emeryville, CA (US); Sara Tafoya, Hayward, CA (US)

(73) Assignee: Bruker Spatial Biology, Inc., Seattle, WA (US)

( * ) Notice: Subject to any disclaimer, the term of this patent is extended or adjusted under 35 U.S.C. 154(b) by 465 days.

(21) Appl. No.: 18/126,845

(22) Filed: Mar. 27, 2023

(65) Prior Publication Data

US 2023/0375447 A1 Nov. 23, 2023

Related U.S. Application Data

(60) Provisional application No. 63/324,391, filed on Mar. 28, 2022.

(51) Int. Cl.
*G01N 1/40* (2006.01)
*B01L 3/00* (2006.01)

(52) U.S. Cl.
CPC ...... *G01N 1/4077* (2013.01); *B01L 3/502746* (2013.01)

(58) Field of Classification Search
CPC ..... B01L 2200/0668; B01L 2300/0645; B01L 2300/0816; B01L 2300/0829;
(Continued)

(56) References Cited

U.S. PATENT DOCUMENTS 6,294,063 B1 9/2001 Becker et al.
6,387,707 B1 5/2002 Seul et al.
(Continued)

FOREIGN PATENT DOCUMENTS

CN 101275114 A 10/2008
EP 0421380 B1 12/1995
(Continued)

OTHER PUBLICATIONS

Beebe et al.; Functional hydrogel structures for autonomous flow control inside microfluidic channels; Nature.; 404(6778); pp. 588-590; Apr. 6, 2000.
(Continued)

*Primary Examiner* — Dirk R Bass
(74) *Attorney, Agent, or Firm* — Shay Glenn LLP

(57) ABSTRACT

The present disclosure relates to methods for assaying and controlling micro-objects in a microfluidic device. In situ-generated hydrogel barriers are provided for dividing a microfluidic chamber into areas where assaying a cell may be performed without interference from the presence of the cell itself.

22 Claims, 25 Drawing Sheets

(58) Field of Classification Search

CPC ..... B01L 2300/0864; B01L 2400/0424; B01L
3/502715; B01L 3/502746; B01L
3/502761; B01L 3/502792; G01N 1/4077

See application file for complete search history.

(56) References Cited

U.S. PATENT DOCUMENTS

| | | | |
|---|---|---|---|
| 6,408,878 B2 | 6/2002 | Unger et al. |
| 6,488,872 B1 | 12/2002 | Beebe et al. |
| 6,942,776 B2 | 9/2005 | Medoro |
| 6,958,132 B2 | 10/2005 | Chiou et al. |
| 7,090,759 B1 | 8/2006 | Seul |
| 7,442,339 B2 | 10/2008 | Sundararajan et al. |
| 7,790,631 B2 | 9/2010 | Sharma et al. |
| 7,956,339 B2 | 6/2011 | Ohta et al. |
| 8,581,167 B2 | 11/2013 | Lean et al. |
| 8,685,344 B2 | 4/2014 | Sudarsan et al. |
| 9,144,806 B2 | 9/2015 | Chen et al. |
| 9,239,328 B2 | 1/2016 | Chang et al. |
| 9,403,172 B2 | 8/2016 | Short et al. |
| 10,280,456 B2 | 5/2019 | Chang et al. |
| 10,723,988 B2 | 7/2020 | Lowe et al. |
| 11,007,520 B2 | 5/2021 | Lowe et al. |
| 2003/0008364 A1 | 1/2003 | Wang et al. |
| 2003/0017142 A1* | 1/2003 | Toner .................. A61M 1/3472 |
| | | 435/370 |
| 2003/0138819 A1 | 7/2003 | Gong et al. |
| 2003/0175947 A1 | 9/2003 | Liu et al. |
| 2004/0072278 A1 | 4/2004 | Chou et al. |
| 2004/0115838 A1 | 6/2004 | Quake et al. |
| 2004/0191789 A1 | 9/2004 | Manaresi et al. |
| 2004/0197905 A1 | 10/2004 | Hafeman |
| 2005/0112548 A1 | 5/2005 | Segawa et al. |
| 2005/0129581 A1 | 6/2005 | McBride et al. |
| 2005/0164402 A1 | 7/2005 | Belisle et al. |
| 2005/0175702 A1 | 8/2005 | Muller-Schulte |
| 2005/0175981 A1 | 8/2005 | Voldman et al. |
| 2005/0208465 A1 | 9/2005 | Arai et al. |
| 2005/0274456 A1 | 12/2005 | Roitman et al. |
| 2005/0274612 A1 | 12/2005 | Segawa et al. |
| 2006/0091015 A1 | 5/2006 | Lau |
| 2006/0154361 A1 | 7/2006 | Wikswo et al. |
| 2006/0194306 A1 | 8/2006 | Herr et al. |
| 2006/0237080 A1 | 10/2006 | Jon et al. |
| 2006/0240545 A1 | 10/2006 | Tomida et al. |
| 2006/0240548 A1 | 10/2006 | Deutsch et al. |
| 2006/0263612 A1 | 11/2006 | Chen et al. |
| 2007/0095669 A1 | 5/2007 | Lau et al. |
| 2007/0183934 A1 | 8/2007 | Diercks et al. |
| 2007/0242105 A1 | 10/2007 | Srinivasan et al. |
| 2007/0264481 A1 | 11/2007 | DeSimone et al. |
| 2007/0292941 A1 | 12/2007 | Handique et al. |
| 2008/0014575 A1 | 1/2008 | Nelson |
| 2008/0153134 A1 | 6/2008 | Wiyatno et al. |
| 2008/0193536 A1 | 8/2008 | Khademhosseini et al. |
| 2008/0223721 A1 | 9/2008 | Cohen et al. |
| 2008/0302732 A1 | 12/2008 | Soh et al. |
| 2009/0023608 A1 | 1/2009 | Hung et al. |
| 2009/0170186 A1 | 7/2009 | Wu et al. |
| 2010/0003666 A1 | 1/2010 | Lee et al. |
| 2010/0009335 A1 | 1/2010 | Joseph et al. |
| 2010/0052196 A1 | 3/2010 | Yasuda et al. |
| 2010/0068706 A1 | 3/2010 | Pourahmadi et al. |
| 2010/0151561 A1 | 6/2010 | Richter et al. |
| 2010/0261205 A1 | 10/2010 | Kakuta et al. |
| 2010/0263599 A1 | 10/2010 | Yanik et al. |
| 2010/0273681 A1 | 10/2010 | Cerrina et al. |
| 2010/0285490 A1 | 11/2010 | Dees et al. |
| 2011/0003325 A1 | 1/2011 | Durack |
| 2011/0053151 A1 | 3/2011 | Hansen et al. |
| 2011/0108422 A1 | 5/2011 | Heller et al. |
| 2011/0117634 A1 | 5/2011 | Halamish et al. |
| 2011/0143964 A1 | 6/2011 | Zhou et al. |
| 2011/0186165 A1 | 8/2011 | Borenstein et al. |
| 2011/0195527 A1 | 8/2011 | O'Neill et al. |

| | | | |
|---|---|---|---|
| 2011/0262906 A1 | 10/2011 | Dimov et al. |
| 2012/0009671 A1 | 1/2012 | Hansen et al. |
| 2012/0015347 A1 | 1/2012 | Singhal et al. |
| 2012/0024708 A1 | 2/2012 | Chiou et al. |
| 2012/0040843 A1 | 2/2012 | Ducree et al. |
| 2012/0118740 A1 | 5/2012 | Garcia et al. |
| 2012/0135235 A1 | 5/2012 | Bong et al. |
| 2012/0156675 A1 | 6/2012 | Lueerssen et al. |
| 2012/0208266 A1 | 8/2012 | Bookbinder et al. |
| 2012/0325665 A1 | 12/2012 | Chiou et al. |
| 2013/0059322 A1 | 3/2013 | Hung et al. |
| 2013/0115606 A1 | 5/2013 | Hansen et al. |
| 2013/0118905 A1 | 5/2013 | Morimoto et al. |
| 2013/0130232 A1 | 5/2013 | Weibel et al. |
| 2013/0146459 A1 | 6/2013 | Bazant et al. |
| 2013/0171628 A1 | 7/2013 | Di Carlo et al. |
| 2013/0190212 A1 | 7/2013 | Handique et al. |
| 2013/0204076 A1 | 8/2013 | Han et al. |
| 2013/0261021 A1 | 10/2013 | Bocchi et al. |
| 2013/0277218 A1 | 10/2013 | Mudrik et al. |
| 2013/0288065 A1 | 10/2013 | Chen et al. |
| 2014/0057311 A1 | 2/2014 | Kamm et al. |
| 2014/0116881 A1 | 5/2014 | Chapman et al. |
| 2014/0154703 A1 | 6/2014 | Skelley et al. |
| 2014/0154791 A1 | 6/2014 | North et al. |
| 2014/0299472 A1 | 10/2014 | Chang et al. |
| 2015/0018226 A1 | 1/2015 | Hansen et al. |
| 2015/0107995 A1 | 4/2015 | Sista et al. |
| 2015/0148264 A1 | 5/2015 | Esfandyapour et al. |
| 2015/0151298 A1 | 6/2015 | Hobbs et al. |
| 2015/0151307 A1 | 6/2015 | Breinlinger et al. |
| 2015/0165436 A1 | 6/2015 | Chapman et al. |
| 2015/0167043 A1 | 6/2015 | Goluch et al. |
| 2015/0306598 A1 | 10/2015 | Khandros et al. |
| 2015/0306599 A1 | 10/2015 | Khandros et al. |
| 2015/0352547 A1 | 12/2015 | Breinlinger et al. |
| 2016/0184821 A1 | 6/2016 | Hobbs et al. |
| 2016/0199837 A1 | 7/2016 | Breinlinger et al. |
| 2016/0222224 A1 | 8/2016 | Haag et al. |
| 2016/0252495 A1 | 9/2016 | Ricicova et al. |
| 2016/0257918 A1 | 9/2016 | Chapman et al. |
| 2016/0370266 A1 | 12/2016 | White et al. |
| 2017/0021366 A1 | 1/2017 | Chapman et al. |
| 2017/0165667 A1 | 6/2017 | Beaumont et al. |
| 2017/0184583 A1 | 6/2017 | Beaumont et al. |
| 2018/0298318 A1 | 10/2018 | Kurz et al. |
| 2019/0240665 A1 | 8/2019 | Lionberger et al. |

FOREIGN PATENT DOCUMENTS

| | | | |
|---|---|---|---|
| EP | 1065378 A2 | 1/2001 |
| EP | 2397224 A1 | 12/2011 |
| EP | 2647434 A1 | 10/2013 |
| JP | 2007108087 A | 4/2007 |
| JP | 2011000079 A | 1/2011 |
| JP | 2011101626 A | 5/2011 |
| KR | 20100008222 A | 1/2010 |
| WO | WO00/46595 A1 | 8/2000 |
| WO | WO01/46458 A1 | 6/2001 |
| WO | WO02/081183 A1 | 10/2002 |
| WO | WO02/088702 A2 | 11/2002 |
| WO | WO2004/061085 A2 | 7/2004 |
| WO | WO2005/007796 A2 | 1/2005 |
| WO | WO2005/040403 A1 | 5/2005 |
| WO | WO2005/095963 A2 | 10/2005 |
| WO | WO2005/100541 A2 | 10/2005 |
| WO | WO2006/117541 A1 | 11/2006 |
| WO | WO2007/074756 A1 | 7/2007 |
| WO | WO2007/092713 A2 | 8/2007 |
| WO | WO2008/119066 A1 | 10/2008 |
| WO | WO2008/131048 A2 | 10/2008 |
| WO | WO2009/061392 A1 | 5/2009 |
| WO | WO2010/115167 A2 | 10/2010 |
| WO | WO2010/147078 A1 | 12/2010 |
| WO | WO2012/037030 A2 | 3/2012 |
| WO | WO2012/072823 A1 | 6/2012 |
| WO | WO2013/003624 A2 | 1/2013 |
| WO | WO2013/019491 A1 | 2/2013 |
| WO | WO2013/130714 A1 | 9/2013 |

(56)                 References Cited

FOREIGN PATENT DOCUMENTS

WO        WO2014/070873  A1      5/2014
WO        WO2015/061462  A1      4/2015
WO        WO2015/061497  A1      4/2015
WO        WO2015/061506  A1      4/2015
WO        WO2015/095623  A1      6/2015
WO        WO2015/164846  A1     10/2015
WO        WO2015/164847  A1     10/2015
WO        WO2015/188171  A1     12/2015
WO        WO2016/090295  A1      6/2016
WO        WO2017/100347  A1      6/2017
WO        WO2022/150659  A1      7/2022

OTHER PUBLICATIONS

Betre et al.; Characterization of a genetically engineered elastin-like polypeptide for cartilaginous tissue repair; Biomacromolecules; 3(5); pp. 910-916; Sep. 9, 2002.

Chen et al.; Microfluidic approaches for cancer cell detection, characterization, and separation; Lab on a Chip; 12(10); pp. 1753-1767; 2012 (the year of publication is sufficiently earlier than the effective U.S. filing date and any foreign priority date so that the particular month of publication is not an issue).

Chiou et al.; Massively Parallel Manipulation of Single Cells and Microparticles Using Optical Images; Nature; (436) pp. 370-372; Jul. 2005.

Chiou; Massively parallel optical manipulation of single cells, mirco-and nano-particles on optoelectronic devices; University of California at Berkeley; 147 pages; (Dissertation); 2005 (the year of publication is sufficiently earlier than the effective U.S. filing date and any foreign priority date so that the particular month of publication is not an issue).

Chow et al.; Peptide-based biopolymers in biomedicine and bio-technology; Materials Science and Engineering; 62(4); p. 125-155; Sep. 2008.

Chung et al., Imaging single-cell signaling dynamics with a deter-ministic high-density single-cell trap array; Anal.Chem.; 83(18); pp. 7044-7052; 14 pages (Author Manuscript); Aug. 23, 2011.

CN101275114A, Lou—Machine Translation, Oct. 1, 2008, 8 pages.

Di Carlo et al.; Dynamic single-cell analysis for quantitative biol-ogy; Analytical Chemistry; pp. 7918-7925; Dec. 2006.

Fairbanks et al.; Photoinitiated polymerization of PEG-diacrylate with lithium phenyl-2, 4, 6-trimethylbenzoylphosphinate: polymer-ization rate and cytocompatibility; Biomaterials; 30(35); pp. 6702-6707; Dec. 1, 2009.

Folk et al.; Hydrogel microvalves with short response time; In 226th American Chemical Society National Meeting; New York; 2003 (the year of publication is sufficiently earlier than the effective U.S. filing date and any foreign priority date so that the particular month of publication is not an issue).

Fuchs; Electronic sorting and recovery of single live cells from microlitre sized samples; Lab on a Chip; 6(1); pp. 121-126; 2006 (the year of publication is sufficiently earlier than the effective U.S. filing date and any foreign priority date so that the particular month of publication is not in issuee).

Gascoyne et al.; Dielectrophoretic separation of cancer cells from blood; IEEE transactions on industry applications; 33(3); pp. 670-678; May 1997.

Hsu et al.; Sorting Of Differentiated Neurons Using Phototransistor-Based Optoelectronic Tweezers for Cell Replacement Therapy of Neurodegenerative Diseases: Transducers 2009 Conf.; pp. 1598-1601: Jun. 2009.

Hulkower et al.; Cell migration and invasion assays as tools for drug discovery; Pharmaceutics; 3(1); pp. 107-124; Mar. 11, 2011.

Hung et al.; Continuous Perfusion Microfluidic Cell Culture Array for High-Throughput Cell-Based Assays; Biotech and Bioengineer-ing 89(1); pp. 1-8 ; Jan. 2005.

Iliescu et al.; Continuous field-flow separation of particle popula-tions in a dielectrophoretic chip with three dimensional electrodes; Applied Physics Letters 90(23); pp. 234104, 4pages; Jun. 2007.

Jamshidi et al.; Optoelectronic Manipulation, Assembly, and Pat-terning of Nanoparticles; Electrical Engineering and Computer Sciences; University of California at Berkeley; Dec. 10, 2009.

Jongpaiboonkit et al.; An adaptable hydrogel array format for 3-dimensional cell culture and analysis; Biomaterials; 29(23); pp. 3346-3356; Aug. 1, 2008.

JP2007108087A_Sugiura, Machine Translation, Apr. 26, 2007, 8 pages.

JP2011000079A_Univ Tokyo Takeuchi—Machine Translation, Eng-lish Abstract.

JP2011101626A_Univ Kinki_Shiraihi machine translation.

Kim et al.; A practical guide to microfluidic perfusion culture of adherent mammalian cells; Lab on a Chip; 7(6); pp. 681-694; 2007 (the year of publication is sufficiently earlier than the effective U.S. filing date and any foreign priority date so that the particular month of publication is not an issue).

Kleparnik et al.; Recent advances in the development of single cell analysis—A review; Analytica Chimica Acta; vol. 800; pp. 12-21; Oct. 24, 2013.

KR20100008222A_Kyun (KIPO computer-generated English lan-guage translation), Jan. 5, 2010, 10 pages.

Lee et al.; Development of macroporous poly (ethylene glycol) hydrogel arrays within microfluidic channels; Biomacromolecules; 11(12); 3316-3324; Dec. 13, 2010.

Lee et al.; Microfluidic Chemostat and Turbidostat with Flow Rate, Oxygen, and Temperature Control for Dynamic Continuous Cul-ture; Lab Chip; 11(10); pp. 1730-1739, DOI: 10.1039/c11c20019d, 10 pages; (Author Manuscript); 2011 (the year of publication is sufficiently earlier than the effective U.S. filing date and any foreign priority date so that the particular month of publication is not in issue).

Lee et al.; Separation and sorting of cells in microsystems using physical principles; Journal of micromechanics and Microengineer-ing; 26(1); doi: 10.10880960.1317/26/1/013003; 15 pages; Dec. 2015.

Meng; A review of stimuli-responsive shape memory polymer composites; Polymer; 54(9); pp. 2199-2122; Apr. 19, 2013.

Nevill et al.; Integrated Microfluidic Cell Culture and Lysis on a Chip; Lab Chip; (12) pp. 1689-1695; Oct. 2007.

Papageorgiou et al.; Superior performance of multilayered fluoropolymer films in low voltage electrowetting; Journal of colloid and Interface Science; 368(1); pp. 592-598; 21 pages; (Author Manuscript); Feb. 2012.

Sajeesh et al.; Particle separation and sorting in microfluidic devices: a review; Microfluidics and nanofluidics; vol. 17; pp. 1-52; Jul. 2014.

Sochol et al.; Single-layer fdominof diodes via optofluidic lithog-raphy for ultra-low reynolds number applications; In 2013 IEEE 26th International Conference on Micro Electro Mechanical Sys-tems (MEMS;) IEEE; pp. 153-156; Jan. 20, 2013.

Somaweera et al.; "Generation of a Chemical Gradient Across an Array of 256 Cell Cultures in a Single Chip"; Analyst; 138(19); doi:10.1039/C3an00946g; 14 pgs.; (Author Manuscript); Oct. 2013.

Sun et al.; Alginate-based biomaterials for regenerative medicine applications; Materials; 6(4); pp. 1285-1309; Mar. 26, 2013.

Valley et al.; Optoelectronic Tweezers as a Tool for Parallel Single-Cell Manipulation and Stimulation; IEEE Trans Biomed Circuits Syst.; 3(6); pp. 424-431; Dec., 2009.

Vats et al.; Dynamic manipulation of hydrogels to control cell behavior: a review; Tissue Engineering Part B: Reviews; 19(6); pp. 455-469; Dec. 1, 2013.

WO2007/074756A1_Kakuta (English Abstract).

WO2010147078, University of Tokyo, Machine Translation, Dec. 23, 2010; 12 pages.

Xu et al.; Recent Trends in Dielectrophoresis; Informacije MIDEM; 40(4) pp. 253-262; Dec. 2010.

Yi et al.; Microfluidics Technology for Manipulation and Analysis of Biological Cells; Anal Chim Acta; (560) pp. 1-23; Feb. 2006.

Z REPORT_European Patent Office, International Report on Pat-entability by the the International Searching Authority for related PCT/US2016/063387, mailed Jun. 7, 2018, 13 pages.

(56)　　　　　　References Cited

OTHER PUBLICATIONS

Z REPORT_Euopean Patent Office, International Search Report by the the International Searching Authority for related PCT/US2016/063387, mailed Mar. 31, 2017, 7 pages.

Z REPORT_European Patent Office, Written Opinion by the the International Searching Authority for related PCT/US2016/063387, mailed May 29, 2018, 12 pages.

Z Report_Extended European Search Report for EP Patent Appln. No. 22181779.4 dated Nov. 16, 2022.

Z REPORT_International Preliminary Report on Patentability for International Application No. PCT/US2016/065426 issued Jun. 21, 2018, 12 pages.

Z Report_International Search Report and Written Opinion issued in International Application No. PCT/US2016/065426 mailed Feb. 16, 2017, 14 pages.

Z Report_International Search Report and Written Opinion issued in International Application No. PCT/US2016/065452 mailed Feb. 16, 2017.

Z REPORT_Office Action and Search Report issued in Corresponding Taiwanese Application No. 111106229, dated Mar. 17, 2022.

Z REPORT_Singapore Office Action issued Aug. 7, 2019 in Singapore Patent Application No. 11201804275T, 8 pages.

Zhang et al.; "Click" Chemistry-Based Surface Modification of poly(dimethylsiloxane) for Protein Separation in a Microfluidic Chip; Electrophoresis; 31(18); p. 3129-3136; Sep. 20, 2010.

Zhang et al.;Azide Functional Monolayers Grafted to a Germanium Surface Model Substrates for ATR-IR Studies of interfacial Click Reactions; Langmuir ; 28(1); pp. 486-493; Dec. 8, 2011.

Zhu; Bioactive modification of poly (ethylene glycol) hydrogels for tissue engineering; Biomaterials; 31(17); pp. 4639-4656; Jun. 1, 2010.

Zustiak et al.; Hydrolytically degradable poly (ethylene glycol) hydrogel scaffolds with tunable degradation and mechanical properties; Biomacromolecules; 11(5); pp. 1348-1357; May 10, 2010.

* cited by examiner

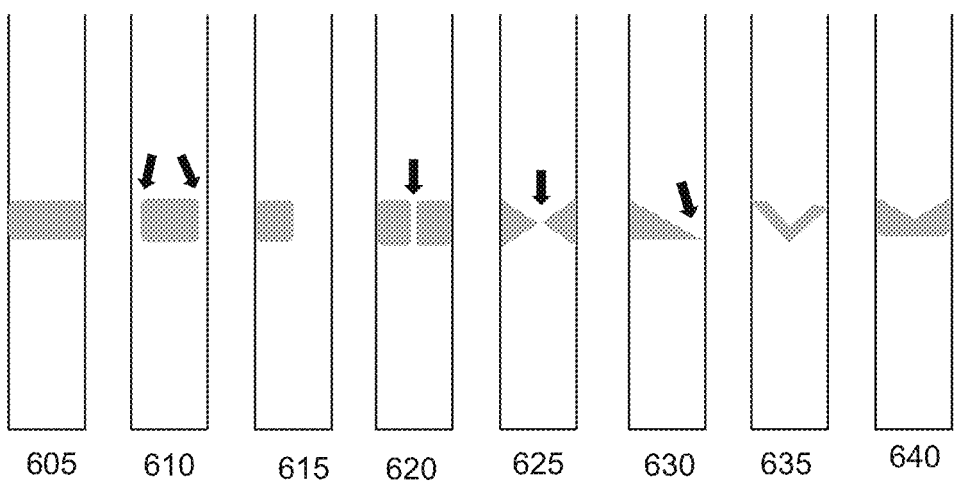
605    610    615    620    625    630    635    640
*FIG. 6A*
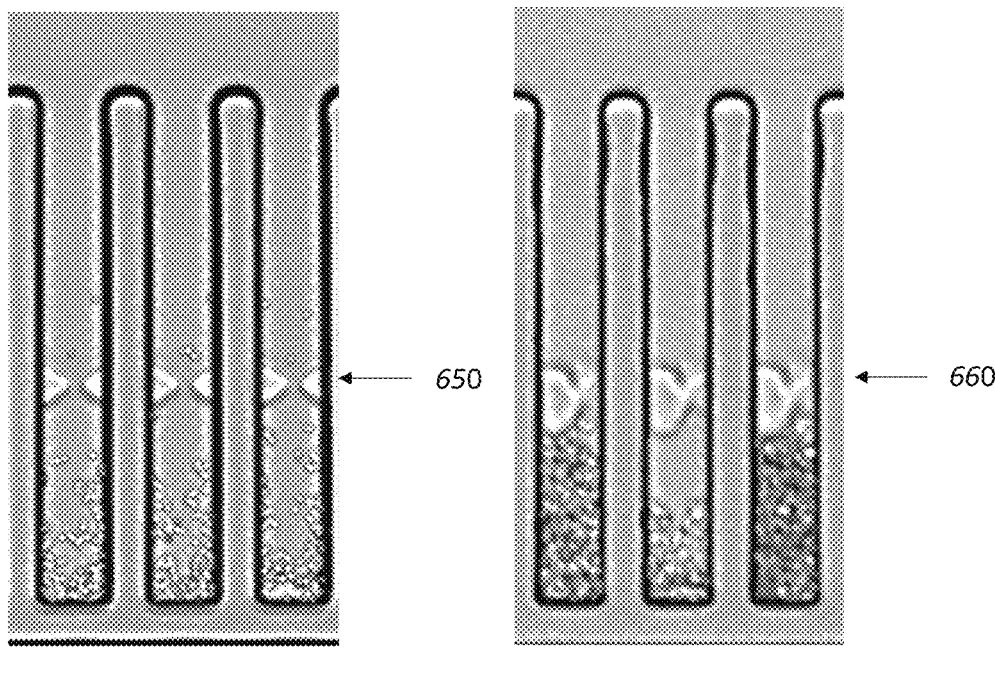
← 650    ← 660
*FIG. 6B*    *FIG. 6C*

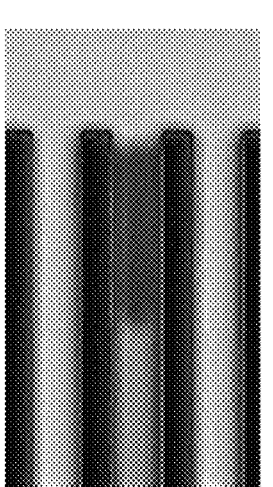        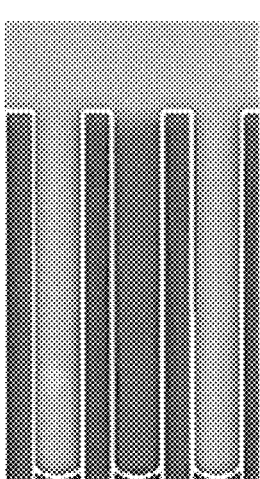
*FIG. 10A*          *FIG. 10B*

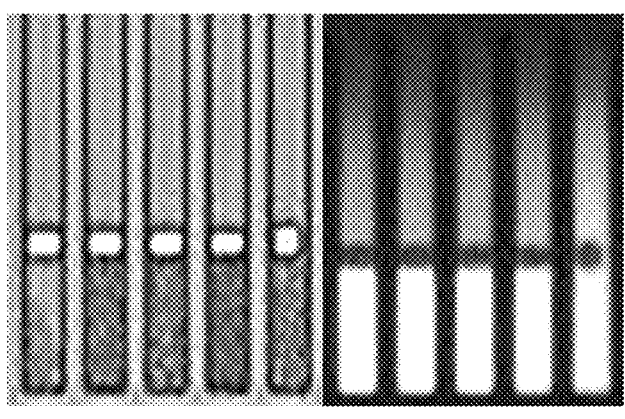
*FIG. 12A*        *FIG. 12D*
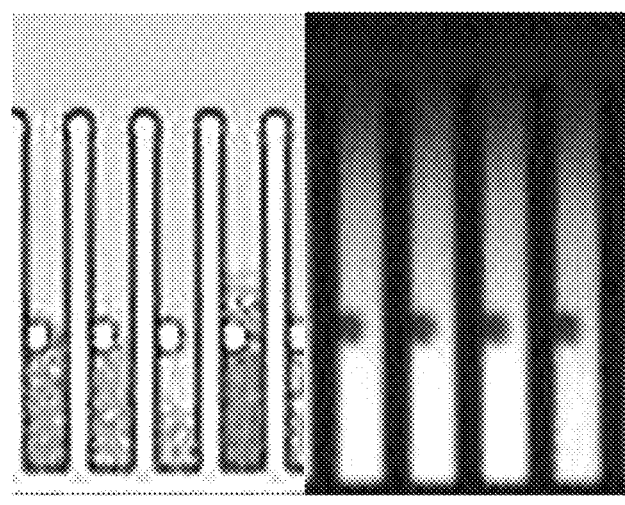
*FIG. 12B*        *FIG. 12E*
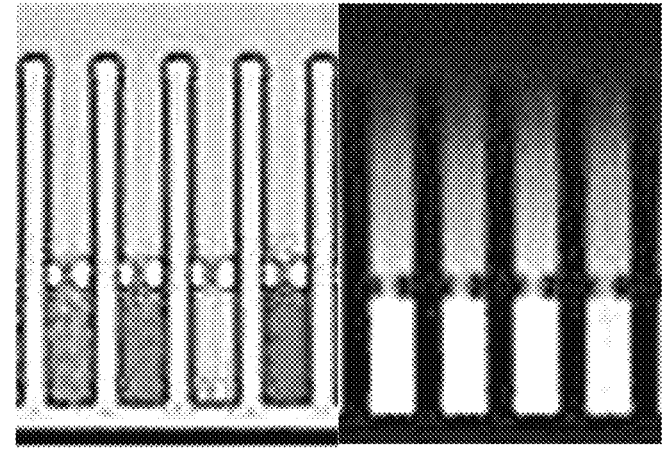
*FIG. 12C*        *FIG. 12F*

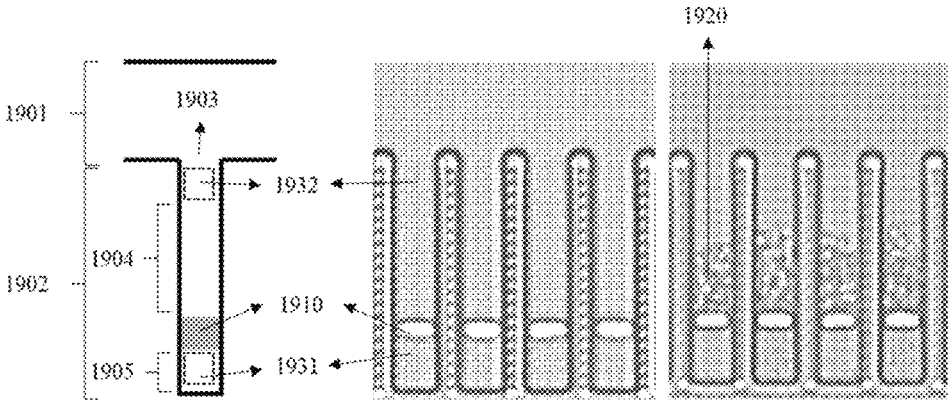
*FIG. 19A*    *FIG. 19B*    *FIG. 19C*
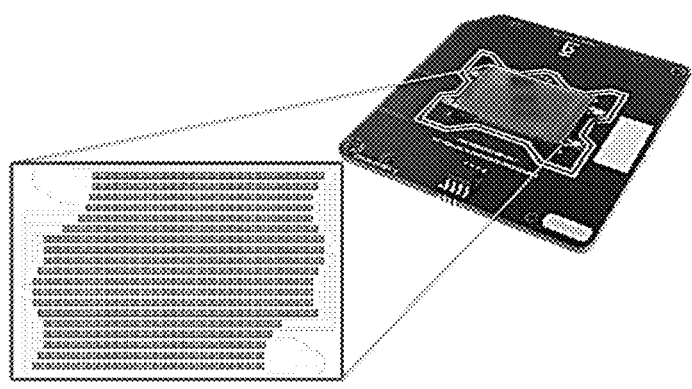
*FIG. 20A*

METHOD FOR ASSAYING A MICRO-OBJECT WITHIN A MICROFLUIDIC DEVICE

CROSS-REFERENCE TO RELATED APPLICATIONS

The present application claims the benefit of priority under 35 U.S.C. § 119(e) to U.S. Provisional Application No. 63/324,391, COMPOSITIONS FOR MICROFLUIDIC ASSAYS AND METHODS OF USE THEREOF, filed on Mar. 28, 2022, which is incorporated by reference in its entirety.

BACKGROUND OF THE INVENTION

Microfluidic devices allow researchers to manipulate and categorize micro-objects such as biological cells. The present disclosure relates to systems and methods for assaying and controlling micro-objects in a microfluidic device.

SUMMARY OF THE INVENTION

In a first aspect, a method for preparing a chamber of a microfluidic device to detect an analyte produced within the chamber is provided. The method comprises disposing a micro-object into the chamber of the microfluidic device, the microfluidic device having a microfluidic circuit comprising a flow region and the chamber, wherein the chamber comprises an opening to the flow region; forming an in situ-generated barrier within the chamber, wherein the in situ-generated barrier defines a first area of the chamber proximal to the opening of the chamber to the flow region and a second area of the chamber that is separated from the first area by the in situ-generated barrier; allowing the micro-object to produce the analyte; defining an area of interest within the first area or the second area; and detecting a signal associated with the analyte within the area of interest.

In another aspect, a method for preparing a chamber of a microfluidic device to export a micro-object selectively from the chamber is provided. The method comprises disposing individual micro-objects of a plurality of micro-objects into respective chambers of plurality of chambers of a microfluidic device, the microfluidic device having a microfluidic circuit comprising a flow region and the plurality of chambers, wherein each chamber comprises an opening to the flow region; identifying a micro-object of interest disposed in its respective chamber of the plurality of chambers; forming an in situ-generated hydrogel barrier across the opening of every other chamber of the plurality of chambers, thereby preventing other micro-objects contained in the other chambers from exiting their respective other chambers; and exporting the micro-object of interest out of its respective chamber.

BRIEF DESCRIPTION OF THE DRAWINGS

FIG. 6 is a graphical representation of hydrogel barriers according to some embodiments of the disclosure.

FIGS. 6B to 6C are photographic representations of hydrogel barriers according to some embodiments of the disclosure.

FIGS. 10A to 10B are photographic representations of fluorescent images of chambers with barriers with size-dependent permeability according to some embodiments of the disclosure.

FIGS. 12A to 12C are brightfield photographic representations of cells culturing according to some embodiments of the disclosure.

FIGS. 12D to 12F are photographic representations of fluorescent images of assays according to some embodiments of the disclosure.

FIG. 19A shows a schematic representation of a configuration of a microfluidic channel and a chamber having an in situ-generated barrier formed therewithin. The in situ-generated barrier defines a culture area and an assay area within the chamber. Two areas of interest are indicated as the two dotted rectangles.

FIG. 19B shows a brightfield image, corresponding to the configuration shown in FIG. 19A, before disposing a micro-object into the chamber.

FIG. 19C shows a brightfield image, corresponding to the configuration shown in FIG. 19A, after micro-objects are disposed and cultured within the chamber.

FIG. 20A illustrates an exterior appearance and an internal configuration of an example microfluidic chip described herein.

DETAILED DESCRIPTION OF THE INVENTION

Figure 1A:
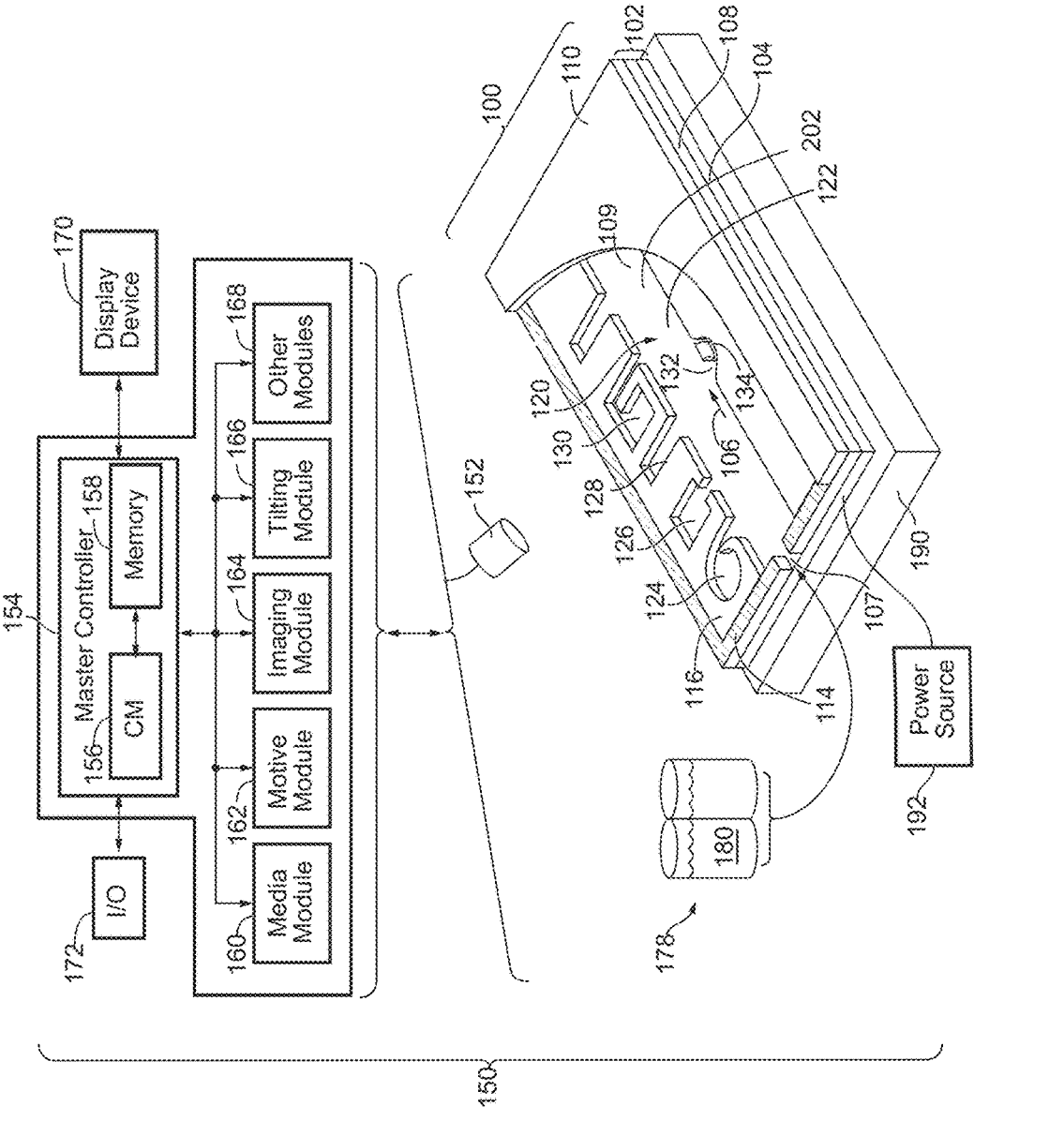
FIG. 1A illustrates a microfluidic device and a system with associated control equipment according to some embodiments of the disclosure.

This specification describes exemplary embodiments and applications of the disclosure. The disclosure, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," "connected to," "coupled to," or similar words are used herein, one element (e.g., a material, a layer, a substrate, etc.) can be "on," "attached to," "connected to," or "coupled to" another element regardless of whether the one element is directly on, attached to, connected to, or coupled to the other element or there are one or more intervening elements between the one element and the other element. Also, unless the context dictates otherwise, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements. Section divisions in the specification are for ease of review only and do not limit any combination of elements discussed.

Where dimensions of microfluidic features are described as having a width or an area, the dimension typically is described relative to an x-axial and/or y-axial dimension, both of which lie within a plane that is parallel to the substrate and/or cover of the microfluidic device. The height of a microfluidic feature may be described relative to a z-axial direction, which is perpendicular to a plane that is parallel to the substrate and/or cover of the microfluidic device. In some instances, a cross sectional area of a microfluidic feature, such as a channel or a passageway, may be in reference to a x-axial/z-axial, a y-axial/z-axial, or an x-axial/y-axial area.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

The term "ones" means more than one. As used herein, the term "plurality" can be 2, 3, 4, 5, 6, 7, 8, 9, 10, or more.

As used herein: μm means micrometer, $\mu m^3$ means cubic micrometer, pL means picoliter, nL means nanoliter, and μL (or uL) means microliter.

As used herein, "air" refers to the composition of gases predominating in the atmosphere of the earth. The four most plentiful gases are nitrogen (typically present at a concentration of about 78% by volume, e.g., in a range from about 70-80%), oxygen (typically present at about 20.95% by volume at sea level, e.g. in a range from about 10% to about 25%), argon (typically present at about 1.0% by volume, e.g. in a range from about 0.1% to about 3%), and carbon dioxide (typically present at about 0.04%, e.g., in a range from about 0.01% to about 0.07%). Air may have other trace gases such as methane, nitrous oxide or ozone, trace pollutants and organic materials such as pollen, diesel particulates and the like. Air may include water vapor (typically present at about 0.25% or may be present in a range from about 10 ppm to about 5% by volume). Air may be provided for use in culturing experiments as a filtered, controlled composition and may be conditioned as described herein.

As used herein, the term "disposed" encompasses within its meaning "located."

As used herein, a "microfluidic device" or "microfluidic apparatus" is a device that includes one or more discrete microfluidic circuits configured to hold a fluid, each microfluidic circuit comprised of fluidically interconnected circuit elements, including but not limited to region(s), flow path(s), channel(s), chamber(s), and/or pen(s), and at least one port configured to allow the fluid (and, optionally, micro-objects suspended in the fluid) to flow into and/or out of the microfluidic device. Typically, a microfluidic circuit of a microfluidic device will include a flow region, which may include a microfluidic channel, and at least one chamber, and will hold a volume of fluid of less than about 1 mL, e.g., less than about 750, 500, 250, 200, 150, 100, 75, 50, 25, 20, 15, 10, 9, 8, 7, 6, 5, 4, 3, or 2 microliters. In certain embodiments, the microfluidic circuit holds about 1-2, 1-3, 1-4, 1-5, 2-5, 2-8, 2-10, 2-12, 2-15, 2-20, 5-20, 5-30, 5-40, 5-50, 10-50, 10-75, 10-100, 20-100, 20-150, 20-200, 50-200, 50-250, or 50-300 μL. The microfluidic circuit may be configured to have a first end fluidically connected with a first port (e.g., an inlet) in the microfluidic device and a second end fluidically connected with a second port (e.g., an outlet) in the microfluidic device.

As used herein, a "nanofluidic device" or "nanofluidic apparatus" is a type of microfluidic device having a microfluidic circuit that contains at least one circuit element configured to hold a volume of fluid of less than about 1 μL, e.g., less than about 750, 500, 250, 200, 150, 100, 75, 50, 25, 20, 15, 10, 9, 8, 7, 6, 5, 4, 3, 2, 1 nL or less. A nanofluidic device may comprise a plurality of circuit elements (e.g., at least 2, 3, 4, 5, 6, 7, 8, 9, 10, 15, 20, 25, 50, 75, 100, 150, 200, 250, 300, 400, 500, 600, 700, 800, 900, 1000, 1500, 2000, 2500, 3000, 3500, 4000, 4500, 5000, 6000, 7000, 8000, 9000, 10,000, or more). In certain embodiments, one or more (e.g., all) of the at least one circuit elements is configured to hold a volume of fluid of about 100 pL to 1 nL, 100 pL to 2 nL, 100 pL to 5 nL, 250 pL to 2 nL, 250 pL to 5 nL, 250 pL to 10 nL, 500 pL to 5 nL, 500 pL to 10 nL, 500 pL to 15 nL, 750 pL to 10 nL, 750 pL to 15 nL, 750 pL to 20 nL, 1 to 10 nL, 1 to 15 nL, 1 to 20 nL, 1 to 25 nL, or 1 to 50 nL. In other embodiments, one or more (e.g., all) of the at least one circuit elements are configured to hold a volume of fluid of about 20 nL to 200 nL, 100 to 200 nL, 100 to 300 nL, 100 to 400 nL, 100 to 500 nL, 200 to 300 nL, 200 to 400 nL, 200 to 500 nL, 200 to 600 nL, 200 to 700 nL, 250 to 400 nL, 250 to 500 nL, 250 to 600 nL, or 250 to 750 nL.

A microfluidic device or a nanofluidic device may be referred to herein as a "microfluidic chip" or a "chip"; or "nanofluidic chip" or "chip".

A "microfluidic channel" or "flow channel" as used herein refers to flow region of a microfluidic device having a length that is significantly longer than both the horizontal and vertical dimensions. For example, the flow channel can be at least 5 times the length of either the horizontal or vertical dimension, e.g., at least 10 times the length, at least 25 times the length, at least 100 times the length, at least 200 times the length, at least 500 times the length, at least 1,000 times the length, at least 5,000 times the length, or longer. In some embodiments, the length of a flow channel is about 100,000 microns to about 500,000 microns, including any value therebetween. In some embodiments, the horizontal dimension is about 100 microns to about 1000 microns (e.g., about 150 to about 500 microns) and the vertical dimension is about 25 microns to about 200 microns, (e.g., from about 40 to about 150 microns). It is noted that a flow channel may have a variety of different spatial configurations in a microfluidic device, and thus is not restricted to a perfectly linear element. For example, a flow channel may be, or include one or more sections having, the following configurations: curve, bend, spiral, incline, decline, fork (e.g., multiple different flow paths), and any combination thereof. In addition, a flow channel may have different cross-sectional areas along its path, widening and constricting to provide a desired fluid flow therein. The flow channel may include valves, and the valves may be of any type known in the art of microfluidics. Examples of microfluidic channels that include valves are disclosed in U.S. Pat. Nos. 6,408,878 and 9,227,200, each of which is herein incorporated by reference in its entirety.

As used herein, the term "transparent" refers to a material which allows visible light to pass through without substantially altering the light as is passes through.

As used herein, "brightfield" illumination and/or image refers to white light illumination of the microfluidic field of view from a broad-spectrum light source, where contrast is formed by absorbance of light by objects in the field of view.

As used herein, "structured light" is projected light that is modulated to provide one or more illumination effects. A first illumination effect may be projected light illuminating a portion of a surface of a device without illuminating (or at least minimizing illumination of) an adjacent portion of the surface, e.g., a projected light pattern, as described more fully below, used to activate DEP forces within a DEP substrate. When using structured light patterns to activate DEP forces, the intensity, e.g., variation in duty cycle of a structured light modulator such as a DMD, may be used to change the optical power applied to the light activated DEP actuators, and thus change DEP force without changing the nominal voltage or frequency. Another illumination effect that may be produced by structured light includes projected light that may be corrected for surface irregularities and for irregularities associated with the light projection itself, e.g., fall-off at the edge of an illuminated field. Structured light is typically generated by a structured light modulator, such as a digital mirror device (DMD), a microshutter array system (MSA), a liquid crystal display (LCD), or the like. Illumination of a small area of the surface, e.g., a selected area of interest, with structured light improves the signal-to-noise-ratio (SNR), as illumination of only the selected area of interest reduces stray/scattered light, thereby lowering the dark level of the image. An important aspect of structured light is that it may be changed quickly over time. A light pattern from the structured light modulator, e.g., DMD, may be used to autofocus on difficult targets such as clean mirrors or surfaces that are far out of focus. Using a clean mirror, a number of self-test features may be replicated such as measurement of modulation transfer function and field curvature/tilt, without requiring a more expensive Shack-Hartmann sensor. In another use of structured light patterns, spatial power distribution may be measured at the sample surface with a simple power meter, in place of a camera. Structured light patterns may also be used as a reference feature for optical module/system component alignment as well used as a manual readout for manual focus. Another illumination effect made possible by use of structured light patterns is selective curing, e.g., solidification of hydrogels within the microfluidic device.

As used herein, the term "micro-object" refers generally to any microscopic object that may be isolated and/or manipulated in accordance with the present disclosure. Non-limiting examples of micro-objects include: inanimate micro-objects such as microparticles; microbeads (e.g., polystyrene beads, glass beads, amorphous solid substrates, Luminex™ beads, or the like); magnetic beads; microrods; microwires; quantum dots, and the like; biological micro-objects such as cells; biological organelles; vesicles, or complexes; synthetic vesicles; liposomes (e.g., synthetic or derived from membrane preparations); lipid nanorafts, and the like; or a combination of inanimate micro-objects and biological micro-objects (e.g., microbeads attached to cells, liposome-coated micro-beads, liposome-coated magnetic beads, or the like). Beads may include moieties/molecules covalently or non-covalently attached, such as fluorescent labels, proteins (including receptor molecules), carbohydrates, antigens, small molecule signaling moieties, or other chemical/biological species capable of use in an assay. In some variations, beads/solid substrates including moieties/molecules may be capture beads, e.g., configured to bind molecules including small molecules, peptides, proteins or nucleic acids present in proximity either selectively or nonselectively. In one nonlimiting example, a capture bead may include a nucleic acid sequence configured to bind nucleic acids having a specific nucleic acid sequence or the nucleic acid sequence of the capture bead may be configured to bind a set of nucleic acids having related nucleic acid sequences. Type of binding may be understood to be selective. Capture beads containing moieties/molecules may bind nonselectively when binding of structurally different but physico-chemically similar molecules is performed, for example, size exclusion beads or zeolites configured to capture molecules of selected size or charge. Lipid nanorafts have been described, for example, in Ritchie et al. (2009) "Reconstitution of Membrane Proteins in Phospholipid Bilayer Nanodiscs," Methods Enzymol., 464:211-231.

As used herein, the term "cell" is used interchangeably with the term "biological cell." Non-limiting examples of biological cells include eukaryotic cells, plant cells, animal cells, such as mammalian cells, reptilian cells, avian cells, fish cells, or the like, prokaryotic cells, bacterial cells, fungal cells, protozoan cells, or the like, cells dissociated from a tissue, such as muscle, cartilage, fat, skin, liver, lung, neural tissue, and the like, immunological cells, such as T cells, B cells, natural killer cells, macrophages, and the like, embryos (e.g., zygotes), oocytes, ova, sperm cells, hybridomas, cultured cells, cells from a cell line, cancer cells, infected cells, transfected and/or transformed cells, reporter cells, and the like. A mammalian cell can be, for example, from a human, a mouse, a rat, a horse, a goat, a sheep, a cow, a primate, or the like.

A colony of biological cells is "clonal" if all of the living cells in the colony that are capable of reproducing are daughter cells derived from a single parent cell. In certain embodiments, all the daughter cells in a clonal colony are derived from the single parent cell by no more than 10 divisions. In other embodiments, all the daughter cells in a clonal colony are derived from the single parent cell by no more than 14 divisions. In other embodiments, all the daughter cells in a clonal colony are derived from the single parent cell by no more than 17 divisions. In other embodiments, all the daughter cells in a clonal colony are derived from the single parent cell by no more than 20 divisions. The term "clonal cells" refers to cells of the same clonal colony.

As used herein, a "colony" of biological cells refers to 2 or more cells (e.g., about 2 to about 20, about 4 to about 40, about 6 to about 60, about 8 to about 80, about 10 to about 100, about 20 to about 200, about 40 to about 400, about 60 to about 600, about 80 to about 800, about 100 to about 1000, or greater than 1000 cells).

As used herein, the term "maintaining (a) cell(s)" refers to providing an environment comprising both fluidic and gaseous components and, optionally a surface, that provides the conditions necessary to keep the cells viable and/or expanding.

As used herein, the term "expanding" when referring to cells, refers to increasing in cell number.

As referred to herein, "gas permeable" means that the material or structure is permeable to at least one of oxygen, carbon dioxide, or nitrogen. In some embodiments, the gas permeable material or structure is permeable to more than one of oxygen, carbon dioxide and nitrogen and may further be permeable to all three of these gases.

A "component" of a fluidic medium is any chemical or biochemical molecule present in the medium, including solvent molecules, ions, small molecules, antibiotics, nucleotides and nucleosides, nucleic acids, amino acids, peptides, proteins, sugars, carbohydrates, lipids, fatty acids, cholesterol, metabolites, or the like.

As used herein in reference to a fluidic medium, "diffuse" and "diffusion" refer to thermodynamic movement of a component of the fluidic medium down a concentration gradient.

The phrase "flow of a medium" means bulk movement of a fluidic medium primarily due to any mechanism other than diffusion and may encompass perfusion. For example, flow of a medium can involve movement of the fluidic medium from one point to another point due to a pressure differential between the points. Such flow can include a continuous, pulsed, periodic, random, intermittent, or reciprocating flow of the liquid, or any combination thereof. When one fluidic medium flows into another fluidic medium, turbulence and mixing of the media can result. Flowing can comprise pulling solution through and out of the microfluidic channel (e.g., aspirating) or pushing fluid into and through a microfluidic channel (e.g., perfusing).

The phrase "substantially no flow" refers to a rate of flow of a fluidic medium that, when averaged over time, is less than the rate of diffusion of components of a material (e.g., an analyte of interest) into or within the fluidic medium. The rate of diffusion of components of such a material can depend on, for example, temperature, the size of the components, and the strength of interactions between the components and the fluidic medium.

As used herein in reference to different regions within a microfluidic device, the phrase "fluidically connected" means that, when the different regions are substantially filled with fluid, such as fluidic media, the fluid in each of the regions is connected so as to form a single body of fluid. This does not mean that the fluids (or fluidic media) in the different regions are necessarily identical in composition. Rather, the fluids in different fluidically connected regions of a microfluidic device can have different compositions (e.g., different concentrations of solutes, such as proteins, carbohydrates, ions, or other molecules) which are in flux as solutes move down their respective concentration gradients and/or fluids flow through the device.

As used herein, a "flow path" refers to one or more fluidically connected circuit elements (e.g., channel(s), region(s), chamber(s) and the like) that define, and are subject to, the trajectory of a flow of medium. A flow path is thus an example of a swept region of a microfluidic device. Other circuit elements (e.g., unswept regions) may be fluidically connected with the circuit elements that comprise the flow path without being subject to the flow of medium in the flow path.

As used herein, "isolating a micro-object" confines a micro-object to a defined area within the microfluidic device.

As used herein, "pen" or "penning" refers to disposing micro-objects within a chamber (e.g., a sequestration pen) within the microfluidic device. Forces used to pen a micro-object may be any suitable force as described herein such as dielectrophoresis (DEP), e.g., an optically actuated dielectrophoretic force (OEP); gravity; magnetic forces; or tilting. In some embodiments, penning a plurality of micro-objects may reposition substantially all the micro-objects. In some other embodiments, a selected number of the plurality of micro-objects may be penned, and the remainder of the plurality may not be penned. In some embodiments, when selected micro-objects are penned, a DEP force, e.g., an optically actuated DEP force or a magnetic force may be used to reposition the selected micro-objects. Typically, micro-objects may be introduced to a flow region, e.g., a microfluidic channel, of the microfluidic device and introduced into a chamber by penning.

As used herein, "unpen" or "unpenning" refers to repositioning micro-objects from within a chamber, e.g., a sequestration pen, to a new location within a flow region, e.g., a microfluidic channel, of the microfluidic device. Forces used to unpen a micro-object may be any suitable force as described herein such as dielectrophoresis, e.g., an optically actuated dielectrophoretic force; gravity; magnetic forces; or tilting. In some embodiments, unpenning a plurality of micro-objects may reposition substantially all the micro-objects. In some other embodiments, a selected number of the plurality of micro-objects may be unpenned, and the remainder of the plurality may not be unpenned. In some embodiments, when selected micro-objects are unpenned, a DEP force, e.g., an optically actuated DEP force or a magnetic force may be used to reposition the selected micro-objects.

As used herein, "export" or "exporting" refers to repositioning micro-objects from a location within a flow region, e.g., a microfluidic channel, of a microfluidic device to a location outside of the microfluidic device, such as a 96 well plate or other receiving vessel. The orientation of the chamber(s) having an opening to the microfluidic channel permits easy export of micro-objects that have been positioned or repositioned (e.g., unpenned from a chamber) to be disposed within the microfluidic channel. Micro-objects within the microfluidic channel may be exported without requiring disassembly (e.g., removal of the cover of the device) or insertion of a tool into the chamber(s) or microfluidic channel to remove micro-objects for further processing.

A microfluidic (or nanofluidic) device can comprise "swept" regions and "unswept" regions. As used herein, a "swept" region is comprised of one or more fluidically interconnected circuit elements of a microfluidic circuit, each of which experiences a flow of medium when fluid is flowing through the microfluidic circuit. The circuit elements of a swept region can include, for example, regions, channels, and all or parts of chambers. As used herein, an "unswept" region is comprised of one or more fluidically interconnected circuit element of a microfluidic circuit, each of which experiences substantially no flux of fluid when fluid is flowing through the microfluidic circuit. An unswept region can be fluidically connected to a swept region, provided the fluidic connections are structured to enable diffusion but substantially no flow of media between the swept region and the unswept region. The microfluidic device can thus be structured to substantially isolate an unswept region from a flow of medium in a swept region, while enabling substantially only diffusive fluidic communication between the swept region and the unswept region. For example, a flow channel of a micro-fluidic device is an example of a swept region while an isolation region (described in further detail below) of a microfluidic device is an example of an unswept region.

As used herein, a "non-sweeping" rate of fluidic medium flow means a rate of flow sufficient to permit components of a second fluidic medium in an isolation region of the sequestration pen to diffuse into the first fluidic medium in the flow region and/or components of the first fluidic medium to diffuse into the second fluidic medium in the isolation region; and further wherein the first medium does not substantially flow into the isolation region.

In the bioproduction industry, one severe problem is the expense, time and difficulty in identifying clonal populations having desired levels of production and growth habits when employing the currently available instrumentation and workflows. The ability to screen and identify promising clones within a microfluidic device, very early in expanding populations, such as 3, 4, 5, 6, or 7 days after seeding individual founding cells, as described herein, can offer significant time and cost advantages. However, culturing and screening cells for bioproductivities thereof in a microfluidic environment imposes technical problems, especially when the cells are relatively small or highly mobile. Those cells can be difficult to be contained in a chamber during culturing. Moreover, detecting the secreted product can be challenging when the cells have a lower secretion level, which impose uncertainties of whether the secreted products at early stage of culture are of sufficient concentration for detection and screening.

Methods for Preparing a Chamber of a Microfluidic Device to Detect Analyte Produced by a Cell Within the Chamber Methods for preparing a chamber of a microfluidic device to detect an analyte produced within the chamber are provided. The method comprises disposing a micro-object into the chamber of a microfluidic device, the microfluidic device having a microfluidic circuit comprising a flow region and the chamber, wherein the chamber comprises an opening to the flow region; forming an in situ-generated barrier within the chamber, wherein the in situ-generated barrier defines a first area of the chamber proximal to the opening of the chamber to the flow region and a second area of the chamber that is separated from the first area of the chamber by the in situ-generated barrier; allowing the micro-object to produce the analyte defining an area of interest within the first area or the second area; and detecting a signal associated with the analyte within the area of interest. The methods for preparing a chamber of a microfluidic device to detect an analyte can be used for evaluating productivity of a micro-object or for performing pH measurement within a microfluidic device as described herein. The first area of the chamber and the second area of the chamber may be partially or fully separated by the in situ-generated barrier.

As used herein, "a signal associated with the analyte" or similar phases refers to a signal that is directly or indirectly emitted by the analyte. In some embodiments, the signal is emitted by a detectable label of a reporter molecule configured to bind or react with the analyte. In some embodiments, the signal is resulted from an interaction between a reporter molecule and the analyte. The analyte can be a byproduct of an incubation of the micro-object, which provides information relevant to the productivity. For example, a cell culture environment may become acidic due to secretion of organic acids, including acetic acids. The acetic acids can be an analyte for the methods of the present disclosure, a reporter molecule (e.g., a pH sensitive molecule) can emit a detectable signal while interacting with the acidified environment. In some embodiments, the analyte can be detectable directly, for example, by conjugating with a detectable label.

Methods for evaluating productivity of a micro-object. Methods and compositions for microfluidic assay are provided herein for which improvements to the accuracy, limits of detection (particularly lower limits of detection), and overall detectability are obtained by introducing an in situ-generated hydrogel barrier. The hydrogel barrier defines a desired functional area, such as an enclosed culture area and an assay area. In some embodiments, the hydrogel barrier divides a chamber, e.g., a sequestration pen, into two areas, a first area proximal to the pen opening which opens to a flow region and a second area distal to the barrier (from the perspective of the pen opening). The distal area, in some embodiments is used exclusively for a culturing area (e.g., an enclosed culture area configured to incubate the micro-object, for example, in the embodiments that the micro-object is a cell, the culturing area is configured to culture the cell), and the proximal area is used for imaging/observing an assay. The assay is performed within an area defined within the proximal area and may be any area suitable for the assay. In some embodiments, the in situ-generated hydrogel barrier permits the analyte to pass from the area where the micro-object is disposed and producing the analyte to an area of interest where the assay is observed, to determine the presence of the analyte. In some embodiments, the hydrogel barrier provides a location to securely dispose a capture bead used in an assay.

In other embodiments, the distal area (i.e., the second area described above) is used for both a culturing area as well as containing the area of interest in which the assay is observed/imaged. In some embodiments, performing the assay in the distal area, e.g., the area in which culturing is taking place as well, is particularly useful to help concentrate, e.g., accumulate, a detectable signal from the assay, when the rate of production of the analyte by the micro-object within the culturing area is low. When the distal area is both a culturing area as well as containing the area of interest for detecting the signal from an assay, the area of interest is generally chosen to be in a portion of the distal area that contains no cells. For example, the area of interest may be selected to be in a portion of the distal area that is close to the distal side of the hydrogel barrier, but substantially does not contain either micro-object (i.e., micro-object-free) or the hydrogel barrier.

In other embodiments, the proximal area (i.e., the first area described above) is used as a culturing area while the distal area (i.e., the second area described above) is used as an assay area comprising an area of interest in which the assay is observed/imaged. The in situ-generated hydrogel barrier permits the analyte to pass while impeding cells disposed within the proximal area from entering the distal area. In other words, the assay area and the area of interest can be substantially free of micro-objects. Without wishing to be bound by theory, using the distal area as the assay area can be beneficial for some assays by minimizing interference with the assay or signal detection caused by a flow within the microfluidic channel.

In conducting the assay determining productivity of the micro-object, the product of the micro-object may itself be detectable, e.g., is fluorescent, luminescent, visibly colored, uv-detectable, and the like. In other embodiments, one or more reagents (e.g., a reporter molecule) may be introduced to the area of interest to interact with the analyte, e.g., bind or react with the analyte thereby creating a detectable signal. The hydrogel barrier may have selective permeability permitting one, some, or all of the one or more reagents to pass through the barrier to the distal area of the chamber. In some embodiments, the hydrogel barrier may have a selective permeability that decreases the permeability of the analyte when it is bound with one or more reagents in the assay.

Productivity. As used herein "productivity" refers to an amount or characteristic/quality of a product (i.e., analyte) produced by the micro-object. In some embodiments, the micro-object is a cell, and the productivity is the bioproductivity of the cell. As used herein, "bioproductivity" refers to productivity of a living cell in producing or secreting a molecule of interest. The term "bioproductivity" is thus encompassed by the term "productivity," which can further encompass the productivity of a non-living micro-object, such as a bead. As used herein, "molecule of interest," "biomolecule of interest," "biomolecule," "analyte," "secreted analyte," "secreted protein," and alike can be interchangeable and in some embodiments refer to a biomolecule or an organic molecule produced by a cell of which the bioproductivity is to be evaluated. In some embodiments, the analyte is an amino acid, a polypeptide, a protein, a nucleotide, a nucleic acid, a polysaccharide, or a combination.

In some embodiments, the biomolecule may have a molecular weight less than about 100 kDa, 90 kDa, 80 kDa, 60 kDa, 50 kDa, 40 kDa, 30 kDa, 20 kDa, 10 kDa, 5 kDa, 2 kDa, 1.5 kDa, 1.2 kDa, 1 kDa, or any range defined by two of the foregoing endpoints. In some embodiments, the biomolecule may have a molecular weight of 100 to 1 kDa, 90 to 1 kDa, 80 to 1 kDa, 70 to 1 kDa, 60 to 1 kDa, 50 to 1 kDa, 40 to 1 kDa, 30 to 1 kDa, 20 to 1 kDa, 10 to 1 kDa, 5 to 1 kDa, 100 to 5 kDa, 90 to 5 kDa, 80 to 5 kDa, 70 to 5 kDa, 60 to 5 kDa, 50 to 5 kDa, 40 to 5 kDa, 30 to 5 kDa, 20 to 5 kDa, 10 to 5 kDa, 50 to 10 kDa, 40 to 10 kDa, 30 to 10 kDa, or 20 to 10 kDa.

In some embodiments, the biomolecule may be a small organic molecule having a molecular weight less than 5 kDa, 4 kDa, 3 kDa, 2 kDa, 1500 Da, 1200 Da, 1000 Da, 500 Da, 200 Da, 100 Da or any range defined by two of the foregoing endpoints, for example, 5000 to 100 Da, 5000 to 500 Da, 5000 to 1000 Da, 5000 to 1500 Da, 5000 to 3000 Da, 4000 to 100 Da, 4000 to 500 Da, 4000 to 1000 Da, 400 to 1500 Da, 4000 to 3000 Da, 2000 to 100 Da, 2000 to 500 Da, 2000 to 1000 Da, or 2000 to 1500 Da.

Secreted Analyte. In various embodiments, the analyte produced by the micro-object, e.g., bioproduct, may include a protein, a saccharide, a nucleic acid, an organic molecule other than a protein, saccharide, or nucleic acid. A produced analyte (e.g., analyte) can diffuse in the media, and can comprise a broad range of molecular weights. In various embodiments, the analyte secreted by the biological micro-object may be a protein. The secreted analyte can comprise a molecular weight, wherein said molecular weight is proportional to a diffusion rate and therefore correlated with how much (e.g., the concentration) of the secreted analyte that accumulates in the chamber under a steady state equilibrium.

A produced analyte may be a naturally expressed analyte (e.g., natively expressed) or may be a bioengineered analyte (e.g., a product resulting from gene insertion, deletion, modification and the like). A produced analyte that is a nucleic acid may be a ribonucleic or a deoxynucleic acid, may include natural or unnatural nucleotides. A produced analyte that is a saccharide may be a mono-, di- or polysaccharide. Non-limiting examples of saccharides may include glucose, trehalose, mannose, arabinose, fructose, ribose, xanthan or chitosan. A produced small, organic molecule may include but is not limited to biofuels, oils, polymers, or pharmaceutics such as macrolide antibiotics. A secreted analyte that is a protein can be an antibody or fragment of an antibody. A produced analyte that is a protein can be a blood protein, such as an albumin, a globulin (e.g., alpha2-macroglobulin, gamma globulin, beta-2 microglobulin, haptoglobulin), a complement protein (e.g., component 3 or 4), transferrin, prothrombin, alpha 1 antitrypsin, and the like; a hormone, such as insulin, glucagon, somatostatin, growth hormone, growth factors (e.g., FGF, HGF, NGF, EGF, PDGF, TGF, Erythropoietin, IGF, TNF), follicle stimulating hormone, luteinizing hormone, leptin, and the like; a fibrous protein, such as a silk or an extracellular matrix protein (e.g., a fibronectin, laminin, collagen, elastin, vitronectin, tenascin, versican, bone sialoprotein); an enzyme, such as a metalloprotease (e.g., matrix metalloproteinase (MMP)) or other type of protease (e.g., serine protease, cysteine protease, threonine protease, aspartic protease, glutamic protease, asparagine peptide lyase), an amylase, a cellulase, a catalase, a pectinase, and the like; a bacterial, yeast, or protozoan protein; a plant protein; o or a viral protein, such as a capsid or envelope protein. A produced analyte that is a protein can be an enzyme (including but not limited to a proteolytic enzyme), an engineered (normally intracellular protein) protein, such as for example, albumin, and/or a structural protein including but not limited to silkworm silk or spider silk). This list is not limiting and any protein that may be engineered to be secreted may be evaluated by the methods. The produced analyte may be an antibody-drug conjugate. A non-limiting example of a produced analyte that may have a combination of a protein, a saccharide, a nucleic acid, an organic molecule having a molecular weight as described herein, and/or a virus, can include a proteoglycan or glycoprotein. The produced analyte may include an engineered binding site commonly used for purification, said purification tags can include but are not limited to be a structured or unstructured binding domain configured to associate with a reporter molecule.

Penning cells. In some embodiments, disposing a micro-object into a chamber of a microfluidic device comprises: introducing a fluidic medium comprising the micro-object into a flow region of the microfluidic device, wherein the microfluidic device comprises the flow region and the chamber fluidically connected to the flow region; and disposing the micro-object into the chamber. In some embodiments, the micro-object is disposed into a chamber of a microfluidic device by gravity or by OEP as described herein. In some embodiments, positive OEP or negative OEP can be selected depending on the surface charge of the micro-object to be moved. For example, mammalian cells are generally negatively charged at physiological pH so that a negative OEP can be applied to move the cells by compelling them toward a direction. In other examples, cells such as yeast cells are typically positively charged so that a positive OEP will be suitable for moving the cells.

In some embodiments, when the micro-object to be penned is small (e.g., nonmammalian cells, which tend to be smaller than mammalian cells), for example, smaller than 10 microns in diameter, the OEP is performed at a higher voltage. In some embodiments, the voltage is higher than 5, 6, 7, 8, 9, 10, 11, 12, 13, 14, or 15V, or any range defined by two of the foregoing endpoints, e.g., the voltage can be 5 to 15V, 7 to 15V, 9 to 15V, 11 to 15V, 13 to 15V, 6 to 15V, 8 to 15V, 10 to 15V, or 12 to 15V. In some embodiments, the diameter of the cell is about 0.5, 1, 1.5, 2, 2.5, 3, 3.5, 4, 4.5, 5, 5.5, 6, 6.5, 7, 7.5, 8, 8.5, 9, 9.5, 10 microns, or any range defined by two of the foregoing endpoints, e.g., the diameter of the call can be 0.5 to 10, 2 to 10, 4 to 10, 6 to 10, 8 to 10, 1 to 9, 3 to 9, 5 to 9, 2 to 8, 4 to 8, or 6 to 8 microns.

The process of penning micro-object may be automated using image recognition software as described in U.S. Application Publication No. US2019/0384963, filed on May 31, 2019 and U.S. Application Publication No. US20210209752, filed on Nov. 24, 2020, each of which disclosures is herein incorporated in its entirety by reference. In various embodiments, dividual micro-objects are moved (i.e., disposed) into respective chambers of a plurality of chambers, e.g., NanoPen® chambers, to be cultured or incubated as individual colonies. By penning a single micro-object to an individual chamber, expansion to a population of micro-objects provides a clonal population. The ability to observe, test, and export selectively a specific clonal population of micro-object that exhibit desired characteristics, provided by the methods described herein, is an important improvement over the macroscale techniques currently used for developing engineered cell lines that can produce a desired product.

To more effectively harness the potential for assay processes carried out within each of many individual chambers within the microfluidic device, barriers can be introduced into the chamber for a number of purposes that may improve the assay by enhancing the accuracy, sensitivity, or reproducibility, amongst other properties, of the assay. For example, a barrier may be introduced, e.g., generated in situ, in order to sequester cells away from the assay observation area (e.g., area of interest) so a rapidly secreting cell does not artificially enhance the detected signal for the entire chamber by being present within an area of interest as a point source. Barriers may also be introduced to prevent a produced analyte that is bound to a reporter molecule (RMPA complex) from diffusing away from an area of interest. Barriers also can prevent molecules having a size (molecular weight) too large to pass through the barrier to reach an area of interest of an assay which might interfere with the assay mechanism.

In situ-generated barrier. Generally, one of the functions of the in situ-generated barrier in the methods of the present disclosure is to contain a cell within the chamber of the microfluidic device. The term "in situ-generated barrier" refers to a barrier that is formed in a selected area while the microfluidic device is in operation. The barrier is generally not formed while manufacturing the microfluidic device or does not exist before the microfluidic device is used for experiments or research. The term "barrier" refers to a physical structure that is formed and fixed, at least for a certain period of time, in a selected area and is capable of impeding or blocking a particle from crossing through the barrier. As a result, the barrier formed in situ within the chamber can separate the inner space thereof into two areas on each side of the barrier. In some embodiments, the barrier defines an enclosed culture area within the chamber. In some embodiments, the barrier defines within the chamber an assay area and an enclosed culture area.

As used herein, "enclosed culture area" refers to an area pre-determined for maintaining, culturing, or incubating a micro-object, but the methods of the present disclosure are not limited to maintain, culture, or incubate the micro-object in the enclosed culture area. The term "enclosed" describes that the culture area is substantially closed so that the micro-object therewithin cannot easily move or be moved out of the area. However, the term "enclosed" is not limited to require that the area is completely closed or sealed. Some substances can still move in and out of the area (for instance, the culture medium, containing nutrients and/or waste can diffuse in and out of the area). Furthermore, the micro-object within the culture area can still move or be moved in and out of the area in some variations.

In some embodiments, the impediment or block produced by introduction of the barrier is size-dependent. A particle can be impeded, blocked, or allowed to pass through the barrier depending upon its size. In some embodiments, the in situ-generated barrier has a porosity that substantially prevents a cell from crossing through the in situ-generated barrier.

In some embodiments, the in situ-generated barrier can comprise a gap having a width or diameter that allows a cell to pass through the barrier. Nevertheless, the movement of the cell through the barrier via the gap can still be impeded. In some embodiments, a specifically created gap exists to allow substance (including cells) to enter or leave the enclosed culture area. In certain embodiments, the "gap" is a space between the in situ-generated barrier and one or more surfaces of the chamber, wherein a width of the gap is at least 0.1×, 0.2×, 0.3×, 0.4×, 0.5×, 0.75×, 1.0×, 1.5×, 2.0×, 2.5×, 3.0×, 3.5×, 4.0×, 4.5×, 5.0× or greater, or any range defined by two of the foregoing endpoints, e.g., 0.1× to 3.0×, 0.2× to 2.5×, 0.3× to 2.0×, 0.4× to 1.5×, 0.5× to 1.0×, where x is the average diameter of the micro-object.

As used herein, "assay area" refers to an area pre-determined for performing an assay required by the methods of the present disclosure. However, it is not limited that an assay required by the method of the present disclosure can only be performed within that array. It is also not limited that any areas of the chamber other than the assay area cannot be used for performing an assay.

In another aspect, a hydrogel barrier may be additionally used to reduce clonality risk. As described below, a second hydrogel barrier may be introduced, for example, after completion of assay and identification of desired micro-objects or clonal populations within a chamber. In order to prevent loss of clonality as the desired micro-objects are exported from the chamber, and optionally from the micro-fluidic device, a uniform hydrogel barrier, as described herein, may be formed across the width of the openings of undesired/unselected chambers, reducing the risk that micro-objects that do not belong to the selected clonal population will be unpenned and mix with the micro-objects selected for export.

Hydrogel in situ-generated barrier. In certain embodiments, the in situ-generated barrier is a hydrogel. In certain embodiments, the in situ-generated barrier comprises a solidified polymer network. In some embodiments, the solidified polymer network comprises a synthetic polymer, a modified synthetic polymer, or a biological polymer. In certain embodiments, the solidified polymer network comprises at least one of a polyethylene glycol, modified poly-ethylene glycol, polyglycolic acid (PGA), modified polygly-colic acid, polyacrylamide (PAM), modified polyacrylamide, poly-N-isopropylacrylamide (PNIPAm), modified poly-N-isopropylacrylamide, polyvinyl alcohol (PVA), modified polyvinyl alcohol, polyacrylic acid (PAA), modified polyacrylic acid, fibronectin, modified fibronectin, collagen, modified collagen, laminin, modified laminin, polysaccharide, modified polysaccharide, or a co-polymer in any combination. In some embodiments, the solidified poly-mer network does not include a silicone polymer.

Physical and chemical characteristics determining suit-ability of a polymer for use in the solidified polymer network may include molecular weight, hydrophobicity, solubility, rate of diffusion, viscosity (e.g., of the medium), excitation and/or emission range (e.g., of fluorescent reagents immo-bilized therein), known background fluorescence, character-istics influencing polymerization, and pore size of a solidi-fied polymer network. The solidified polymer network is formed upon polymerization or thermal gelling of a flowable polymer solution containing at least one of a polyethylene glycol, modified polyethylene glycol, polyglycolic acid (PGA), modified polyglycolic acid, polyacrylamide (PAM), modified polyacrylamide, poly-N-isopropylacrylamide (PNIPAm), modified poly-N-isopropylacrylamide, polyvi-nyl alcohol (PVA), modified polyvinyl alcohol, polyacrylic acid (PAA), modified polyacrylic acid, fibronectin, modified fibronectin, collagen, modified collagen, laminin, modified laminin, polysaccharide, modified polysaccharide, or a co-polymer in any combination. Various co-polymer classes may be used, including but not limited to any of the above listed polymers, or biological polymers such as fibronectin, collagen or laminin. Polysaccharides such as dextran or modified collagens may be used. The flowable polymer may be referred alternatively here as a pre-polymer, in the sense that the flowable polymer is crosslinked in-situ. Biological polymers having photoactivatable functionalities for polym-erization may also be used.

In some instances, a polymer may include a cleavage motif. A cleavage motif may include a peptide sequence inserted into the polymer that is a substrate for one or more proteases, including but not limited to a matrix metallopro-teinase, a collagenase, or a serine proteinase such as Pro-teinase K. Another category of cleavage motif may include a photocleavable motif such as a nitrobenzyl photocleavable linker which may be inserted into selected locations of the prepolymer. In some embodiments, a nitrobenzyl photo-cleavable linker may include a 1-methinyl, 2-nitrobenzyl moiety configured to be photocleavable. In other embodi-ments, the photocleavable linker may include a benzoin moiety, a 1,3 nitrophenolyl moiety, a coumarin-4-ylmethyl moiety or a 1-hydroxy 2-cinnamoyl moiety. A cleavage motif may be utilized to remove the solidified polymer network of an isolation structure. In other embodiments, the polymer may include cell recognition motifs including but not limited to a RGD peptide motif, which is recognized by integrins.

One type of polymer, amongst the many polymers that may be used, is polyethylene glycol diacrylate (PEGDA) or polyethylene glycol acrylamide (diacrylamide, multi-armed acrylamide or substituted versions as described herein).

Photoactivated polymerization may be accomplished using a free radical initiator Igracure® 2959 (BASF), a highly efficient, non-yellowing radical, alpha hydroxy ketone photoinitiator, is typically used for initiation at wavelengths in the UV region (e.g., 365 nm), but other initiators may be used. An example of another useful pho-toinitiator class for polymerization reactions is the group of lithium acyl phosphinate salts, of which lithium phenyl 2,4,6, -trimethylbenzolylphosphinate has particular utility due to its more efficient absorption at longer wavelengths (e.g., 405 nm) than that of the alpha hydroxy ketone class. Another initiator that may be used are water soluble azo initiators, such as 2,2-Azobis [2-methyl-N-(2-hydroxyethyl) propionamide]. The initiator may be present within the flowable polymer solution at a concentration of about 5 millimolar, about 8 millimolar, about 10 millimolar, about 12 millimolar, about 15 millimolar, about 18 millimolar, about 20 millimolar, about 22 millimolar, about 25 milli-molar, about 28 millimolar, about 30 millimolar, about 35 millimolar, or about 40 millimolar.

Crosslinking may be performed by photopatterning of linear or branched PEG polymers, free radical polymeriza-tion of PEG acrylates or PEG acrylamides, and specifically tailored chemical reactions such as Michael addition, con-densation, Click chemistry, native chemical ligation and/or enzymatic reactions. In particular, photopatterning of cross-linking may be used to gain precise control of extent of the physical extent of the hydrogel barrier as well as the degree of crosslinking, as described in the following section and in the Examples.

Inhibitors may be included within the flowable polymer solution to ensure precise control of photopatterning and to prevent extraneous or undesired polymerization. One useful inhibitor is hydroquinone monomethyl ether, MEHQ, but other suitable inhibitors may be used. The inhibitor may be present in the flowable polymer solution at a concentration of about 1 millimolar, about 2 millimolar, about 5 millimo-lar, about 10 millimolar, about 15 millimolar, about 20 millimolar, about 25 millimolar, about 30 millimolar, about 35 millimolar, about 40 millimolar or more, as needed to provide the photopatterning control desired.

Tuneable permeability. One aspect of performing assays using a hydrogel in a situ-generated barrier is to determine what species is desired to gain access to the area of interest. Selection of the chemical nature of the polymer (for example, molecular weight range, number of cross linkable moieties per polymer unit (linear, 2 arm, 4 arm, 8 arm, star or comb polymer), mixtures of polymers), the amount of initiator, and mode of polymerization are variables that may be modified to tune the hydrogel barrier formed. Generally, the initiator is a photoinitiator. Photopatterning provides precise control of the geometry of the polymerization as well as the extent of polymerization, and changes in exposure time and power of the illumination also can provide more control to arrive at a desired type of porosity and degree of robustness of the polymerized feature.

As described in Example 2-1, non-limiting examples of controlled permeability are shown. Mixtures of two different flowable polymers having similar molecular weight were found to be advantageous in providing hydrogel barriers with differential permeability. Using polymers having similar molecular weights confers similar rates of diffusion, which simplifies delivery to the region within the chamber. Since chambers that are sequestration pens are unswept regions of the microfluidic device, introduction of the polymer into the sequestration pen occurs substantially only by diffusion.

In many variations, polymer selection may depend upon the biocompatibility of the polymer species, and may be related to the specific application to which a hydrogel in situ-generated barrier may be used.

In some variations, the hydrogel may be a polyethylene glycol polymer or a modified polyethylene glycol polymer.

A wide range of molecular weights of the flowable polymer may be suitable, depending upon the structure of the polymer. In some embodiments, the flowable polymer may have a molecular weight of about 500 Da to about 20 kDa, or about 500 Da, about 1 kDa, about 3 kDa, about 5 kDa, about 10 kDa, about 12 kDa, about 15 kDa, about 20 kDa or any value therebetween. A useful star type polymer may have Mw (weight average molecular weight) in a range from about 500 Da to about 20 kDa (e.g., four arm polymer), or up to about 5 kDa for each arm, or any value therebetween. In some embodiments, a polymer having a higher molecular weight range, may be used at lower concentrations in the flowable polymer, and still provide an in situ-generated barrier or isolation structure that may be used in the methods described herein.

Reversing/removing/minimizing the in situ-generated isolation structure. A number of mechanisms may be used to remove or reduce the in situ-generated hydrogel barrier when there is no further purpose for it. For example, once an assay is completed and desirable biological cells have been identified, it may be useful to remove the hydrogel barrier in order to export the cells and/or continue culturing and expanding the biological cell demonstrating desirable activities or properties.

Mechanical force. Increasing flow can be used if at least a portion of the hydrogel barrier is located within a flow region as opposed to an isolation region of a pen. For example, the at least one isolation structure may be located within an isolation region of a sequestration pen, and after the assay is complete, the sequestration pen or the isolation region therein may be modified to bring flow through the isolation region.

In other variations, such as is described herein, laser-initiated bubbles may provide forces that can deform or disrupt the hydrogel barrier, permitting export of the cells, as is more fully described in Example 1-5.

Hydrolytic susceptibility: Porogens, including polymers which are incapable of being chemically linked to the photoinitiated polymer(s), may be included when forming the hydrogel barrier. The degree/size of openings within the formed hydrogel can customize the hydrolysis rate via accessibility within the hydrogel barrier). In other embodiments, the pores formed may be employed to permit secreted materials or chemical reagents to pass through the hydrogel barrier but prevent a cell from moving into, out of, and/or through the isolation structure. In other embodiments, degradability of these polymers may be increased by introducing degradable segments such as polyester, acetal, fumarate, poly(propylene fumarate) or polyhydroxyacids into polymers (e.g., PEG polymers).

Reducing agents: PEG may be formed with disulfide linkages at intervals along the macromere, which may be random or predetermined. The disulfide bonds may be broken by Dithiothreitol (DTT), mercaptoethanol, or TCEP.

Thermal: poly N-isopropylacrylamide (PNIPAm) or other suitable LCST polymers may be used to introduce hydrogel barriers upon heating. They may be removed by decreasing the temperature of the formed polymer hydrogel barrier. The polymers may include ELPs or other motifs that also permit removal by other mechanisms such as hydrolysis or proteolysis. In particular, PNIPAm may be used to create a surface for adherent cells, but then switched to permit export.

Proteolytic susceptibility: Hydrogels may have any sort of peptide sequence engineered in, such that selective proteolysis upon a selected motif by a selected protease can remove/reverse/or minimize a hydrogel isolation structure. Some classes of modified PEG include PEG having elastin like peptide (ELP) motifs and/or having peptide motifs for susceptibility to a variety of proteases (enzyme sensitive peptide ESP). A large number of these motifs are known. One useful motif is RGD which may be constrained to be cyclic.

Osmotic susceptibility: Calcium concentration/other osmotic strategies can be employed to degrade and remove a hydrogel barrier. As above, changes of media flowed through the channel or flow region may dimensionally swell or de-swell hydrogel barriers.

Photocleavage: As described above, if a polymer of the solidified polymer network includes a photocleavable moiety, directing illumination of an exciting wavelength to the solidified polymer network will cause cleavage within sections of the solidified polymer network. This cleavage may provide complete or partial disruption of the solidified polymer network, thereby removing or reducing the hydrogel barrier.

In some applications, the hydrogel barrier may not be removed but may simply be swelled or de-swelled using light or media\solvent changes. Some types of hydrogels may incorporate moieties that respond reversibly to light (for example, change regiochemistry about a rigid bond; form reversible crosslinks within the polymer, or form/break ion pairs).

Micro-object exportation and geometry of the in situ-generated barrier. In one aspect, a method for preparing a chamber of a microfluidic device to export a micro-object selectively from the chamber is provided. The method comprises disposing individual micro-objects of a plurality of micro-objects into respective chambers of plurality of chambers of a microfluidic device, the microfluidic device having a microfluidic circuit comprising a flow region and the plurality of chambers, wherein each chamber comprises an opening to the flow region; identifying a micro-object of interest disposed in its respective chamber of the plurality of chambers; forming an in situ-generated hydrogel barrier across the opening of every other chamber of the plurality of chambers, thereby preventing other micro-objects contained in the other chambers from exiting their respective other chambers; and exporting the micro-object of interest out of its respective chamber.

The in situ-generated barrier of the methods of the present disclosure provides advantages of containing a micro-object within the chamber and accumulation effects for assays. In some embodiments, the micro-object is further exported out of the microfluidic device. Exporting the micro-object of interest can be selectively exporting only the micro-object of interest. In some embodiments, selectively exporting only the micro-object of interest further comprises reducing clonality risk. The clonality risk can be reduced by forming the in situ-generated barrier as described herein.

In some embodiments, exporting the micro-object comprises directing a laser illumination upon a selected area of the chamber, as mentioned above, to create a bubble pushing the cell toward the opening of the chamber. In other embodiments, exporting the micro-object comprises directing laser illumination upon a selected area of the chamber to create a bubble dislodging the micro-object and dielectrophoretic forces may be used to move the micro-object once it is dislodged from the surface of the culturing area.

Without intending to be limited by theory, the laser illumination is set to project on a thermal target on a surface of the chamber to generate heating in the fluidic medium surrounding the thermal target may nucleate and propagate bubbles. The bubble, upon collapse, creates a cavitating force. In other embodiments, the bubble may be grown by continued illumination to create a shear flow of fluid directed towards nearby substances. The force and/or the flow can push the in situ-generated barrier, fluidic medium, and the cell away, typically in a direction towards the opening of the chamber. As a result, once the in situ-generated barrier no long holds its original position containing the cell, the cell can be moved out of the chamber. In some embodiments, the cell is moved by the bubble to a location close to an opening of the chamber to the microfluidic channel, and a OEP force is applied to further move the cell into the microfluidic channel where later the cell is flushed out of the microfluidic device by a flow introduced therein. In some other embodiments, once the laser pulse has been stopped the induced bubble collapses resultingly drawing fluid back towards the distal end of the chamber.

The site of illumination may be selected to be any discrete selected region of the microfluidic device, as may be useful. In some embodiments, the discrete selected region of illumination may be a location within a chamber (e.g., a sequestration pen) of a microfluidic device. In various embodiments, the discrete selected region of illumination is located within an isolation region of a sequestration pen, which may be configured like any sequestration pen described herein. In some embodiments, the laser illumination is projected at a micro-object-free area (i.e. an area free of micro-object, e.g., free of cell) of the chamber. In some embodiments, the laser illumination is projected at an area near the distal end of the chamber. In certain embodiments, an OEP force is applied first to move the micro-object within the chamber away from the distal end thereof to create a micro-object-free area, and then a laser illumination can be applied at the micro-object-free area to create a bubble. One method of exporting micro-objects using laser illumination in the presence of a hydrogel barrier is further discussed below and is shown in FIGS. 16A-16F.

The optical illumination, power of the laser, and other information regarding bubble dislodgement have been described, for example, in U.S. Pat. No. 10,829,728 (issued on Nov. 10, 2020) and U.S. Publication No. 20220033758 (published on Feb. 3, 2022), the contents of which is incorporated herein by reference in its entirety.

The geometry of the in situ-generated barrier can be selected to facilitate the cell exportation. Without intending to be bound by any theory, in some embodiments, the in situ-generated barrier is designed to have a structurally vulnerable portion so that, upon application of a threshold pressure (for instance, a force generated by the bubble created by the laser illumination), the in situ-generated barrier can be deformed, flipped or slipped from its original position, or changed of position resulting in an open space for a cell to be moved through. In other words, in those embodiments, the in situ-generated barrier will no longer impede or block the cell after the laser illumination.

In some embodiments, the in situ-generated barrier comprises one or more discrete sections, each of which is moveably connected to one or more surfaces of the chamber. As used here, "moveably connected" describes that the discrete section can be moved upon a threshold pressure. Therefore, application of a threshold pressure to the one or more discrete sections of the in situ-generated barrier moves at least one of the one or more discrete sections with respect to the one or more surfaces of the chamber and thereby creates or expands an opening in the enclosed culture area (e.g., the second area as described herein). The opening can facilitate the exportation of the cell out of the chamber. It may be desired to select a hydrogel barrier design that provides non-uniformity in a center point of the width of the chamber, decreasing the width, thickness or height of the hydrogel gels/segments comprising the barrier as the forces created by the laser illumination are directed more forcefully there.

In some embodiments, the in situ-generated barrier comprises two or more discrete sections, wherein adjacent sections are separated from one another by a gap. In some embodiments, the in situ-generated barrier consists of (or consists essentially of) two discrete sections which are separated from one another by a gap. In some embodiments, the gap can be designed to cross the in situ-generated barrier and have an axis aligning with an axis of the chamber (e.g., the axis can be the proximal to distal axis relative to the opening of the chamber to the flow region) at an angle of 0°, 5°, 10°, 15°, 20°, 30°, 40°, 50°, 60°, 70°, 80°, or 90°, or any number between any two of listed numbers. In some embodiments, the in situ-generated barrier can have one, two, or more gaps, each of which may be on the order of the diameter of a single cell size, for example, 0.1×, 0.2×, 0.3×, 0.4×, 0.5×, 0.75×, 1.0×, 1.5×, 2.0×, 2.5×, 3.0×, 3.5×, 4.0×, 4.5×, 5.0× or greater, or any range defined by two of the foregoing endpoints, e.g., 0.1× to 3.0×, 0.2× to 2.5×, 0.3× to 2.0×, 0.4× to 1.5×, 0.5× to 1.0×, where x is the average diameter of the cell.

In some embodiments, the structurally vulnerable portion can be of a suitable thickness. For instance, in some embodiments, a portion of the in situ-generated barrier has a thickness that is smaller than the height of the chamber.

In some embodiments, the in situ-generated barrier comprises a non-uniform thickness with respect to an axis of the chamber (e.g., the axis can be the proximal to distal axis relative to the opening of the chamber to the flow region) such that a portion of the in situ-generated barrier is less thick than other portions of the in situ-generated barrier. In some embodiments, the less thick portion of the in situ-generated barrier has a thickness that is smaller than the height of the chamber.

Accordingly, various exemplary shapes of in situ-generated barrier can be formed within the chamber, as shown in FIG. 6A. These include, but are not limited to a rectangular fully capping barrier (i.e. a fully sealed cap, 605, a center bar 610, a rectangular half bar 615, a side bars (two discrete side rectangular bars separated by a gap and extended from both sides of the wall, 620, a "bowtie" (two discrete side triangular bars separated by a gap and extended from both sides of the wall, 625, a single triangular bar 630, a V-shaped bar 635, and a V-cap (a rectangular bar having a v shaped depression on the side of the barrier facing the opening to the channel, 640. The center bar has two gaps (arrowed) respectively on each side between the walls of the chamber. The side bars, bowtie and single triangle bar both have a single gap (arrowed). The size of the gap can be 5, 6, 7, 8, 9, 10, 11, 12, 13, 14, 15, 16, 17, 18, 19, 20, 21, 22, 23, 24, 25, 26, 27, 28, 29, 30 microns or any range defined by two of the foregoing endpoints, e.g., 5 to 30, 5 to 25, 5 to 20, 5 to 15, 5 to 10, 7 to 30, 7 to 25, 7 to 20, 7 to 15, 7 to 10, 10 to 15, 10 to 20, 10 to 25, 10 to 30, 15 to 20, 15 to 25, or 15 to 30 microns.

Further the size of the components of the hydrogel barrier may vary considerably. As shown in the photographs of FIGS. 6B-6C), where two embodiments of the "bowtie" barrier are shown. These examples of nonuniform barriers may have a variety of dimensions that are nonuniform. Non-uniformity may be located in the width (pen wall to pen wall dimension), in the "thickness" dimension (from distal-to-pen opening to proximal-to-pen opening dimension), and/or the "height" dimension (from inner surface of the substrate to the inner surface of the cover of the microfluidic device, e.g., z-dimension). The non-uniformity in the "thickness" dimension, e.g., the center of the "bowtie", provides a convenient and standard location for bead disposition for the assay. The "bowtie" barrier may have a "thickness" at its largest dimension of the triangular shaped individual gel form of about 15 microns. This dimension is not limiting, and the "thickness" of the bowtie may be less than about 15 microns, less than about 12 microns, less than about 10 microns, less than about 8 microns, or less than about 5 microns. In other embodiments, the "thickness" of a triangular segment of the "bowtie" barrier may be more than about 10 microns, more than about 15 microns, or more than about 18 microns. As shown in FIG. 6B-6C, two different embodiments of hydrogel barriers having a "bowtie" non-uniform shape are shown, where the dimension 760 of the triangular segment forming the barrier ("thickness" dimension) is larger in the barrier of FIG. 6C than the dimension of the segment 750 of the barrier of FIG. 6B. Since the pens are of the same width, it can be seen that the barrier formed in FIG. 6B has a distinct gap between the two barriers, while the barrier of FIG. 6C does not have an obvious gap. While in the embodiment of FIG. 6B, a few micro-objects (the micro-object was cell in this example) have escaped the culture area below the barrier, the barrier of FIG. 6C does not permit cells to move past the barrier.

However, the use of hydrogel barriers does not limit the ability to selectively export micro-objects from chambers having hydrogel barriers. As discussed in detail in Example 1-5, and shown in FIGS. 16A-16F, export of desired micro-objects, at a user-defined timepoint may be performed.

Reporter molecule. Methods disclosed herein can comprise one or more reporter molecules (e.g., detection reagents, reagents, reporter, etc.). Reporter molecules can be configured to covalently or non-covalently bind to a produced analyte of interest. In methods disclosed herein, the reporter molecule bound to the produced analyte is configured to generate a signal that can be detected using imaging, such that the signal (raw or processed using one or more methods disclosed here in) provides direct or indirect measure of diffusion related properties such as concentration and diffusion rate constant which are proportional to the molecular weight of the reporter and/or reporter bound with produced analyte (e.g., RMPA complexes). Signal is proportional to one or more of the amount of accumulated protein/complex resulting from one or more of: the secretion rate of a biological micro-object, the number of biological micro-objects, and/or the fraction bound of the analyte.

A reporter molecule may include a binding component designed to bind the produced analyte and also may include one or more detectable label(s). The binding component may be any suitable binding partner configured to bind the secreted analyte (e.g., with a binding constant less than 10 micromolar). The binding component may be an amino acid, a polypeptide, a nucleotide, a nucleic acid, a small organic molecule, or a combination thereof. The binding component specifically binds to the produced analytes, specific binding comprises a preference for the produced analyte over one or more other components on or within the microfluidic device. In some embodiments, the reporter molecule may be multi-valent, comprising more than one binding component to bind more than one copy of the produced analyte or to more than one member of a family of secreted analytes. The stoichiometry of the RMPA complex can therefore vary for example one or more reporter molecules can bind to one or more produced molecules, and additionally or alternatively one or more produced molecules can bind to one or more reporter molecules. The reporter molecule or produced analyte must be soluble and can diffuse is solution or media disposed within the microfluidic device.

In some embodiments, introducing the first fluidic medium comprising the reporter molecule comprises allowing the reporter molecule to diffuse into the chamber. In some embodiments, allowing the reporter molecule to diffuse into the chamber comprises allowing the reporter molecule to reach an equilibrium between the flow region and the chamber. The term "equilibrium" as defined herein refers to a state in which the average quantity of species (e.g., reporter, analyte, and reporter analyte or RMPA complex) don't change as a function of time. In some instances, an equilibrium condition can comprise a closed system that attains equilibrium from non-equilibrium initial conditions.

Detectable label. The reporter molecule may also include a visible, luminescent, phosphorescent, or fluorescent detectable label. In some embodiments, the detectable label may be a fluorescent label. Any suitable fluorescent label may be used, including but not limited to fluorescein, rhodamine, cyanine, phenanthrene or any other class of fluorescent dye label. In some embodiments, the detectable label is covalently attached directly or indirectly to the binding component of the reporter molecule.

In some other embodiments, a capture oligonucleotide may be a binding component of a reporter molecule and either an intrinsic or extrinsic fluorescent dye may be the detectable label, such that the detectable label of the reporter molecule may not be detectable until the capture oligonucleotide binds the analyte, for example, an intercalating dye. In some embodiments, a detectable label of a reporter molecule may not be detectable until after the RMPA complex has formed, as the detectable signal is shifted to a new wavelength does not present prior to binding.

As used herein, "a signal associated with the detectable label" or similar phases refers to a signal that is directly or indirectly emitted by the detectable label within an area of interest. In some embodiments, the signal associated with the detectable label is detected after a steady state equilibrium is reached. In other embodiments, the signal associated with the detectable label is detected while perfusing another fluidic medium that does not comprise the reporter molecule into the flow region. The term "steady state" as defined herein refers to an equilibrium condition comprising an open system, which sustains equilibrium, wherein the net change of a species (e.g., reporter, analyte, and reporter analyte or RMPA complex) is zero. The term "kinetics or kinetic regime" as defined herein refers to any system or quantified metric associated therewith, that is not at equilibrium, wherein the reactants and products (e.g., reporter, analyte, and reporter analyte or RMPA complex (e.g., reporter molecule: produced analyte complex)) change as a function of time.

Micro-object. The micro-object described herein can be an inanimate micro-object or a cell. Non-limiting examples of micro-objects include: inanimate micro-objects such as microparticles, microbeads (e.g., polystyrene beads, Luminex™ beads, or the like), magnetic beads, microrods, microwires, quantum dots, and the like; biological micro-objects such as cells; and biological organelles, vesicles, complexes, synthetic vesicles, liposomes (e.g., synthetic or derived from membrane preparations), lipid nanorafts, and the like; or a combination of inanimate micro-objects and biological micro-objects (e.g., microbeads attached to cells, liposome-coated micro-beads, liposome-coated magnetic beads, or the like). Beads may include moieties/molecules covalently or non-covalently attached, such as fluorescent labels, nucleic acids (e.g., oligonucleotides), proteins, carbohydrates, antigens, small molecule signaling moieties, or other chemical/biological species capable of use in an assay. Lipid nanorafts have been described, for example, in Ritchie et al. (2009) "Reconstitution of Membrane Proteins in Phospholipid Bilayer Nanodiscs," Methods Enzymol., 464: 211-231. In various embodiments, the micro-object is a bead conjugated with a nucleic acid. The nucleic acid can be expressed (e.g., by contacting the micro-object with a cell-free expression reagent) to produce a molecule of interest.

Any suitable cell-free expression extract/system may be used, according to its suitability for the protein of interest, to effect transcription/translation. Some nonlimiting examples include myTXTL® (Arbor biosciences, Sigma 70 Master Mix kit, Cat. No. 507024); Retic Lysate IVT kit for mammalian proteins (ThermoFisher Cat. No. AM1200); 1-Step Human Coupled IVT kit for mammalian proteins (ThermoFisher Cat. No. 88881); 1-Step Human High Yield IVT kit for mammalian proteins (ThermoFisher Cat. No. 88890); Expressway TM Maxi Cell-Free *E. coli* Expression System (ThermoFisher Cat. No. K990100); *E. coli* S39 Extract system for linear templates (Promega Cat. No. L1030); *E. coli* S30 T7 High-yield Protein Expression system, including T7 RNA polymerase (Promega Cat. No. L1110, L1115), and the like. One of skill can select an appropriate cell-free expression system from these or other commercially available systems for the particular protein of interest. Other components may also be included, such as functional fragments of endoplasmic recticulum, which may be used to help fold expressed proteins to the proper secondary structure needed for function of the protein of interest.

In various embodiments, the micro-object is a cell, including but not limited to eukaryotic cells, plant cells, animal cells, such as mammalian cells, reptilian cells, avian cells, fish cells, or the like; prokaryotic cells, bacterial cells, fungal cells, protozoan cells, or the like; cells dissociated from a tissue, such as muscle, cartilage, fat, skin, liver, or lung cells, neurons, glial cells, and the like; immunological cells, such as T cells, B cells, plasma cells, natural killer cells, macrophages, and the like; embryos (e.g., zygotes), germ cells, such as oocytes, ova, and sperm cells, and the like; fusion cells, hybridomas, cultured cells, cells from a cell line, cancer cells, infected cells, transfected and/or transformed cells, reporter cells, and the like. A mammalian cell can be, for example, from a human, a mouse, a rat, a horse, a goat, a sheep, a cow, a pig, a primate, or the like.

Cell culture and induction. The cell to be evaluated by any of the methods of the present disclosure is not limited. In some embodiments, the cell can be a eukaryotic cell or a prokaryotic cell. In certain embodiments, the cell is an animal cell, a plant cell, fungal cell, or a bacteria cell. In some embodiments, the cell is a fungal cell. In some embodiments, the cell is a yeast cell, including but not limited to a *Saccharomyces* cell (e.g., *Saccharomyces cerevisiae*) or a *Pichia* cell (e.g., *Pichia pastoris*). In some other embodiments, the cell is a bacterial cell, which may be, but is not limited to *Escherichia coli* (*E. coli*), or any other bacterial cell that may be engineered to produce a desired bioproduct.

In some embodiments, the cell is maintained in the chamber. In some embodiments, the cell is cultured and expands (i.e., proliferates) in the chamber into a clonal population. In certain embodiments, the cell expands to a number of cells of which the secretion of a molecule of interest is of a level sufficient to be detected by the method of the present disclosure.

In some embodiments, culturing in the chamber of the microfluidic device may include culturing a cell or a clonal population thereof within a volume of medium less than 5 nanoliters. In some variations, the macroscale reactor of which the bioproductivity is predictive of may have a volume of 100 mL, 1 L, 10 L, 100 L or more. In some variations, culturing in the chamber of the microfluidic device may include culturing under substantially similar conditions to conditions of culturing in the macroscale reactor.

In some embodiments, the cell is cultured in the presence of a selected level of a component of a fluidic medium. In some embodiments, the component may be a nutrient for the clonal population of the cells. In some embodiments, the selected level of the component may be a growth limiting level of the component.

In some embodiments, cell is induced to secrete the molecule of interest. The induction can be performed according to the general knowledge of the cell. In some embodiments that the cell is engineered to secrete the molecule of interest, the induction can be performed based on the nature of the promoter constructed for the expression of the molecule of interest in the cell. In some embodiments that the cell is a yeast cell engineered with an AOX1 promoter, a BMMY medium or a BM1M medium is introduced into the flow region and allows to diffuse into the chamber to induce the secretion. Preferably, a BM1M medium is used to induce the secretion. In certain embodiments, the medium used for induction is oxygenated with at least about 10%, 15%, 20%, 25%, 30%, 35%, 40%, 45%, 50%, 55%, or 60% of oxygen, or any range defined by two of the foregoing endpoints, e.g., 10 to 60%, 10 to 55%, 10 to 50%, 10 to 45%, 10 to 40%, 10 to 35%, 10 to 30%, 10 to 25%, 10 to 20%, 10 to 15%, 20 to 60%, 20 to 55%, 20 to 50%, 20 to 45%, 20 to 40%, 20 to 35%, 20 to 30%, 20 to 25%, 30 to 60%, 30 to 55%, 30 to 50%, 30 to 45%, 30 to 40%, or 30 to 35% of oxygen.

Figures 7A, 7B, 7C:
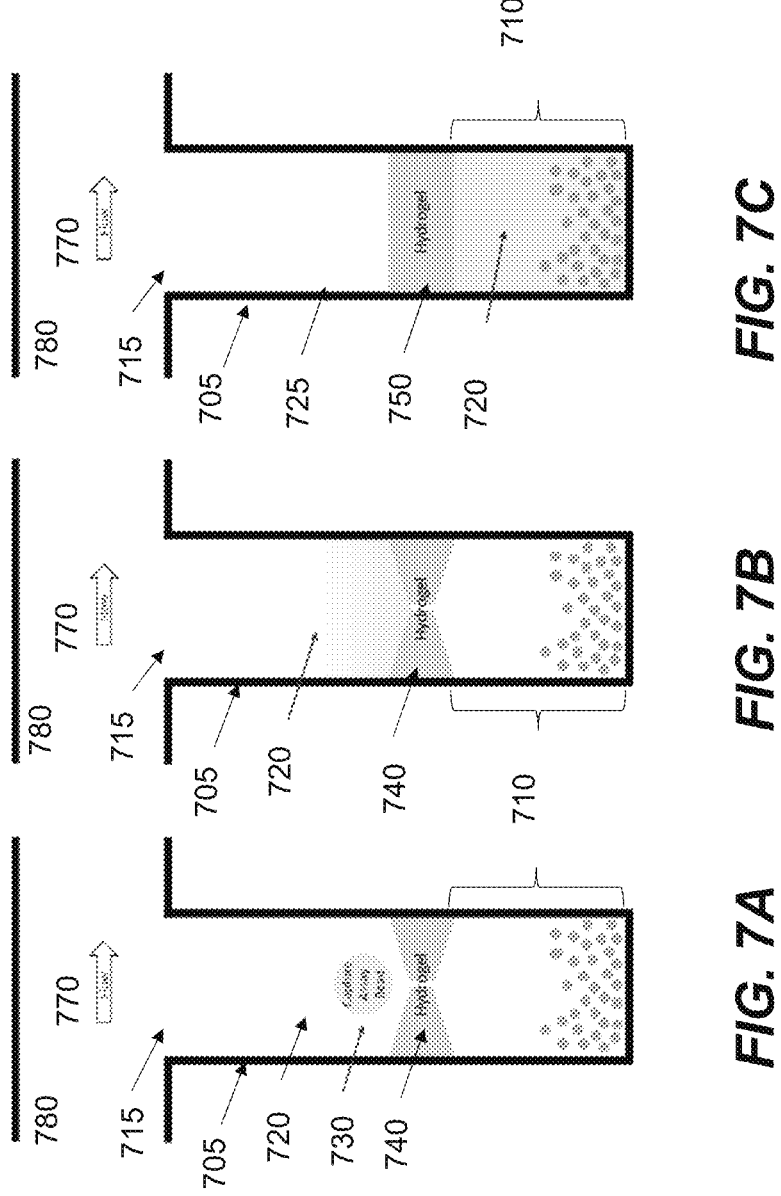
FIGS. 7A to 7C are graphical representations of assay methods utilizing hydrogel barriers according to some embodiments of the disclosure.

Assays. In light of the foregoing, the methods of the present disclosure provide a variety of different approaches to evaluate bioproductivity of a cell. Three of those variations are shown in FIGS. 7A 7C. FIG. 7A shows a bead assay. FIG. 7B shows a diffusion gradient assay, and FIG. 7C shows an accumulation assay herein. FIGS. 7A-7C are top views of the chambers 805, and the chambers normally are disposed horizontally, similarly to the sequestration pens

124, 126, 128, 130 shown in FIG. 1A. The chambers 705 open laterally from the flow region, e.g., channel 780, where flow 770 is contained. As shown in FIGS. 7A-7C, each chamber 705 has an in situ generated hydrogel barrier 740 or 750 formed within the chamber, dividing the chamber into two areas. The hydrogel barrier is generally introduced after cell(s) have already been introduced into the chamber. The first area is a culturing area 710, which is disposed distal from the hydrogel barrier, in relationship to the opening 715 of the chamber to the channel 780. This culturing area 710 is an unswept region of chamber, and no flow 770 from the channel 780 flows directly into that part of the chamber, even if the hydrogel barrier were not there. The second area 720 created by installation of the hydrogel barrier, is an assaying area and is located to the proximal side (in relation to the opening 715 of the chamber to the channel) of the hydrogel barrier 740 or 750.

As shown in FIG. 7A, an assay is provided ("bead assay"), where detection within the assay area 720 is performed by capturing secreted analyte to a bead 730. The secreted analyte diffuses either through the hydrogel barrier 740 or through a small gap between segments of the hydrogel barrier that is shown in FIG. 7A.

As shown in FIG. 7B, an assay is provided ("diffusion gradient assay") where detection of the secreted analyte occurs in the same region as that of the bead assay, but no bead is provided. Alternatively, an area of interest is selected within the assay area 720, and a labelling reagent is permitted to diffuse into the assay area and bind to the analyte of interest. A gradient profile of the labelled analyte, as it diffuses towards the opening of the chamber and into the channel can be obtained, providing an amount of fluorescence detected that is proportional to the amount of analyte. The detected amount of fluorescence may be used as a raw total, raw ranking or a raw score. The detected signal may also be further processed to provide a normalized (for biomass), corrected (for background unbound labelling reagent and the like), and/or normalized against other detected signals in other chambers on the chip to produce a total or score. Further details of how to conduct a diffusion assay are described in International Application Serial No. PCT/2017/027795, entitled "Methods, Systems, and Kits for In-Pen Assays", filed on Apr. 14, 2017, published as International Application Publication WO2017/1811135; International Application Serial No. PCT/US2018/055918, entitled "Methods, Systems, and Kits for In-Pen Assays", filed on Oct. 15, 2018, published as International Application Publication WO2019/075476; and International Application Serial No. PCT/US2021/021417, entitled "Methods, Systems, and Kits for In-Pen Assays", filed on Mar. 9, 2020, published as International Application Publication WO2021/184458, the entirety of each of which disclosures are herein incorporated by reference for any purpose.

In FIG. 7C, a third type of assay is shown. In this assay ("accumulation assay"), a hydrogel barrier 850 that spans the width of the chamber without interruption is introduced into the chamber. The chamber is divided into two areas, a culturing area 710 and second area 725 that is separated from cells. The secreted analyte is permitted to accumulate within the culturing area 720 and a culturing area 720 is selected within the culturing area, but in a portion of the culturing area where cells are not disposed. This permits a cell/colony of cells to secrete an analyte and accumulate within area 720. The hydrogel barrier in this case does not readily permit diffusion of the secreted analyte across the hydrogel, so the secreted analyte will accumulate. This is particularly useful if the rate of secretion of the analyte is low. The labelling reagent is introduced from the channel into the chamber by diffusion. Because the labelling reagent is selected to have a smaller molecular weight (size), the labelling reagent can diffuse from area 725 through the hydrogel barrier 750, and into the culturing area 710/Assay area 720 and bind to the secreted analyte. The labelled analyte may be detected and produce a raw total, ranking or score. The detected signal may also be further processed to provide a normalized (for biomass), corrected (for background unbound labelling reagent and the like), and/or normalized against other detected signals in other chambers on the chip.

Without wishing to be bound by theory, the bead assay, the diffusion gradient assay, and the accumulation assay described herein have a preferable detectable range with respect to a secretion level of a cell cultured within the microfluidic device. In some embodiments, the bead assay may be used for evaluating a predicted secretion level of about 0.01, 0.05, 0.1, 0.15, 0.2, 0.25 mg/L, or any range defined by two of the foregoing endpoints, e.g., 0.01 to 0.25, 0.01 to 0.2, 0.01 to 0.15, 0.01 to 0.1, 0.01 to 0.05, 0.05 to 0.25, 0.05 to 0.2, 0.05 to 0.15, 0.05 to 0.1, 0.1 to 0.25, 0.1 to 0.2, or 0.1 to 0.15 mg/L. In some embodiments, the diffusion gradient assay may be used for evaluating a predicted secretion level of about 10, 20, 30, 40, 50, 60, 70, 80, 90, 100, 110, 120, 150, 175, 200, 225, 250, 275, 300, 350, 400, 450, 500, 550, 600, 650, 700, 750, 800, 850, 900, 950, 1000, 1100, 1200, 1300, 1400, 1500, 1750, 2000, 2250, 2500, 3000 mg/L, or any range defined by two of the foregoing endpoints, e.g., 10 to 3000, 10 to 2500, 10 to 2000, 10 to 1750, 10 to 1500, 10 to 1000, 10 to 750, 10 to 500, 120 to 3000, 120 to 2500, 120 to 2000, 120 to 1750, 120 to 1500, 120 to 1000, 120 to 750, or 120 to 500 mg/L. In some embodiments, the accumulation assay may be used for evaluating a predicted secretion level of about 0.01, 0.05, 0.1, 0.15, 0.2, 0.25, 5, 10, 15, 25, 50, 60, 70, 80, 90, 100, 110, 120, 150, 175, 200, 225, 250, 275, 300, 350, 400, 450, 500, 550, 600, 650, 700, 750, 800, 850, 900, 950, 1000, 1100, 1200, 1300, 1400, 1500, 1750, 2000, 2250, 2500, 2750, or 3000 mg/L, or higher, or any range defined by two of the foregoing endpoints, e.g., 0.1 to 3000, 0.1 to 2500, 0.1 to 2000, 0.1 to 1750, 0.1 to 1500, 0.1 to 1000, 0.1 to 750, 0.1 to 500, 10 to 3000, 10 to 2500, 10 to 2000, 10 to 1750, 10 to 1500, 10 to 1000, 10 to 750, or 10 to 500, 100 to 3000, 100 to 2500, 100 to 2000, 100 to 1750, 100 to 1500, 100 to 1000, 100 to 750, or 100 to 500 mg/L.

Many different variations of assays may be used to assess bioproductivity of a cell or a clonal population derived therefrom, and alternatives are described herein and may be adapted as suitable for the particular use case.

Accumulation assay. In light of the foregoing, an accumulation assay is provided. In some embodiments, the in situ-generated barrier is formed at middle position of the chamber (FIG. 7C) and defines an enclosed culture area at the distal end of the chamber. The in situ-generated barrier has a first permeability with respect to the analyte and a second permeability with respect to the reporter molecule. In some embodiments, the first permeability is lower than the second permeability. In other words, a diffusion rate of the analyte diffusing out of the barrier is slower than a diffusion rate of the reporter molecule diffusing. Given that the RMPA complex is a larger than the secreted analyte, its diffusion rate would be even slower, resulting in the RMPA complex accumulating with the enclosed culture area. In some embodiments, to offer a better accumulation of the RMPA complex, the in situ-generated barrier has a porosity that impedes the RMPA complex from passing through the in situ-generated barrier (e.g., impedes diffusion of the RMPA). In certain embodiments, the porosity of the in situ-generated barrier substantially prevents the RMPA complex from passing through the in situ-generated barrier. In some embodiments, the area of interest is within the enclosed culture area. In some embodiments, the area of interest does not include a portion of the in situ-generated barrier.

Figures 8A, 8B:
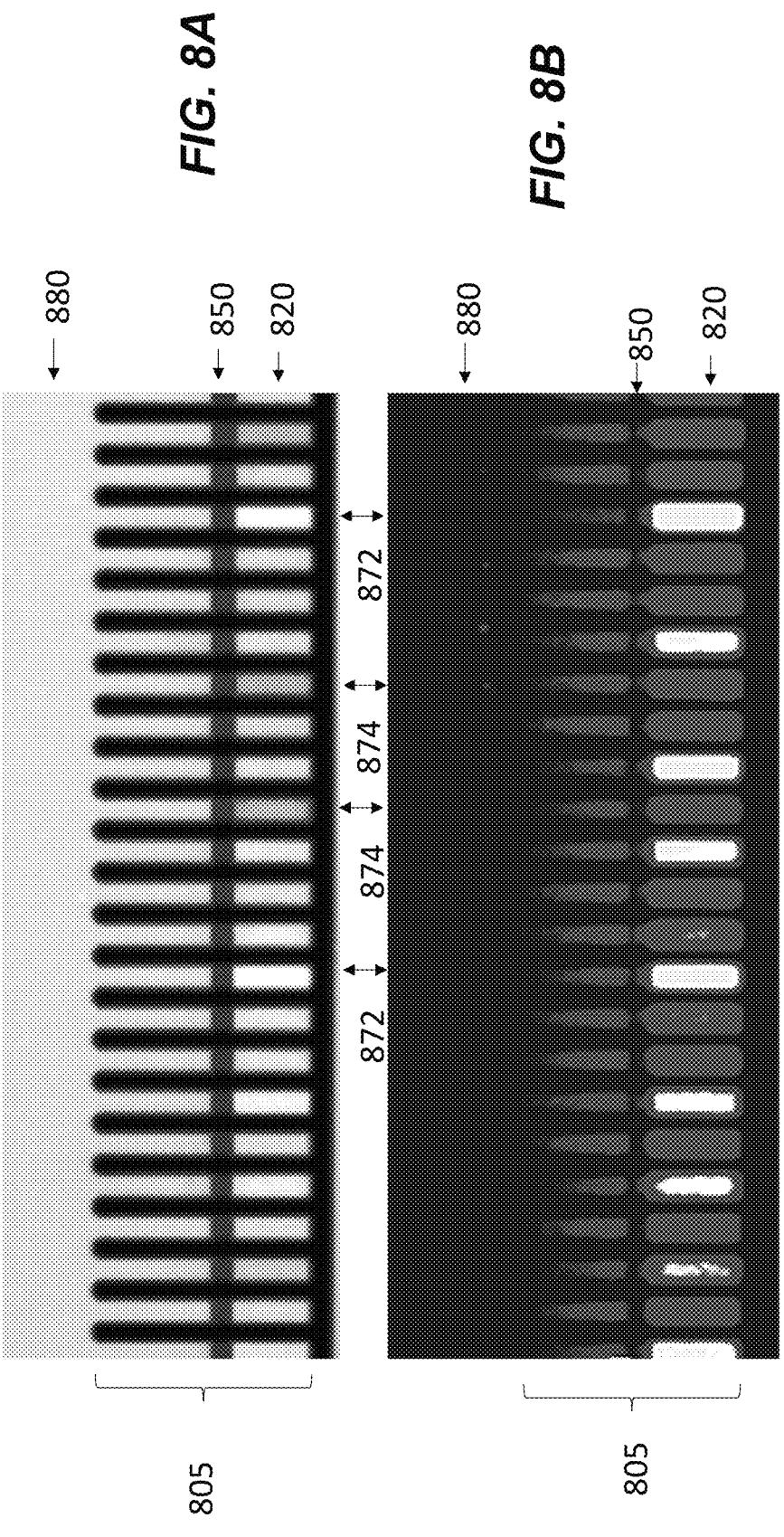
FIGS. 8A to 8B are photographic representations of fluorescent images of microfluidic chambers at two different timepoints, according to some embodiments of the disclosure.

An image can be taken after a steady state equilibrium is reached as described above for detecting a signal associated with the detectable label of the reporter molecule. As shown in FIGS. 8A and 8B, fluorescence images of the chambers 805, which open to channel 880, where hydrogel barriers 850 have been introduced in each chamber at the same point distal from the opening of the chamber to the channel. FIG. 8A is taken at a timepoint when labelled reporter molecule is being flowed through channel 880 and has diffused into the pens 805. Fluorescent signal is observed in both the channel and chambers, and additionally in the culturing area 820. Here, the free reporter molecule (e.g., unbound) in the channel and the chamber and the RMPA both emit fluorescent signals. A range of intensities of signal can be observed at the distal end of the chambers, representing different productivities of the cells cultured in each chamber. Among them, better producers (starred) can be identified, two of which 872 are annotated for both FIGS. 8A and 8B, and the cells can be exported.

A fluorescence image can also be taken at a later timepoint, while flushing a fluidic medium that does not comprise the reporter molecule into the microfluidic device as described above, as shown in FIG. 8B. The channel in this image is dark because the fluidic medium that is perfused at this moment does not comprise the reporter molecule. The in situ-generated barrier 850 is not clearly seen in this image but it is at the same position as indicated in FIG. 8A. A range of intensities of signal can also be observed at the distal end of the chambers in the culturing area 820, showing differential signal still accumulated within the culturing areas below the barrier 850. These show different productivities of the cells cultured in each chamber. It can be seen that the signal in positive secretor chambers 872 is brighter than other chambers, correlating with the observation from FIG. 8A. Alternatively, two poorly performing colonies are identified at chambers 874, where the image is slightly less fluorescent in FIG. 8A and very dim in FIG. 8B. This demonstrates that while substantial amounts of reporter molecule have diffused in the respective culturing areas 820, once flushing with medium carrying no labelling molecule has been performed, unbound reporter molecule has diffused out and little to no bound RMPA is found.

Diffusion gradient assay. In light of the foregoing, a diffusion gradient assay is provided. In some embodiments, the in situ-generated barrier is formed at middle position of the chamber (FIG. 7B) and defines an enclosed culture area at the distal end of the chamber and an assay area at the proximal end of the chamber. In some embodiments, the area of interest is located within the chamber but not within the enclosed culture area, for instance, within the assay area. In certain embodiments, the area of interest is within a micro-object-free region of the chamber. In some embodiments, the area of interest does not include a portion of the in situ-generated barrier.

The in situ-generated barrier has a first permeability with respect to the analyte and a second permeability with respect to the reporter molecule. In some embodiments, the first permeability is lower than the second permeability. Preferably, the in situ-generated barrier has a porosity that allows the RMPA complex to pass through the in situ-generated barrier. In some embodiments, the in situ-generated barrier used in the diffusion gradient assay comprises a gap (e.g., a bowtie barrier as described above) through which the RMPA complex can diffuse (e.g., and thereby cross the in situ-generated barrier). Because the analyte is produced by the micro-object in the chamber and diffuse from the distal end of the chamber toward the proximal end thereof, a gradient of signal associated with the detectable label can be observed within the assay area.

More detailed information about diffusion gradient assay process is described below.

Bead assay. In light of the foregoing, a bead assay is provided, as shown in FIG. 8A. The methods for the bead assay includes: disposing the micro-object into a chamber of a microfluidic device, the microfluidic device having a microfluidic circuit comprising a flow region and the chamber, wherein the chamber comprising an opening to the flow region; forming an in situ-generated barrier within the chamber, wherein the in situ-generated barrier defines within the chamber an assay area and an enclosed culture area for culturing the cell; disposing a capture micro-object in the assay area of the chamber, wherein the capture micro-object comprises a capture moiety configured to bind an analyte produced by the micro-object; allowing the micro-object to produce the analyte; introducing a first fluidic medium comprising a reporter molecule into the flow region, wherein the reporter molecule comprises a first detectable label and a binding component configured to bind to the analyte; and detecting a first signal associated with the first detectable label within an area of interest within the microfluidic circuit, thereby evaluating the productivity of the micro-object.

In some embodiments, the in situ-generated barrier has a porosity that allows the analyte to pass through the in situ-generated barrier (e.g., allow diffusion of the analyte) so that the analyte can bind the capture micro-object within the assay area. In some embodiments, the in situ-generated barrier used in the diffusion gradient assay comprises a gap (e.g., a bowtie barrier as described above) through which the analyte can diffuse (e.g., and thereby cross the in situ-generated barrier) while the capture micro-object cannot pass through the gap.

In some embodiments, the area of interest is located within the chamber but not within the enclosed culture area, for instance, within the assay area. In certain embodiments, the area of interest is within a micro-object-free region of the chamber. In some embodiments, the area of interest does not include a portion of the in situ-generated barrier.

In some embodiments, the capture micro-object is a surface coated with the capture moiety. In certain embodiments, the capture micro-object is a capture bead coated with the capture moiety. The capture bead may be made of any suitable material, such as polymer, metal, ceramic, glass, or any combination thereof. The capture bead may be magnetic or may not be magnetic. As used herein, "capture moiety" is a chemical or biological species, functionality, or motif that provides a recognition site for the analyte.

In some embodiments, the analyte comprises a first tag and a second tag. The first tag is configured to be bound by the capture moiety of the micro-object. The second tag is configured to be bound by the binding component of the reporter molecule. Without intending to be bound by theories, the binding between the micro-object and the analyte accumulates the analyte on the surface of the micro-object and therefore amplifies the signal associated with the detectable label of the reporter molecule.

In some embodiments, the capture moiety comprises a peptide or a protein. In some embodiments, the first tag can be an epitope tag (e.g., a protein tag) including, but not limited to FLAG-tag, E-tag, Myc-tag, T7, NE-tag, Spot-tag, V5-tag, VSV-tag, and the like, which are known in the art. In some embodiments, the first tag is a FLAG tag (for example, Thermo Fisher Cat. No. 701629), and the capture moiety is an anti-FLAG antibody. In some variations, the protein aggregation bead includes a metal chelate species which can recognize a protein tag such as a His-tag (poly Histidine, which is chelated by a nickel or cobalt chelate. The nickel chelate may be Ni(II)-nitrilotriacetic acid (Ni-NTA) Another metal chelating tag is TC tag (which is bound by FLAsH or ReAsH biarsenical compounds). Any suitable protein tag may be used to capture expressed protein to the protein aggregation bead.

In some embodiments, the capture bead is a capture bead coaed with streptavidin covalently or noncovalently, and the capture moiety comprises a biotin functionality, which can bind the streptavidin of the bead. In some embodiments, except for streptavidin/biotin, other coupling groups can be used, including but not limited to, biotin/avidin, biotin/NeutrAvidin, and digoxygenin/anti-digoxygenin.

Figures 9A, 9B:
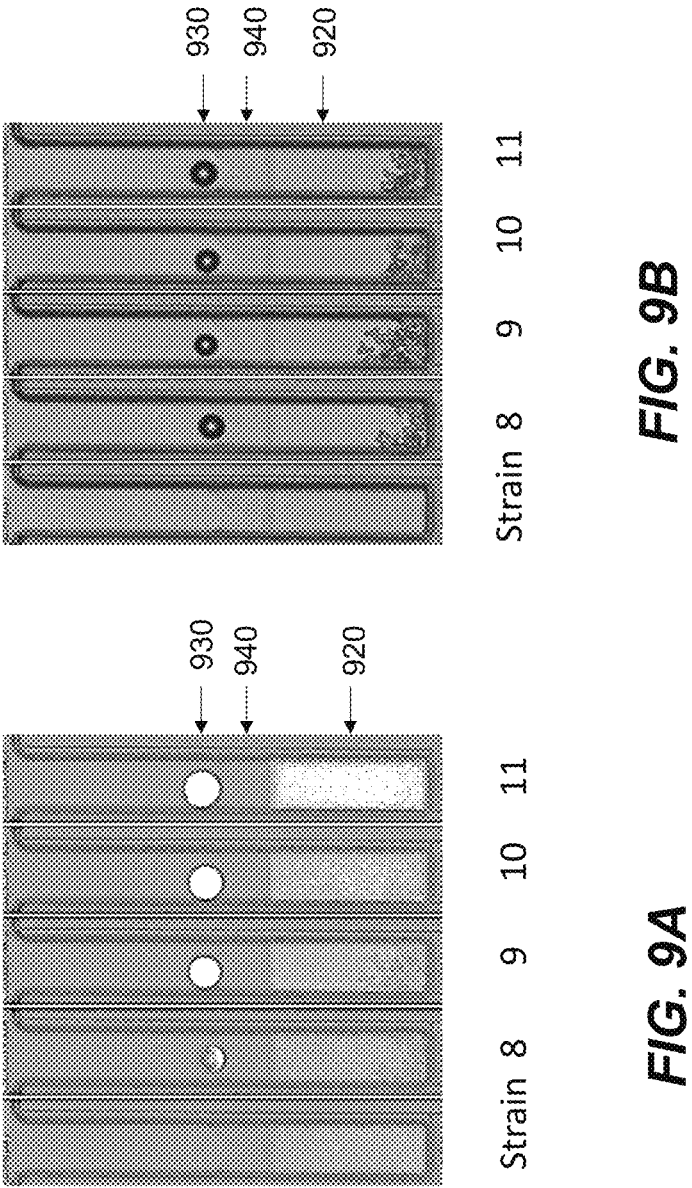
FIGS. 9A to 9B are photographic representations of fluorescent and brightfield images of a bead-based assay according to some embodiments of the disclosure.

FIG. 9A and FIG. 9B shows images of an exemplary bead assay of the present disclosure. FIG. 9A is a fluorescent image, and FIG. 9B is a brightfield image. In this experiment, four strains (Strain 8, Strain 9, Strain 10, Strain 11) were used and their bioproductivities had been predetermined. Their bioproductivities were consistent with the numbering of the strains with Strain 11 being the best producer among the four, and Strain 8 the least productive. An in situ-generated barrier 940 having a v-shaped cap shape, like 640 of FIG. 6A was formed at mid-pen to contain the cells within the enclosed culture area 920. The bead 930 was positioned in the assay area and disposed between the v-shape of the barrier. As shown in the fluorescent FIG. 9A, the bead of Strain 11 exhibited the stronger intensity compared to the others, e.g., had the most reporter molecule labeling captured analyte. The capture bead of Strain 8 had the lowest intensity, which is consistent with the pre-determined bioproductivities. Additionally, it is noticeable that the capture bead of Strain 8 was brighter at the side close to the enclosed culture area in the fluorescence image FIG. 9A, indicating the RMPA was diffusing in the direction from the hydrogel barrier and did not saturate the side of the bead 930 that faces the opening of the chamber to the channel, only slightly shown in these figures.

Signal normalization and correction. The detected signal associated with the detectable label of the report molecule corresponds to the productivity of the micro-object to be evaluated. Generally, signals obtained from cells cultured and evaluated under substantially same conditions can be compared with each other to determine which one of them offers better productivity. In some embodiments, in consideration that the micro-object (e.g., a cell) expanding faster is not necessarily secretes more, the methods of the present disclosure further comprise: normalizing the detected signal associated with the detectable label with the number of the cells existing in the chamber to obtain a relative specific productivity. In some embodiments, the number of the cells is represented by the biomass of the cells. In some embodiments, the biomass is measured before an assay is performed; for example, right before introducing the reporter molecule into the microfluidic device. The biomass can be measured according to the methods described in the present disclosure.

In some embodiments, the signal is further corrected with a reference signal. In those embodiments, the methods of the present disclosure further comprise introducing a reference molecule into the flow region, wherein the reference molecule comprises a second detectable label different from the first detectable label; allowing the reference molecule to diffuse into the chamber; and detecting a reference signal associated with the second detectable label. The reference molecule does not bind the analyte and is used to provide a basic level of signal under the optical and cultural environment within the microfluidic device.

In many embodiments, the reference molecule is preferable to behave similarly as the reporter molecule behaves except that the reference molecule does not bind the secreted analyte. To be more specific, for example, if the reporter molecule enters the cell to be evaluated to bind the analyte, the reference molecule should enter the cell too except that the reference molecule does not bind the secreted analyte. In other examples, if the reporter molecule binds a surface of the cell, the reference molecule should bind to the surface too. In more other examples, if the reporter molecule does not bind or enter the cell, the reference molecule should not interact with the cell either. Moreover, the diffusion rate of the reference molecule in the environment of the chamber is preferable to be similar or substantially the same with that of the reporter molecule. In one of the examples described herein, the reporter molecule is a nanobody of 30 kDa having a globular structure, and the reference molecule is a 10 kDa dextran exhibiting similar diffusion behavior because of its linear structure.

In many embodiments, the second detectable label comprises a visible, luminescent, phosphorescent, or fluorescent detectable label. In some embodiments, the reference molecule is introduced together with the reporter molecule in a fluidic medium. In some embodiments, an image is taken for detecting the signal of the reference molecule after a steady state equilibrium is reached.

Selection. The methods of the present disclosure provide information for selecting or deselecting a micro-object cultured in the microfluidic device based on its productivity. In some embodiments, the microfluidic device comprises a first chamber and a second chamber. In those embodiments, a first micro-object and a second micro-object are disposed into the first chamber and the second chamber respectively, and they are allowed to secret a molecule of interest. A first signal and a second signal are detected respectively. In some embodiments, the first signal and the second signal are compared with each other, and one of the first micro-object and the second micro-object is selected for having a stronger signal, which corresponds to a preferred productivity. In some embodiments, both of the first signal and the second signal are compared with a threshold, and one or both of the first micro-object and the second micro-object are selected if their signals are stronger than the threshold; or none of them is selected if their signals are weaker than the threshold.

The threshold can be determined from a reference micro-object of which the productivity was pre-determined. The reference micro-object might be cultured in another chamber, i.e., a third chamber, of the same microfluidic device, or was cultured in a different microfluidic device under same or substantially the same conditions and has its signal normalized and corrected for comparison.

Methods for performing pH measurement within a microfluidic device. Most living organisms have a tolerable range of pH within which the viability of the organisms can be maintained. Therefore, it is critical to monitor and maintain a culture environment within the range. A pH measurement within a microfluidic device can be performed by forming an in situ-generated hydrogel barrier within the chamber where cells are disposed.

In accordance with various embodiments, methods of monitoring a local pH of a medium spatially distributed within a microfluidic device are provided. Monitoring a local pH, as used herein, refers to monitoring a pH of a medium spatially distributed within a microfluidic device at a selected area of interest (AOI) within the microfluidic device. The microfluidic device can be as described herein having a microfluidic circuit comprising a flow region and a chamber fluidically connected to the flow region. In such embodiments, the local pH refers to a pH of the medium within a selected location within the microfluidic device, for instance, within a particular chamber. Therefore, monitoring a local pH provides valuable information that cannot be obtained when using an integrated pH sensor which can only obtain an overall pH readout of the medium within the microfluidic circuit. In some embodiments, the microfluidic device does not comprise an integrated pH sensor.

Figure 17:
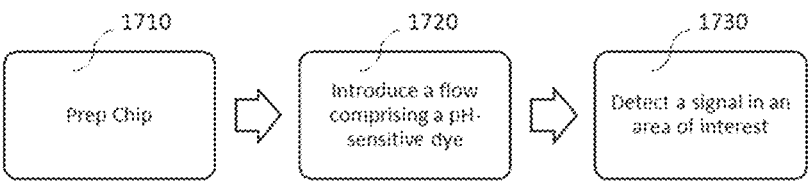
FIG. 17 illustrates a flow chart for an example method of monitoring a local pH of a medium spatially distributed within a microfluidic device.

In accordance with various embodiments, FIG. 17 shows an embodiment of the methods of monitoring a local pH of a medium spatially distributed within a microfluidic device. The microfluidic device for conducting the methods of the present disclosure can comprise an enclosure comprising a flow region and a chamber fluidically connected to the flow region. The method can start with preparation of the microfluidic device (Box 1710) and then comprises introducing a pH-sensitive molecule into the microfluidic device (Box 1720), preferably, into the flow region of the microfluidic device; and detecting a signal associated with the pH-sensitive molecule in an area of interest within the enclosure (Box 1730).

Area of interest for pH measurement. The area of interest (AOI) is an area from which a signal associated with a pH-sensitive molecule is detected. In some embodiments, the signal associated with a pH sensitive molecule is only generated within the area of interest instead of the entire microfluidic device or field of view. For instance, in some embodiments where the pH-sensitive molecule is a fluorescent dye, only the area of interest is exposed to excitatory electromagnetic waves (e.g., light) and is therefore capable of emitting the fluorescent signal. In this way, the background noise resulting from, for example, auto-fluorescence from the microfluidic circuit materials, can be minimized. This is different from a detection using a standard light microscope in which the entire field of view is exposed excitatory electromagnetic waves, resulting in potential widespread emissions of fluorescent signals.

In various embodiments, the area of interest comprises at least a portion of the chamber (e.g., a sequestration pen). In some embodiments, the AOI is within a connection region of a sequestration pen. In some embodiments, the AOI is within an isolation region of the sequestration pen. In some embodiments, the AOI is an area covering the entire chamber.

In general, because the microfluidic circuit materials (the walls or surface of the chamber) might have auto-fluorescent characteristics or surface features of the enclosure of the microfluidic device might interfere with accurate detection, it can be beneficial to have a larger area of interest so that a robust mean intensity can be obtained by minimizing the impacts of the outliers. Preferably, even though a larger AOI may be advantageous, the AOI does not overlay an area of a wall of the chamber and/or an in situ-generated barrier. In some embodiments, the area of interest comprises about 50, 75, 100, 150, 200, 300, 400, 500, 600, 700, 800, 900, 1000, 1100, 1200, 1300, 1400, 1500, 1600, 1700, 1800, 1900, 2000, 2500, 3000, 3500, 4000, 4500, 5000, 5500, 6000, 6500, 7000, 7500, 8000, 8500, 9000, 9500, 10,000, 12,000, 15,000 square microns or any value therebetween. In certain embodiments, the area of interest comprises about 50 to 15,000 square microns, 50 to 10,000 square microns, 50 to 9,000 square microns, 50 to 8,000 square microns, 50 to 7,000 square microns, 50 to 6,000 square microns, 50 to 5,000 square microns, 50 to 3,000 square microns, 50 to 1,500 square microns, 50 to 1,000 square microns, 50 to 500 square microns, 50 to 200 square microns, 200 to 15,000 square microns, 200 to 10,000 square microns, 200 to 9,000 square microns, 200 to 8,000 square microns, 200 to 7,000 square microns, 200 to 6,000 square microns, 200 to 5,000 square microns, 200 to 3,000 square microns, 200 to 1,500 square microns, 200 to 1,000 square microns, 200 to 500 square microns, 700 to 15,000 square microns, 700 to 10,000 square microns, 700 to 9,000 square microns, 700 to 8,000 square microns, 700 to 7,000 square microns, 700 to 6,000 square microns, 700 to 5,000 square microns, 700 to 3,000 square microns, 700 to 1,500 square microns, 700 to 1,000 square microns, or any range defined by two of the foregoing endpoints.

In some embodiments, a boundary of the AOI is distanced from a wall of the chamber. The distance between the boundary and the wall of the chamber can be about 0.1 um, 0.2 um, 0.3 um, 0.4 um, 0.5 um, 0.6 um, 0.7 um, 0.8 um, 0.9 um, 1.0 um, 1.1 um, 1.2 um, 1.3 um, 1.4 um, 1.5 um, 1.6 um, 1.7 um, 1.8 um, 1.9 um, 2.0 um, or any value therebetween. In certain embodiments, the distance is about 0.1 to 2.0 um, 0.5 to 2.0 um, 1.0 to 2.0 um, 1.5 to 2.0 um, 0.1 to 1.5 um, 0.5 to 1.5 um, or 1.0 to 1.5 um.

Detecting the signal associated with the pH-sensitive molecule from an area of interest may comprise obtaining an image of the area of interest and analyzing the image with respect to the area of interest for the signal associated with the pH-sensitive molecule. The image of the area of interest is not limited to only comprise the area of interest. In other words, the image of the area of interest can comprise other areas in the field of view as long as the area of interest is within the image.

Detecting a signal associated with the pH-sensitive molecule from an area of interest is not necessarily limited such that only signal generated within the area of interest is detected. As used herein, "from an area of interest" refers to setting the area of interest as a focal plane for taking the image and for detecting collective signal from a region adjacent thereto. The region can comprise a volume of media, which, in various embodiments, can be presented as an area (i.e., the area of interest), when the chamber has a uniform cross-sectional height along its length. That said, the larger the area, the larger the volume of media. In some embodiments, the collective signal is detected from a region comprising a volume of media of about 5 pL ($5\times10^3$ cubic micron), 10 pL, 15 pL, 20 pL, 25 pL, 30 pL, 35 pL, 40 pL, 45 pL, 50 pL, 60 pL, 70 pL, 80 pL, 90 pL, 100 pL, 150 pL, 200 pL, 250 pL, 300 pL, 350 pL, 400 pL, 450 pL, 500 pL, 600 pL, 700 pL, 800 pL, 900 pL, 1000 pL (1 nL), or more, or any value therebetween. In some embodiments, the collective signal is detected from a region comprising a volume of media of about 5 pL to about 1000 pL, about 10 pL to about 950 pL, about 15 pL to about 900 pL, about 20 pL to about 850 pL, about 25 pL to about 800 pL, about 30 pL to about 750 pL, about 35 pL to about 700 pL, about 40 pL to about 650 pL, about 45 pL to about 600 pL, about 50 pL to about 550 pL, about 60 pL to about 500 pL, about 70 pL to about 450 pL, about 80 pL to about 400 pL, about 90 pL to about 350 pL, about 100 pL to about 300 pL, about 150 pL to about 750 pL, about 200 pL to about 600 pL, about 250 pL to about 500 pL, about 300 pL to about 1000 pL, about 350 pL to about 1000 pL, about 400 pL to about 1000 pL, about 450 pL to about 1000 pL, about 500 pL to about 1000 pL, about 600 pL to about 1000 pL, about 700 pL to about 1000 pL, about 800 pL to about 1000 pL, about 900 pL to about 1000 pL (1 nL), or any range defined by two of the foregoing endpoints.

A microfluidic device used in the present disclosure can have a three-layer structure comprising a cover, a substrate (e.g., a support structure), and a microfluidic circuit structure in between. A chamber can have a height defined in a z-axial direction from the bottom of the cover to the upper surface of the substrate. The area of interest, which is a plane in-focus for taking images and for signal detection, can be set at a mid-level with respect to the height thereby having a larger volume of media adjacent to the area of interest and maximizing the collective signal detected from the area of interest. For example, the area of interest can be set at a depth which substantially bisects the chamber into an upper portion and a bottom portion with respect to the height thereof. In some embodiments, the area of interest can be set at a depth of about 20%, 25%, 30%, 35%, 40%, 45%, 50%, 55%, 60%, 65%, 70%, 75%, 80%, or any value therebetween of the height, wherein 50% is the mid-level of the height. In certain embodiments, the area of interest can be set at a depth of about 20% to 80%, 25% to 75%, 30% to 70%, 40% to 60%, or 45% to 55% of the height of the chamber, or any range defined by two of the foregoing endpoints. In certain embodiments where the chamber has a height of about 30 um to about 50 um, the area of interest can be set at a depth of about 6 um to about 10 um, about 7 um to about 12 um, about 8 um to about 14 um, about 9 um to about 15 um, about 10 um to about 17 um, about 11 um to about 19 um, about 12 um to about 20 um, about 13 um to about 22 um, about 14 um to about 21 um, about 15 um to about 25 um, about 16 um to about 27 um, about 17 to about 28 um, about 18 um to about 30 um, or any range defined by two of the foregoing endpoints.

Figure 18A:
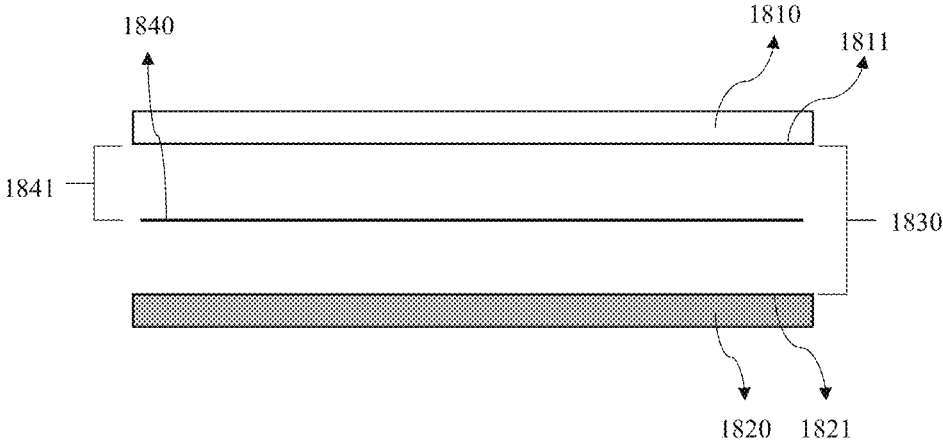
FIG. 18A is a schematic representation of a cross-section view of a chamber showing a height of the chamber and a depth of the area of interest.

For example, FIG. 18A is a schematic representation of a cross-section view of a chamber showing a height of the chamber and a depth of the area of interest. The chamber has a height 1830 defined from a bottom 1811 of a cover 1810 and a surface 1821 of a substrate 1820. The area of interest 1840 has a depth 1841 of about 50% of the height 1830.

In some embodiments where a micro-object (e.g., a cell) is disposed in the chamber, the area of interest can be set at a depth so that the area of interest does not comprise the location of the micro-object. In other embodiments, the area of interest can be set at a depth so that the area of interest keeps a distance from the location of the micro-object. The location of the micro-object is with respect to the z-axis direction in this consideration and can be defined as an imaging depth used for cell detection in a brightfield image. For example, while a cell disposed in the chamber tends to rest on the surface of the substrate, the area of interest can be set at a depth that is 1 um, 2 um, 3 um, 4 um, 5 um, 6 um, 7 um, 8 um, 9 um, 10 um, 12 um, 14 um, 16 um, 18 um, 20 um, 22 um, 24 um, 26 um, or 28 um, or any value therebetween, or 1 um to 28 um, 2 to 26 um, 5 um to 20 um, 5 um to 16 um, or 10 um to 20 um offset from an imaging depth for cell detection in a brightfield image.

Figure 18B:
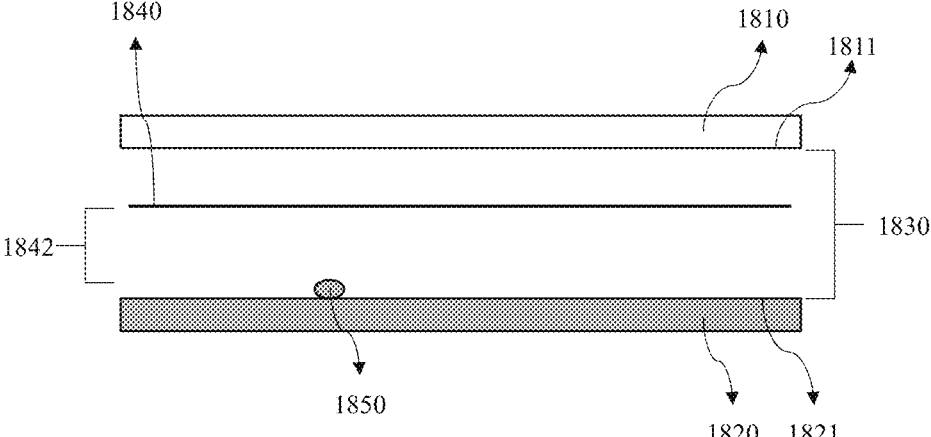
FIG. 18B is another schematic representation of a cross-section view of a chamber having a micro-object disposed therewithin showing a height of the chamber and a depth of the area of interest.

For example, FIG. 18B is a schematic representation of a cross-section view of a chamber showing a height of the chamber and a depth of the area of interest. The chamber has a height 1830 defined from a bottom 1811 of a cover 1810 and a surface 1821 of a substrate 1820. In addition, the chamber has a micro-object 1850 disposed therewithin. The area of interest 1840 has a depth 1841 offset from an imaging depth for cell detection in a brightfield image.

In accordance with various embodiments, the pH measurement is mainly performed to monitor the pH value of the media spatially distributed within the chamber and the microfluidic device. The perfusion of the medium comprising the pH-sensitive molecule is continued throughout the measurement, and a in situ-generated barrier (as will be described in further detail in following paragraphs) is formed within the chamber to define a culture area and an assay area. In this mode, the area of interest can be within and smaller than the assay area. In certain embodiments, the area of interest comprises 30%, 35%, 40%, 45%, 50%, 55%, 60%, 65%, 70%, 75%, 80%, 85%, 90%, 95%, or 100%, or any value therebetween of the assay area (e.g., a horizonal cross-sectional area of the assay area). In certain embodiments, the area of interest comprises 30% to 100%, 40% to 100%, 50% to 100%, 60% to 100%, 70% to 100%, 80% to 100%, 30% to 90%, 40% to 90%, 50% to 90%, 60% to 90%, 70% to 90%, 80% to 90%, 30% to 80%, 40% to 80%, 50% to 80%, 60% to 80%, 70% to 80%, 30% to 70%, 40% to 70%, 50% to 70%, or 60% to 70% of the assay area (e.g., a horizonal cross sectional area of the assay area).

In some embodiments, the assay area is located proximal to the in situ-generated barrier, between the in situ-generated barrier and a distal end of the chamber, and the culture area is located proximal to the other side of the in situ-generated barrier, between the in situ-generated barrier and the proximal opening of the chamber. For example, as shown in FIG. 19A and FIG. 19B, a microfluidic channel 1901 and a sequestration pen 1902 are illustrated. The sequestration pen 1902 has a proximal opening 1903 to the microfluidic channel 1901. An in situ-generated barrier 1910 was formed within the sequestration pen 1902 to divide it into a culture area 1904 and an assay area 1905. The assay area 1905 is located at a distal side of the in situ-generated barrier 1910, and the culture area 1904 is located to the other side of the in situ-generated barrier 1910, closer to the proximal opening 1903 of the sequestration pen 1902. As a result, the in situ-generated barrier 1910 can separate the culture area 1904 and a micro-object maintained therein from the distal end of the sequestration pen 1902 (See FIG. 19C).

pH-sensitive molecule. The pH-sensitive molecule used herein is referred to a molecule that is able to provide, directly or indirectly, a detectable signal or change in signal reflecting a pH condition of an environment. For example, the pH-sensitive molecule can be a pH indicator that significantly increase in fluorescence as the pH of its environment becomes more acidic. In other words, in such examples, the stronger the signal, the more acid the environment is. Given that acidification of the media can be resulted from metabolism of a biological micro-object cultured within that environment, a more acidic media can indicate a more robust metabolism. In certain embodiments that the biological micro-object is cultured to produce a molecule of interest, a more acid media can suggest a higher productivity.

Preferably, the pH-sensitive molecule is soluble and/or diffusible in a fluidic medium perfused to introduce the pH-sensitive molecule into the microfluidic device or any fluidic medium within the enclosure of the microfluidic device. In some embodiments, the pH-sensitive molecule is a fluorescent dye, and a signal associated with the pH-sensitive molecule is referred to a signal (e.g., a fluorescent signal) emitted by the pH-sensitive molecule. In some embodiments, the pH-sensitive molecule is an acidotropic dye. In some embodiments, the pH-sensitive molecule is soluble and diffusible in a medium spatially distributed within an environment to be monitored. In certain embodiments, the pH-sensitive molecule is responsive to a pH range from 1 to 9, 2 to 8, 3 to 7, or 3 to 6.

In some embodiments, introducing the pH-sensitive molecule into the microfluidic device comprises: introducing the pH-sensitive molecule into the flow region and allowing the pH-sensitive molecule to diffuse into the chamber. In certain embodiments, the pH-sensitive molecule is introduced within a fluidic medium. In such embodiments, introducing the pH-sensitive molecule into the microfluidic device comprises perfusing the fluidic medium comprising the pH-sensitive molecule through the flow region. In some embodiments, the perfusion of the fluidic medium comprising the pH-sensitive molecule can be stopped while detecting the signal associated with the pH-sensitive molecule.

In some embodiments, the fluidic medium is a culture medium for maintaining a biological micro-object within the microfluidic device. The fluidic medium can also be a medium that is configured to induce a biological micro-object maintained in the chamber to produce a biomolecule of interest. In some embodiments, the fluidic medium has a buffer at a concentration of about 0 M, 0.1 M, 0.2 M, 0.3 M, 0.4 M, 0.5 M, 0.6 M, 0.7 M, 0.8 M, 0.9 M, 1.0 M, 1.2 M, 1.4 M, 1.6 M, 1.8 M, 2.0 M, 5M, or any value therebetween. The buffer is not limited and can include a citrate buffer or a phosphate buffer. In certain embodiments, the fluidic medium can be non-buffered.

In certain embodiments, the pH-sensitive molecule is allowed to reach an equilibrated concentration across the flow region and the chamber before detecting the signal associated with the pH-sensitive molecule. Reaching an equilibrium concentration across the flow region and the chamber is referred to as a situation where the difference in concentration between the flow region and the chamber(s) is insignificant (e.g., the concentration in the flow region and the concentration is substantially the same). However, the method does not require that the concentration of the pH-sensitive molecule reaches equilibrium throughout the flow region and chamber(s), but may be performed at any time point when the reagent has reached a concentration that is sufficient to permit detection.

In accordance with various embodiments, the fluidic medium for introducing the pH-sensitive molecule is flowed at a flow rate of at least about 0.1 microliters per second (uL/s), 0.2 uL/s, 0.3 uL/s, 0.4 uL/s, 0.5 uL/s, 0.6 uL/s, 0.7 uL/s, 0.8 uL/s, 0.9 uL/s, 1 uL/s, 2 uL/s, 3 uL/s, 4 uL/s, 5 uL/s, 6 uL/s, 7 uL/s, 8 uL/s, 9 uL/s, 10 uL/s, or more. In accordance with various embodiments, the fluidic medium is flowed at a flow rate of at most about 10 uL/s, 9 uL/s, 8 uL/s, 7 uL/s, 6 uL/s, 5 uL/s, 4 uL/s, 3 uL/s, 2 uL/s, 1 uL/s, 0.9 uL/s, 0.8 uL/s, 0.7 uL/s, 0.6 uL/s, 0.5 uL/s, 0.4 uL/s, 0.3 uL/s, 0.2 uL/s, 0.1 uL/s, or less. In accordance with various embodiments, the fluidic medium is flowed at a flow rate ranging between any two of the preceding values. In accordance with various embodiments, the fluidic medium is flowed at a flow rate ranging between 0.1 microliter/s and 10 microliters/s.

In some specific embodiments, the pH-sensitive molecule includes but not limited to LysoSensor™, LysoTracker™ probe, or pHrodo™. Any suitable pH-sensitive molecule, as is known in the art, may be used.

Kit. In light of the foregoing, a kit for performing an assay upon a cell is provided to perform the methods of the present disclosure. The kit comprises a flowable polymer, e.g., a prepolymer configured to be controllably activated to form an in situ-generated barrier comprising a solidified polymer network, wherein the in situ-generated barrier has a porosity that substantially prevents the cell from crossing through the in situ-generated barrier. The kit may further include an inhibitor. The inhibitor may be packaged integrally with the flowable polymer, or may be packaged separately. In some other embodiments, the kit may include a first instance of the inhibitor packaged integrally with the flowable polymer and a second instance of the inhibitor packaged separately. In some other embodiments, the kit may further include an initiator.

In some variations, the kit further comprises a reporter molecule comprising a first detectable label and a binding component configured to bind an analyte secreted by a cell to form a reporter molecule: secreted analyte complex (RMPA complex).

In some embodiments, the kit further comprises a reference molecule comprising a second detectable label different from the first detectable label, and further wherein the reference molecule does not bind the analyte. The reference molecule is as described above.

In some embodiments, the kit further comprises a microfluidic device comprising a microfluidic circuit comprising a flow region and a chamber, wherein the chamber comprises an opening to the flow region. The microfluidic device can be any microfluidic device as described herein.

Microfluidic device/system feature cross-applicability. It should be appreciated that various features of microfluidic devices, systems, and motive technologies described herein may be combinable or interchangeable. For example, features described herein with reference to the microfluidic device 100, 175, 200, 300, 320, 400, 450, 520 and system attributes as described in FIGS. 1A-5B may be combinable or interchangeable.

Microfluidic devices. FIG. 1A illustrates an example of a microfluidic device 100. A perspective view of the microfluidic device 100 is shown having a partial cut-away of its cover 110 to provide a partial view into the microfluidic device 100. The microfluidic device 100 generally comprises a microfluidic circuit 120 comprising a flow path 106 through which a fluidic medium 180 can flow, optionally carrying one or more micro-objects (not shown) into and/or through the microfluidic circuit 120.

As generally illustrated in FIG. 1A, the microfluidic circuit 120 is defined by an enclosure 102. Although the enclosure 102 can be physically structured in different configurations, in the example shown in FIG. 1A the enclosure 102 is depicted as comprising a support structure 104 (e.g., a base), a microfluidic circuit structure 108, and a cover 110. The support structure 104, microfluidic circuit structure 108, and cover 110 can be attached to each other. For example, the microfluidic circuit structure 108 can be disposed on an inner surface 109 of the support structure 104, and the cover 110 can be disposed over the microfluidic circuit structure 108. Together with the support structure 104 and cover 110, the microfluidic circuit structure 108 can define the elements of the microfluidic circuit 120, forming a three-layer structure.

The support structure 104 can be at the bottom and the cover 110 at the top of the microfluidic circuit 120 as illustrated in FIG. 1A. Alternatively, the support structure 104 and the cover 110 can be configured in other orientations. For example, the support structure 104 can be at the top and the cover 110 at the bottom of the microfluidic circuit 120. Regardless, there can be one or more ports 107 each comprising a passage into or out of the enclosure 102. Examples of a passage include a valve, a gate, a pass-through hole, or the like. As illustrated, port 107 is a pass-through hole created by a gap in the microfluidic circuit structure 108. However, the port 107 can be situated in other components of the enclosure 102, such as the cover 110. Only one port 107 is illustrated in FIG. 1A but the microfluidic circuit 120 can have two or more ports 107. For example, there can be a first port 107 that functions as an inlet for fluid entering the microfluidic circuit 120, and there can be a second port 107 that functions as an outlet for fluid exiting the microfluidic circuit 120. Whether a port 107 function as an inlet or an outlet can depend upon the direction that fluid flows through flow path 106.

The support structure 104 can comprise one or more electrodes (not shown) and a substrate or a plurality of interconnected substrates. For example, the support structure 104 can comprise one or more semiconductor substrates, each of which is electrically connected to an electrode (e.g., all or a subset of the semiconductor substrates can be electrically connected to a single electrode). The support structure 104 can further comprise a printed circuit board assembly ("PCBA"). For example, the semiconductor substrate(s) can be mounted on a PCBA.

The microfluidic circuit structure 108 can define circuit elements of the microfluidic circuit 120. Such circuit elements can comprise spaces or regions that can be fluidly interconnected when microfluidic circuit 120 is filled with fluid, such as flow regions (which may include or be one or more flow channels), chambers (which class of circuit elements may also include sub-classes including sequestration pens), traps, and the like. Circuit elements can also include barriers, and the like. In the microfluidic circuit 120 illustrated in FIG. 1A, the microfluidic circuit structure 108 comprises a frame 114 and a microfluidic circuit material 116. The frame 114 can partially or completely enclose the microfluidic circuit material 116. The frame 114 can be, for example, a relatively rigid structure substantially surrounding the microfluidic circuit material 116. For example, the frame 114 can comprise a metal material. However, the microfluidic circuit structure need not include a frame 114. For example, the microfluidic circuit structure can consist of (or consist essentially of) the microfluidic circuit material 116.

The microfluidic circuit material 116 can be patterned with cavities or the like to define the circuit elements and interconnections of the microfluidic circuit 120, such as chambers, pens and microfluidic channels. The microfluidic circuit material 116 can comprise a flexible material, such as a flexible polymer (e.g., rubber, plastic, elastomer, silicone, polydimethylsiloxane ("PDMS"), or the like), which can be gas permeable. Other examples of materials that can form the microfluidic circuit material 116 include molded glass, an etchable material such as silicone (e.g., photo-patternable silicone or "PPS"), photoresist (e.g., SU8), or the like. In some embodiments, such materials—and thus the microfluidic circuit material 116—can be rigid and/or substantially impermeable to gas. Regardless, microfluidic circuit material 116 can be disposed on the support structure 104 and inside the frame 114.

The microfluidic circuit 120 can include a flow region in which one or more chambers can be disposed and/or fluidically connected thereto. A chamber can have one or more openings fluidically connecting the chamber with one or more flow regions. In some embodiments, a flow region comprises or corresponds to a microfluidic channel 122. Although a single microfluidic circuit 120 is illustrated in FIG. 1A, suitable microfluidic devices can include a plurality (e.g., 2 or 3) of such microfluidic circuits. In some embodiments, the microfluidic device 100 can be configured to be a nanofluidic device. As illustrated in FIG. 1A, the microfluidic circuit 120 may include a plurality of microfluidic sequestration pens 124, 126, 128, and 130, where each sequestration pens may have one or more openings. In some embodiments of sequestration pens, a sequestration pen may have only a single opening in fluidic communication with the flow path 106. In some other embodiments, a sequestration pen may have more than one opening in fluidic communication with the flow path 106, e.g., n number of openings, but with n−1 openings that are valved, such that all but one opening is closable. When all the valved openings are closed, the sequestration pen limits exchange of materials from the flow region into the sequestration pen to occur only by diffusion. In some embodiments, the sequestration pens comprise various features and structures (e.g., isolation regions) that have been optimized for retaining micro-objects within the sequestration pen (and therefore within a microfluidic device such as microfluidic device 100) even when a medium 180 is flowing through the flow path 106.

The cover 110 can be an integral part of the frame 114 and/or the microfluidic circuit material 116. Alternatively, the cover 110 can be a structurally distinct element, as illustrated in FIG. 1A. The cover 110 can comprise the same or different materials than the frame 114 and/or the microfluidic circuit material 116. In some embodiments, the cover 110 can be an integral part of the microfluidic circuit material 116. Similarly, the support structure 104 can be a separate structure from the frame 114 or microfluidic circuit material 116 as illustrated, or an integral part of the frame 114 or microfluidic circuit material 116. Likewise, the frame 114 and microfluidic circuit material 116 can be separate structures as shown in FIG. 1A or integral portions of the same structure. Regardless of the various possible integrations, the microfluidic device can retain a three-layer structure that includes a base layer and a cover layer that sandwich a middle layer in which the microfluidic circuit 120 is located.

In some embodiments, the cover 110 can comprise a rigid material. The rigid material may be glass or a material with similar properties. In some embodiments, the cover 110 can comprise a deformable material. The deformable material can be a polymer, such as PDMS. In some embodiments, the cover 110 can comprise both rigid and deformable materials. For example, one or more portions of cover 110 (e.g., one or more portions positioned over sequestration pens 124, 126, 128, 130) can comprise a deformable material that interfaces with rigid materials of the cover 110. Microfluidic devices having covers that include both rigid and deformable materials have been described, for example, in U.S. Pat. No. 10,058,865 (Breinlinger et al.), the contents of which are incorporated herein by reference. In some embodiments, the cover 110 can further include one or more electrodes. The one or more electrodes can comprise a conductive oxide, such as indium-tin-oxide (ITO), which may be coated on glass or a similarly insulating material. Alternatively, the one or more electrodes can be flexible electrodes, such as single-walled nanotubes, multi-walled nanotubes, nanowires, clusters of electrically conductive nanoparticles, or combinations thereof, embedded in a deformable material, such as a polymer (e.g., PDMS). Flexible electrodes that can be used in microfluidic devices have been described, for example, in U.S. Pat. No. 9,227,200 (Chiou et al.), the contents of which are incorporated herein by reference. In some embodiments, the cover 110 and/or the support structure 104 can be transparent to light. The cover 110 may also include at least one material that is gas permeable (e.g., PDMS or PPS).

In the example shown in FIG. 1A, the microfluidic circuit 120 is illustrated as comprising a microfluidic channel 122 and sequestration pens 124, 126, 128, 130. Each pen comprises an opening to channel 122, but otherwise is enclosed such that the pens can substantially isolate micro-objects inside the pen from fluidic medium 180 and/or micro-objects in the flow path 106 of channel 122 or in other pens. The walls of the sequestration pen extend from the inner surface 109 of the base to the inside surface of the cover 110 to provide enclosure. The opening of the sequestration pen to the microfluidic channel 122 is oriented at an angle to the flow 106 of fluidic medium 180 such that flow 106 is not directed into the pens. The vector of bulk fluid flow in channel 122 may be tangential or parallel to the plane of the opening of the sequestration pen, and is not directed into the opening of the pen. In some instances, pens 124, 126, 128, 130 are configured to physically isolate one or more micro-objects within the microfluidic circuit 120. Sequestration pens in accordance with the present disclosure can comprise various shapes, surfaces and features that are optimized for use with DEP, OET, OEW, fluid flow, magnetic forces, centripetal, and/or gravitational forces, as will be discussed and shown in detail below.

The microfluidic circuit 120 may comprise any number of microfluidic sequestration pens. Although five sequestration pens are shown, microfluidic circuit 120 may have fewer or more sequestration pens. As shown, microfluidic sequestration pens 124, 126, 128, and 130 of microfluidic circuit 120 each comprise differing features and shapes which may provide one or more benefits useful for maintaining, isolating, assaying or culturing biological micro-objects. In some embodiments, the microfluidic circuit 120 comprises a plurality of identical microfluidic sequestration pens.

Figure 1B:
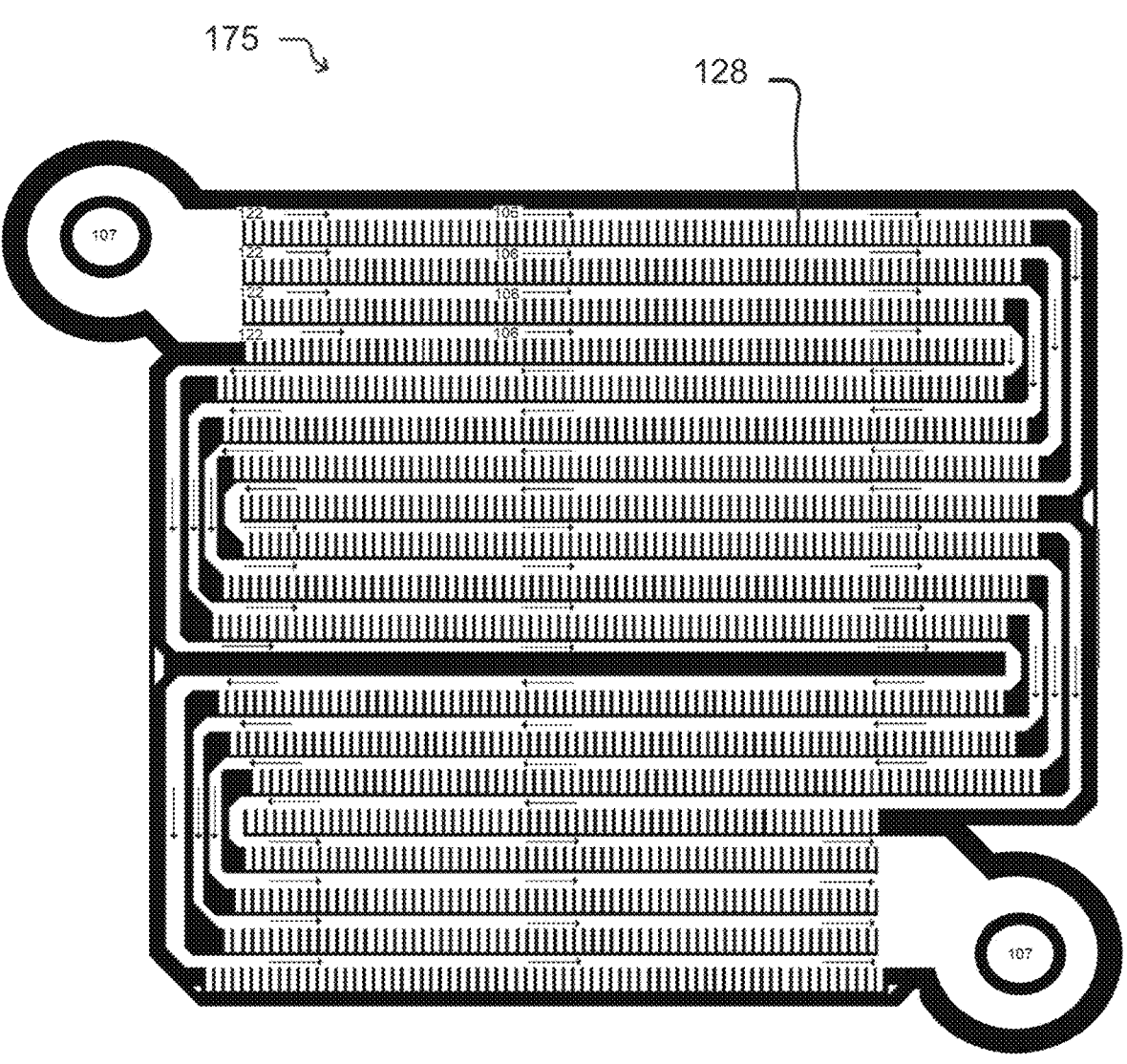
FIG. 1B illustrates a microfluidic device with sequestration pens according to an embodiment of the disclosure.

In the embodiment illustrated in FIG. 1A, a single flow path 106 containing a single channel 122 is shown. However, other embodiments may contain multiple channels 122 within a single flow path 106, as shown in FIG. 1B. The microfluidic circuit 120 further comprises an inlet valve or port 107 in fluid communication with the flow path 106, whereby fluidic medium 180 can access the flow path 106 (and channel 122). In some instances, the flow path 106 comprises a substantially straight path. In other instances, the flow path 106 is arranged in a non-linear or winding manner, such as a zigzag pattern, whereby the flow path 106 travels across the microfluidic device 100 two or more times, e.g., in alternating directions. The flow in the flow path 106 may proceed from inlet to outlet or may be reversed and proceed from outlet to inlet.

One example of a multi-channel device, microfluidic device 175, is shown in FIG. 1B, which may be like microfluidic device 100 in other respects. Microfluidic device 175 and its constituent circuit elements (e.g., channels 122 and sequestration pens 128) may have any of the dimensions discussed herein. The microfluidic circuit illustrated in FIG. 1B has two inlet/outlet ports 107 and a flow path 106 containing four distinct channels 122. The number of channels into which the microfluidic circuit is sub-divided may be chosen to reduce fluidic resistance. For example, the microfluidic circuit may include 1, 2, 3, 4, 5, 6, 7, 8, 9, 10, or more channels to provide a selected range of fluidic resistance. Microfluidic device 175 further comprises a plurality of sequestration pens opening off of each channel 122, where each of the sequestration pens is similar to sequestration pen 128 of FIG. 1A, and may have any of the dimensions or functions of any sequestration pen as described herein. However, the sequestration pens of microfluidic device 175 can have different shapes, such as any of the shapes of sequestration pens 124, 126, or 130 of FIG. 1A or as described anywhere else herein. Moreover, microfluidic device 175 can include sequestration pens having a mixture of different shapes. In some instances, a plurality of sequestration pens is configured (e.g., relative to a channel 122) such that the sequestration pens can be loaded with target micro-objects in parallel.

Returning to FIG. 1A, microfluidic circuit 120 further may include one or more optional micro-object traps 132. The optional traps 132 may be formed in a wall forming the boundary of a channel 122, and may be positioned opposite an opening of one or more of the microfluidic sequestration pens 124, 126, 128, 130. The optional traps 132 may be configured to receive or capture a single micro-object from the flow path 106, or may be configured to receive or capture a plurality of micro-objects from the flow path 106. In some instances, the optional traps 132 comprise a volume approximately equal to the volume of a single target micro-object. In some instances, the trap 132 comprises a side passage 134 that is smaller than the target micro-object in order to facilitate flow through the trap 132.

Sequestration pens. The microfluidic devices described herein may include one or more sequestration pens, where each sequestration pen is suitable for holding one or more micro-objects (e.g., biological cells, or groups of cells that are associated together). The sequestration pens may be disposed within and open to a flow region, which in some embodiments is a microfluidic channel. Each of the sequestration pens can have one or more openings for fluidic communication to one or more microfluidic channels. In some embodiments, a sequestration pen may have only one opening to a microfluidic channel.

Figure 2A:
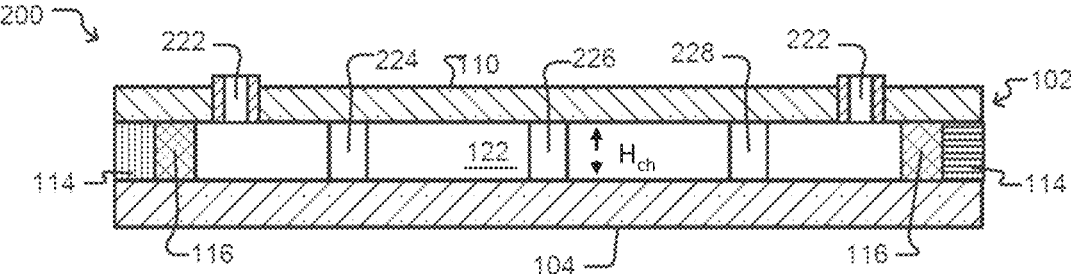
FIGS. 2A to 2B illustrate a microfluidic device having sequestration pens according to some embodiments of the disclosure.
Figure 2B:
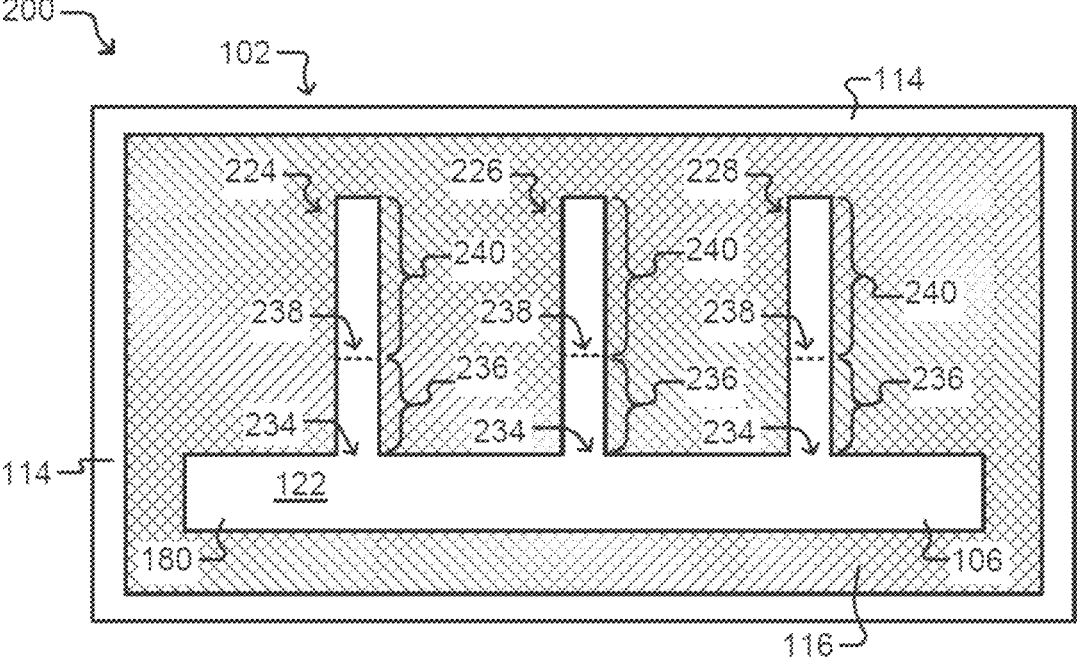
Figure 2C:
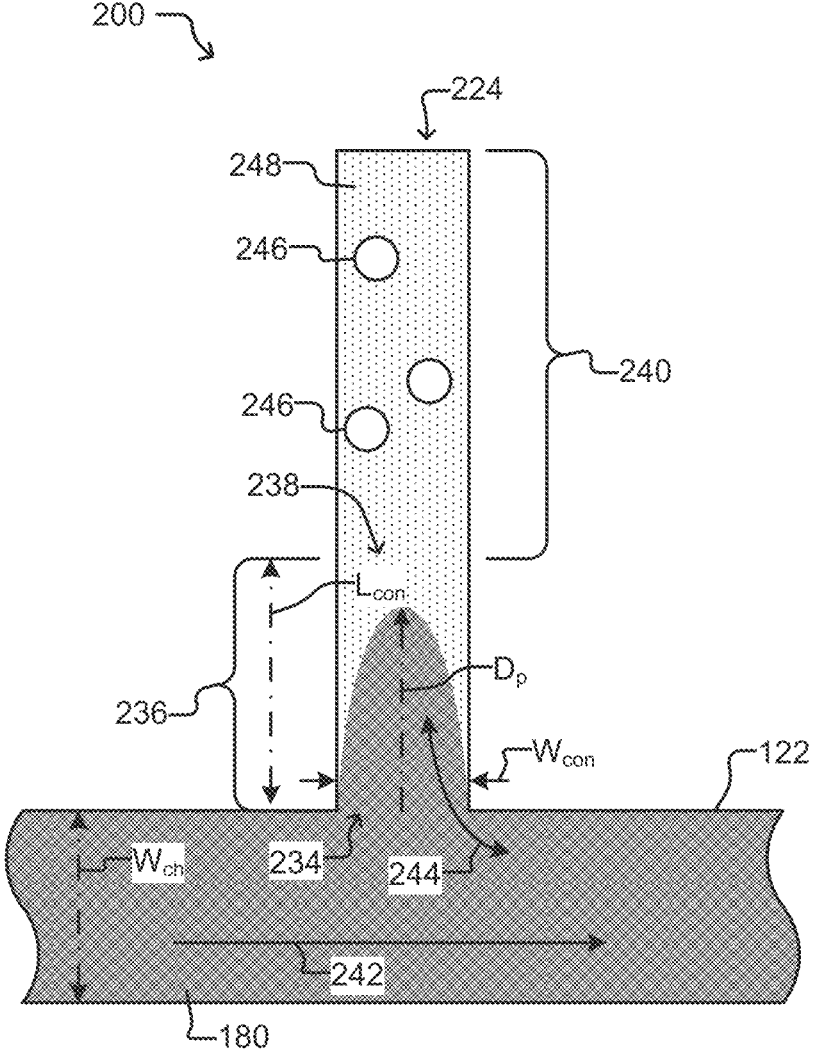
FIG. 2C illustrates a sequestration pen of a microfluidic device according to some embodiments of the disclosure.

FIGS. 2A-2C show sequestration pens 224, 226, and 228 of a microfluidic device 200, which may be like sequestration pen 128 of FIG. 1A. Each sequestration pen 224, 226, and 228 can comprise an isolation region 240 and a connection region 236 fluidically connecting the isolation region 240 to a flow region, which may, in some embodiments include a microfluidic channel, such as channel 122. The connection region 236 can comprise a proximal opening 234 to the flow region (e.g., microfluidic channel 122) and a distal opening 238 to the isolation region 240. The connection region 236 can be configured so that the maximum penetration depth of a flow of a fluidic medium (not shown) flowing in the microfluidic channel 122 past the sequestration pen 224, 226, and 228 does not extend into isolation region 240, as discussed below for FIG. 2C. In some embodiments, streamlines from the flow in the microfluidic channel do not enter the isolation region. Thus, due to the connection region 236, a micro-object (not shown) or other material (not shown) disposed in the isolation region 240 of a sequestration pen 224, 226, and 228 can be isolated from, and not substantially affected by, a flow of fluidic medium 180 in the microfluidic channel 122.

The sequestration pens 224, 226, and 228 of FIGS. 2A-2C each have a single opening which opens directly to the microfluidic channel 122. The opening of the sequestration pen may open laterally from the microfluidic channel 122, as shown in FIG. 2A, which depicts a vertical cross-section of microfluidic device 200. FIG. 2B shows a horizontal cross-section of microfluidic device 200. An electrode activation substrate 206 can underlie both the microfluidic channel 122 and the sequestration pens 224, 226, and 228. The upper surface of the electrode activation substrate 206 within an enclosure of a sequestration pen, forming the floor of the sequestration pen, can be disposed at the same level or substantially the same level of the upper surface the of electrode activation substrate 206 within the microfluidic channel 122 (or flow region if a channel is not present), forming the floor of the flow channel (or flow region, respectively) of the microfluidic device. The electrode activation substrate 206 may be featureless or may have an irregular or patterned surface that varies from its highest elevation to its lowest depression by less than about 3 micrometers (microns), 2.5 microns, 2 microns, 1.5 microns, 1 micron, 0.9 microns, 0.5 microns, 0.4 microns, 0.2 microns, 0.1 microns or less. The variation of elevation in the upper surface of the substrate across both the microfluidic channel 122 (or flow region) and sequestration pens may be equal to or less than about 10%, 7%, 5%, 3%, 2%, 1%, 0.9%, 0.8%, 0.5%, 0.3% or 0.1% of the height of the walls of the sequestration pen. Alternatively, the variation of elevation in the upper surface of the substrate across both the microfluidic channel 122 (or flow region) and sequestration pens may be equal to or less than about 2%, 1%. 0.9%, 0.8%, 0.5%, 0.3%, 0.2%, or 0.1% of the height of the substrate. While described in detail for the microfluidic device 200, this may also apply to any of the microfluidic devices described herein.

The microfluidic channel 122 and connection region 236 can be examples of swept regions, and the isolation regions 240 of the sequestration pens 224, 226, and 228 can be examples of unswept regions. Sequestration pens like 224, 226, 228 have isolation regions wherein each isolation region has only one opening, which opens to the connection region of the sequestration pen. Fluidic media exchange in and out of the isolation region so configured can be limited to occurring substantially only by diffusion. As noted, the microfluidic channel 122 and sequestration pens 224, 226, and 228 can be configured to contain one or more fluidic media 180. In the example shown in FIGS. 2A-2B, ports 222 are connected to the microfluidic channel 122 and allow the fluidic medium 180 to be introduced into or removed from the microfluidic device 200. Prior to introduction of the fluidic medium 180, the microfluidic device may be primed with a gas such as carbon dioxide gas. Once the microfluidic device 200 contains the fluidic medium 180, the flow 242 (see FIG. 2C) of fluidic medium 180 in the microfluidic channel 122 can be selectively generated and stopped. For example, as shown, the ports 222 can be disposed at different locations (e.g., opposite ends) of the flow region (microfluidic channel 122), and a flow 242 of the fluidic medium can be created from one port 222 functioning as an inlet to another port 222 functioning as an outlet.

FIG. 2C illustrates a detailed view of an example of a sequestration pen 224, which may contain one or more micro-objects 246, according to some embodiments. The flow 242 of fluidic medium 180 in the microfluidic channel 122 past the proximal opening 234 of the connection region 236 of sequestration pen 224 can cause a secondary flow 244 of the fluidic medium 180 into and out of the sequestration pen 224. To sequester the micro-objects 246 in the isolation region 240 of the sequestration pen 224 from the secondary flow 244, the length $L_{con}$ of the connection region 236 of the sequestration pen 224 (i.e., from the proximal opening 234 to the distal opening 238) should be greater than the penetration depth $D_p$ of the secondary flow 244 into the connection region 236. The penetration depth $D_p$ depends upon a number of factors, including the shape of the microfluidic channel 122, which may be defined by a width $W_{con}$ of the connection region 236 at the proximal opening 234; a width $W_{ch}$ of the microfluidic channel 122 at the proximal opening 234; a height $H_{ch}$ of the channel 122 at the proximal opening 234; and the width of the distal opening 238 of the connection region 236. Of these factors, the width $W_{con}$ of the connection region 236 at the proximal opening 234 and the height $H_{ch}$ of the channel 122 at the proximal opening 234 tend to be the most significant. In addition, the penetration depth $D_p$ can be influenced by the velocity of the fluidic medium 180 in the channel 122 and the viscosity of fluidic medium 180. However, these factors (i.e., velocity and viscosity) can vary widely without dramatic changes in penetration depth $D_p$. For example, for a microfluidic chip 200 having a width $W_{con}$ of the connection region 236 at the proximal opening 234 of about 50 microns, a height $H_{ch}$ of the channel 122 at the proximal opening 122 of about 40 microns, and a width $W_{ch}$ of the microfluidic channel 122 at the proximal opening 122 of about 100 microns to about 150 microns, the penetration depth $D_p$ of the secondary flow 244 ranges from less than 1.0 times $W_{con}$ (i.e., less than 50 microns) at a flow rate of 0.1 microliters/sec to about 2.0 times $W_{con}$ (i.e., about 100 microns) at a flow rate of 20 microliters/sec, which represents an increase in $D_p$ of only about 2.5-fold over a 200-fold increase in the velocity of the fluidic medium 180.

In some embodiments, the walls of the microfluidic channel 122 and sequestration pen 224, 226, or 228 can be oriented as follows with respect to the vector of the flow 242 of fluidic medium 180 in the microfluidic channel 122: the microfluidic channel width $W_{ch}$ (or cross-sectional area of the microfluidic channel 122) can be substantially perpendicular to the flow 242 of medium 180; the width $W_{con}$ (or cross-sectional area) of the connection region 236 at opening 234 can be substantially parallel to the flow 242 of medium 180 in the microfluidic channel 122; and/or the length $L_{con}$ of the connection region can be substantially perpendicular to the flow 242 of medium 180 in the microfluidic channel 122. The foregoing are examples only, and the relative position of the microfluidic channel 122 and sequestration pens 224, 226 and 228 can be in other orientations with respect to each other.

In some embodiments, for a given microfluidic device, the configurations of the microfluidic channel 122 and the opening 234 may be fixed, whereas the rate of flow 242 of fluidic medium 180 in the microfluidic channel 122 may be variable. Accordingly, for each sequestration pen 224, a maximal velocity $V_{max}$ for the flow 242 of fluidic medium 180 in channel 122 may be identified that ensures that the penetration depth $D_p$ of the secondary flow 244 does not exceed the length $L_{con}$ of the connection region 236. When $V_{max}$ is not exceeded, the resulting secondary flow 244 can be wholly contained within the connection region 236 and does not enter the isolation region 240. Thus, the flow 242 of fluidic medium 180 in the microfluidic channel 122 (swept region) is prevented from drawing micro-objects 246 out of the isolation region 240, which is an unswept region of the microfluidic circuit, resulting in the micro-objects 246 being retained within the isolation region 240. Accordingly, selection of microfluidic circuit element dimensions and further selection of the operating parameters (e.g., velocity of fluidic medium 180) can prevent contamination of the isolation region 240 of sequestration pen 224 by materials from the microfluidic channel 122 or another sequestration pen 226 or 228. It should be noted, however, that for many microfluidic chip configurations, there is no need to worry about $V_{max}$ per se, because the chip will break from the pressure associated with flowing fluidic medium 180 at high velocity through the chip before $V_{max}$ can be achieved.

Components (not shown) in the first fluidic medium 180 in the microfluidic channel 122 can mix with the second fluidic medium 248 in the isolation region 240 substantially only by diffusion of components of the first medium 180 from the microfluidic channel 122 through the connection region 236 and into the second fluidic medium 248 in the isolation region 240. Similarly, components (not shown) of the second medium 248 in the isolation region 240 can mix with the first medium 180 in the microfluidic channel 122 substantially only by diffusion of components of the second medium 248 from the isolation region 240 through the connection region 236 and into the first medium 180 in the microfluidic channel 122. In some embodiments, the extent of fluidic medium exchange between the isolation region of a sequestration pen and the flow region by diffusion is greater than about 90%, 91%, 92%, 93%, 94% 95%, 96%, 97%, 98%, or greater than about 99% of fluidic exchange.

In some embodiments, the first medium 180 can be the same medium or a different medium than the second medium 248. In some embodiments, the first medium 180 and the second medium 248 can start out being the same, then become different (e.g., through conditioning of the second medium 248 by one or more cells in the isolation region 240, or by changing the medium 180 flowing through the microfluidic channel 122).

As illustrated in FIG. 2C, the width $W_{con}$ of the connection region 236 can be uniform from the proximal opening 234 to the distal opening 238. The width $W_{con}$ of the connection region 236 at the distal opening 238 can be any of the values identified herein for the width $W_{con}$ of the connection region 236 at the proximal opening 234. In some embodiments, the width of the isolation region 240 at the distal opening 238 can be substantially the same as the width $W_{con}$ of the connection region 236 at the proximal opening 234. Alternatively, the width $W_{con}$ of the connection region 236 at the distal opening 238 can be different (e.g., larger or smaller) than the width $W_{con}$ of the connection region 236 at the proximal opening 234. In some embodiments, the width $W_{con}$ of the connection region 236 may be narrowed or widened between the proximal opening 234 and distal opening 238. For example, the connection region 236 may be narrowed or widened between the proximal opening and the distal opening, using a variety of different geometries (e.g., chamfering the connection region, beveling the connection region). Further, any part or subpart of the connection region 236 may be narrowed or widened (e.g., a portion of the connection region adjacent to the proximal opening 234).

Figure 3:
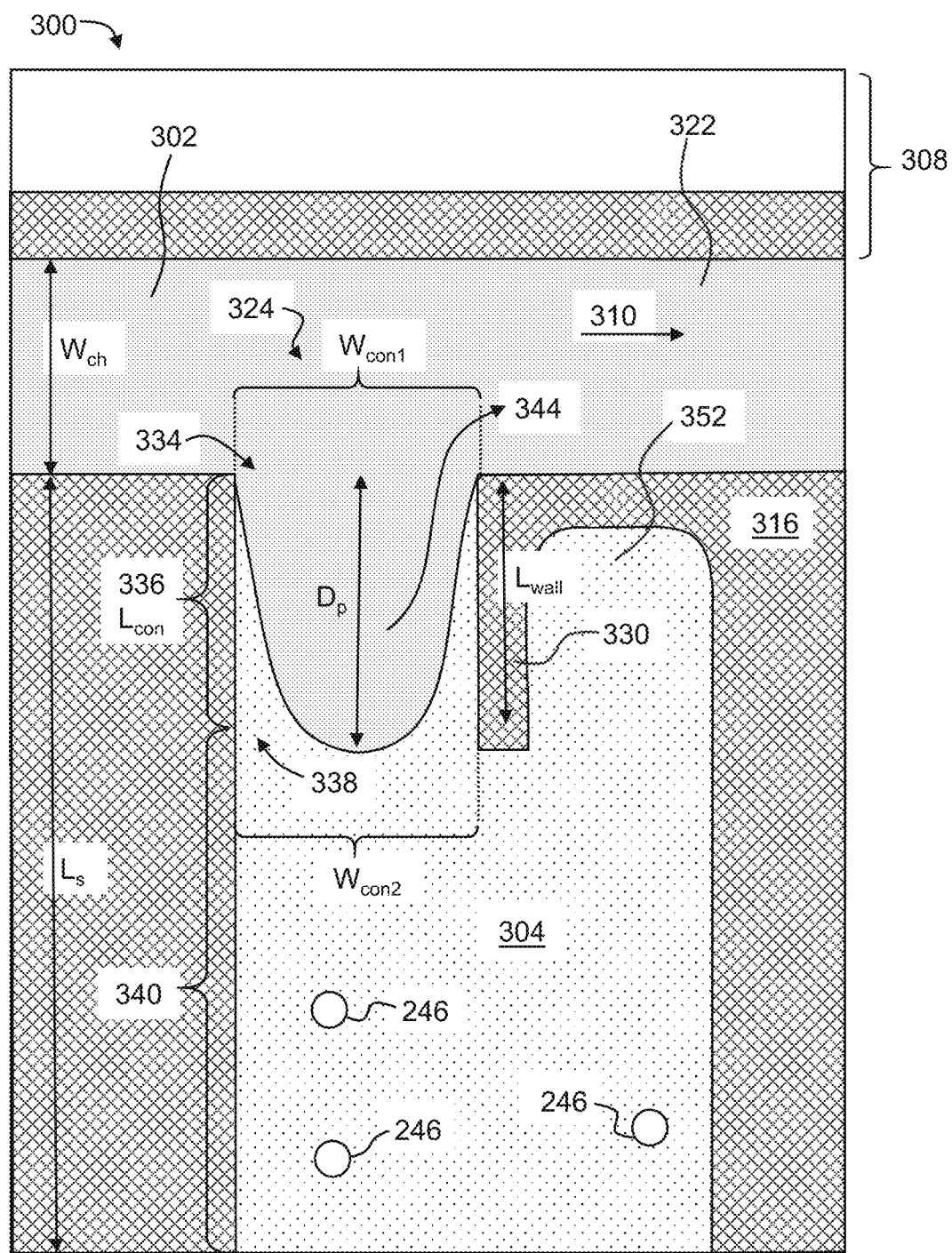
FIG. 3 illustrates a sequestration pen of a microfluidic device according to some embodiments of the disclosure.

FIG. 3 depicts another exemplary embodiment of a microfluidic device 300 containing microfluidic circuit structure 308, which includes a channel 322 and sequestration pen 324, which has features and properties like any of the sequestration pens described herein for microfluidic devices 100, 175, 200, 400, 520 and any other microfluidic devices described herein.

The exemplary microfluidic devices of FIG. 3 include a microfluidic channel 322, having a width $W_{ch}$, as described herein, and containing a flow 310 of first fluidic medium 302 and one or more sequestration pens 324 (only one illustrated in FIG. 3). The sequestration pens 324 each have a length $L_s$, a connection region 336, and an isolation region 340, where the isolation region 340 contains a second fluidic medium 304. The connection region 336 has a proximal opening 334, having a width $W_{con1}$, which opens to the microfluidic channel 322, and a distal opening 338, having a width $W_{con2}$, which opens to the isolation region 340. The width $W_{con1}$ may or may not be the same as $W_{con2}$, as described herein. The walls of each sequestration pen 324 may be formed of microfluidic circuit material 316, which may further form the connection region walls 330. A connection region wall 330 can correspond to a structure that is laterally positioned with respect to the proximal opening 334 and at least partially extends into the enclosed portion of the sequestration pen 324. In some embodiments, the length $L_{con}$ of the connection region 336 is at least partially defined by length $L_{wall}$ of the connection region wall 330. The connection region wall 330 may have a length $L_{wall}$, selected to be more than the penetration depth $D_p$ of the secondary flow 344. Thus, the secondary flow 344 can be wholly contained within the connection region without extending into the isolation region 340.

The connection region wall 330 may define a hook region 352, which is a sub-region of the isolation region 340 of the sequestration pen 324. Since the connection region wall 330 extends into the inner cavity of the sequestration pen, the connection region wall 330 can act as a physical barrier to shield hook region 352 from secondary flow 344, with selection of the length of $L_{wall}$, contributing to the extent of the hook region. In some embodiments, the longer the length $L_{wall}$ of the connection region wall 330, the more sheltered the hook region 352.

In sequestration pens configured like those of FIGS. 2A-2C and 3, the isolation region may have a shape and size of any type, and may be selected to regulate diffusion of nutrients, reagents, and/or media into the sequestration pen to reach to a far wall of the sequestration pen, e.g., opposite the proximal opening of the connection region to the flow region (or microfluidic channel). The size and shape of the isolation region may further be selected to regulate diffusion of waste products and/or secreted products of a biological micro-object out from the isolation region to the flow region via the proximal opening of the connection region of the sequestration pen. In general, the shape of the isolation region is not critical to the ability of the sequestration pen to isolate micro-objects from direct flow in the flow region.

In some other embodiments of sequestration pens, the isolation region may have more than one opening fluidically connecting the isolation region with the flow region of the microfluidic device. However, for an isolation region having a number of n openings fluidically connecting the isolation region to the flow region (or two or more flow regions), n−1 openings can be valved. When the n−1 valved openings are closed, the isolation region has only one effective opening, and exchange of materials into/out of the isolation region occurs only by diffusion.

Examples of microfluidic devices having pens in which biological micro-objects can be placed, cultured, and/or monitored have been described, for example, in U.S. Pat. No. 9,857,333 (Chapman, et al.), U.S. Pat. No. 10,010,882 (White, et al.), and U.S. Pat. No. 9,889,445 (Chapman, et al.), each of which is incorporated herein by reference in its entirety.

Microfluidic circuit element dimensions. Various dimensions and/or features of the sequestration pens and the microfluidic channels to which the sequestration pens open, as described herein, may be selected to limit introduction of contaminants or unwanted micro-objects into the isolation region of a sequestration pen from the flow region/microfluidic channel; limit the exchange of components in the fluidic medium from the channel or from the isolation region to substantially only diffusive exchange; facilitate the transfer of micro-objects into and/or out of the sequestration pens; and/or facilitate growth or expansion of the biological cells. Microfluidic channels and sequestration pens, for any of the embodiments described herein, may have any suitable combination of dimensions, may be selected by one of skill from the teachings of this disclosure.

For any of the microfluidic devices described herein, a microfluidic channel may have a uniform cross sectional height along its length that is a substantially uniform cross sectional height, and may be any cross sectional height as described herein. At any point along the microfluidic channel, the substantially uniform cross sectional height of the channel, the upper surface of which is defined by the inner surface of the cover and the lower surface of which is defined by the inner surface of the base, may be substantially the same as the cross sectional height at any other point along the channel, e.g., having a cross sectional height that is no more than about 10%, about 9%, about 8%, about 7%, about 6%, about 5%, about 4%, about 3%, about 2% or about 1% or less, different from the cross-sectional height of any other location within the channel.

Additionally, the chamber(s), e.g., sequestration pen(s), of the microfluidic devices described herein, may be disposed substantially in a coplanar orientation relative to the microfluidic channel into which the chamber(s) open. That is, the enclosed volume of the chamber(s) is formed by an upper surface that is defined by the inner surface of the cover, a lower surface defined by the inner surface of the base, and walls defined by the microfluidic circuit material. Therefore, the lower surface of the chamber(s) may be coplanar to the lower surface of the microfluidic channel, e.g., substantially coplanar. The upper surface of the chamber may be coplanar to the upper surface of the microfluidic channel, e.g., substantially coplanar. Accordingly, the chamber(s) may have a cross-sectional height, which may have any values as described herein, that is the same as the channel, e.g., substantially the same, and the chamber(s) and microfluidic channel(s) within the microfluidic device may have a substantially uniform cross sectional height throughout the flow region of the microfluidic device, and may be substantially coplanar throughout the microfluidic device.

Coplanarity of the lower surfaces of the chamber(s) and the microfluidic channel(s) can offer distinct advantage with repositioning micro-objects within the microfluidic device using DEP or magnetic force. Penning and unpenning of micro-objects, and in particular selective penning/selective unpenning, can be greatly facilitated when the lower surfaces of the chamber(s) and the microfluidic channel to which the chamber(s) open have a coplanar orientation.

The proximal opening of the connection region of a sequestration pen may have a width (e.g., $W_{con}$ or $W_{con1}$) that is at least as large as the largest dimension of a micro-object (e.g., a biological cell, which may be a plant cell, such as a plant protoplast) for which the sequestration pen is intended. In some embodiments, the proximal opening has a width (e.g., $W_{con}$ or $W_{con1}$) of about 20 microns, about 40 microns, about 50 microns, about 60 microns, about 75 microns, about 100 microns, about 150 microns, about 200 microns, or about 300 microns. The foregoing are examples only, and the width (e.g., $W_{con}$ or $W_{con1}$) of a proximal opening can be selected to be a value between any of the values listed above (e.g., about 20-200 microns, about 20-150 microns, about 20-100 microns, about 20-75 microns, about 20-60 microns, about 50-300 microns, about 50-200 microns, about 50-150 microns, about 50-100 microns, about 50-75 microns, about 75-150 microns, about 75-100 microns, about 100-300 microns, about 100-200 microns, or about 200-300 microns).

In some embodiments, the connection region of the sequestration pen may have a length (e.g., $L_{con}$) from the proximal opening to the distal opening to the isolation region of the sequestration pen that is at least 0.5 times, at least 0.6 times, at least 0.7 times, at least 0.8 times, at least 0.9 times, at least 1.0 times, at least 1.1 times, at least 1.2 times, at least 1.3 times, at least 1.4 times, at least 1.5 times, at least 1.75 times, at least 2.0 times, at least 2.25 times, at least 2.5 times, at least 2.75 times, at least 3.0 times, at least 3.5 times, at least 4.0 times, at least 4.5 times, at least 5.0 times, at least 6.0 times, at least 7.0 times, at least 8.0 times, at least 9.0 times, or at least 10.0 times the width (e.g., $W_{con}$ or $W_{con1}$) of the proximal opening. Thus, for example, the proximal opening of the connection region of a sequestration pen may have a width (e.g., $W_{con}$ or $W_{con1}$) from about 20 microns to about 200 microns (e.g., about 50 microns to about 150 microns), and the connection region may have a length $L_{con}$ that is at least 1.0 times (e.g., at least 1.5 times, or at least 2.0 times) the width of the proximal opening. As another example, the proximal opening of the connection region of a sequestration pen may have a width (e.g., $W_{con}$ or $W_{con1}$) from about 20 microns to about 100 microns (e.g., about 20 microns to about 60 microns), and the connection region may have a length $L_{con}$ that is at least 1.0 times (e.g., at least 1.5 times, or at least 2.0 times) the width of the proximal opening.

The microfluidic channel of a microfluidic device to which a sequestration pen opens may have specified size (e.g., width or height). In some embodiments, the height (e.g., $H_{ch}$) of the microfluidic channel at a proximal opening to the connection region of a sequestration pen can be within any of the following ranges: 20-100 microns, 20-90 microns, 20-80 microns, 20-70 microns, 20-60 microns, 20-50 microns, 30-100 microns, 30-90 microns, 30-80 microns, 30-70 microns, 30-60 microns, 30-50 microns, 40-100 microns, 40-90 microns, 40-80 microns, 40-70 microns, 40-60 microns, or 40-50 microns. The foregoing are examples only, and the height (e.g., $H_{ch}$) of the microfluidic channel (e.g., 122) can be selected to be between any of the values listed above. Moreover, the height (e.g., $H_{ch}$) of the microfluidic channel 122 can be selected to be any of these heights in regions of the microfluidic channel other than at a proximal opening of a sequestration pen.

The width (e.g., $W_{ch}$) of the microfluidic channel at the proximal opening to the connection region of a sequestration pen can be within any of the following ranges: about 20-500 microns, 20-400 microns, 20-300 microns, 20-200 microns, 20-150 microns, 20-100 microns, 20-80 microns, 20-60 microns, 30-400 microns, 30-300 microns, 30-200 microns, 30-150 microns, 30-100 microns, 30-80 microns, 30-60 microns, 40-300 microns, 40-200 microns, 40-150 microns, 40-100 microns, 40-80 microns, 40-60 microns, 50-1000 microns, 50-500 microns, 50-400 microns, 50-300 microns, 50-250 microns, 50-200 microns, 50-150 microns, 50-100 microns, 50-80 microns, 60-300 microns, 60-200 microns, 60-150 microns, 60-100 microns, 60-80 microns, 70-500 microns, 70-400 microns, 70-300 microns, 70-250 microns, 70-200 microns, 70-150 microns, 70-100 microns, 80-100 microns, 90-400 microns, 90-300 microns, 90-250 microns, 90-200 microns, 90-150 microns, 100-300 microns, 100-250 microns, 100-200 microns, 100-150 microns, 100-120 microns, 200-800 microns, 200-700 microns, or 200-600 microns. The foregoing are examples only, and the width (e.g., $W_{ch}$) of the microfluidic channel can be a value selected to be between any of the values listed above. Moreover, the width (e.g., $W_{ch}$) of the microfluidic channel can be selected to be in any of these widths in regions of the microfluidic channel other than at a proximal opening of a sequestration pen. In some embodiments, the width $W_{ch}$ of the microfluidic channel at the proximal opening to the connection region of the sequestration pen (e.g., taken transverse to the direction of bulk flow of fluid through the channel) can be substantially perpendicular to a width (e.g., $W_{con}$ or $W_{con1}$) of the proximal opening.

A cross-sectional area of the microfluidic channel at a proximal opening to the connection region of a sequestration pen can be about 500-50,000 square microns, 500-40,000 square microns, 500-30,000 square microns, 500-25,000 square microns, 500-20,000 square microns, 500-15,000 square microns, 500-10,000 square microns, 500-7,500 square microns, 500-5,000 square microns, 1,000-25,000 square microns, 1,000-20,000 square microns, 1,000-15,000 square microns, 1,000-10,000 square microns, 1,000-7,500 square microns, 1,000-5,000 square microns, 2,000-20,000 square microns, 2,000-15,000 square microns, 2,000-10,000 square microns, 2,000-7,500 square microns, 2,000-6,000 square microns, 3,000-20,000 square microns, 3,000-15,000 square microns, 3,000-10,000 square microns, 3,000-7,500 square microns, or 3,000 to 6,000 square microns. The foregoing are examples only, and the cross-sectional area of the microfluidic channel at the proximal opening can be selected to be between any of the values listed above. In various embodiments, and the cross-sectional area of the microfluidic channel at regions of the microfluidic channel other than at the proximal opening can also be selected to be between any of the values listed above. In some embodiments, the cross-sectional area is selected to be a substantially uniform value for the entire length of the microfluidic channel.

In some embodiments, the microfluidic chip is configured such that the proximal opening (e.g., 234 or 334) of the connection region of a sequestration pen may have a width (e.g., $W_{con}$ or $W_{con1}$) from about 20 microns to about 200 microns (e.g., about 50 microns to about 150 microns), the connection region may have a length $L_{con}$ (e.g., 236 or 336) that is at least 1.0 times (e.g., at least 1.5 times, or at least 2.0 times) the width of the proximal opening, and the microfluidic channel may have a height (e.g., $H_{ch}$) at the proximal opening of about 30 microns to about 60 microns. As another example, the proximal opening (e.g., 234 or 334) of the connection region of a sequestration pen may have a width (e.g., $W_{con}$ or $W_{con1}$) from about 20 microns to about 100 microns (e.g., about 20 microns to about 60 microns), the connection region may have a length $L_{con}$ (e.g., 236 or 336) that is at least 1.0 times (e.g., at least 1.5 times, or at least 2.0 times) the width of the proximal opening, and the microfluidic channel may have a height (e.g., $H_{ch}$) at the proximal opening of about 30 microns to about 60 microns. The foregoing are examples only, and the width (e.g., $W_{con}$ or $W_{con1}$) of the proximal opening (e.g., 234 or 274), the length (e.g., $L_{on}$) of the connection region, and/or the width (e.g., $W_{ch}$) of the microfluidic channel (e.g., 122 or 322), can be a value selected to be between any of the values listed above. Generally, however, the width ($W_{con}$ or $W_{con1}$) of the proximal opening of the connection region of a sequestration pen is less than the width ($W_{ch}$) of the microfluidic channel. In some embodiments, the width ($W_{con}$ or $W_{con1}$) of the proximal opening is about 8%, 9%, 10%, 11%, 12%, 13%, 14%, 15%, 16%, 17%, 18%, 19%, 20%, 22%, 24%, 25%, or 30% of the width ($W_{ch}$) of the microfluidic channel. That is, the width ($W_{ch}$) of the microfluidic channel may be at least 2.5 times, 3.0 times, 3.5 times, 4.0 times, 4.5 times, 5.0 times, 6.0 times, 7.0 times, 8.0 times, 9.0 times or at least 10.0 times the width ($W_{con}$ or $W_{con1}$) of the proximal opening of the connection region of the sequestration pen.

In some embodiments, the size $W_C$ (e.g., cross-sectional width $W_{ch}$, diameter, area, or the like) of the channel 122, 322, 618, 718 can be about one and a quarter (1.25), about one and a half (1.5), about two, about two and a half (2.5), about three (3), or more times the size $W_O$ (e.g., cross-sectional width $W_{con}$, diameter, area, or the like) of a chamber opening, e.g., sequestration pen opening 234, 334, and the like. This can reduce the extent of secondary flow and the rate of diffusion (or diffusion flux) through the opening 234, 334 for materials diffusing from a selected chamber (e.g., like sequestration pens 224, 226 of FIG. 2B) into channel 122, 322, 618, 718 and subsequently re-entering a downstream or adjacent chamber (e.g., like sequestration pen 228). The rate of diffusion of a molecule (e.g., an analyte of interest, such as an antibody) is dependent on a number of factors, including (without limitation) temperature, viscosity of the medium, and the coefficient of diffusion $D_0$ of the molecule. For example, the $D_0$ for an IgG antibody in aqueous solution at about 20° C. is about $4.4\times10^{-7}$ cm²/sec, while the kinematic viscosity of cell culture medium is about $9\times10^{-4}$ m²/sec. Thus, an antibody in cell culture medium at about 20° C. can have a rate of diffusion of about 0.5 microns/sec. Accordingly, in some embodiments, a time period for diffusion from a biological micro-object located within a sequestration pen such as 224, 226, 228, 324 into the channel 122, 322, 618, 718 can be about 10 minutes or less (e.g., about 9, 8, 7, 6, 5 minutes, or less). The time period for diffusion can be manipulated by changing parameters that influence the rate of diffusion. For example, the temperature of the media can be increased (e.g., to a physiological temperature such as about 37° C.) or decreased (e.g., to about 15° C., 10° C., or 4° C.) thereby increasing or decreasing the rate of diffusion, respectively. Alternatively, or in addition, the concentrations of solutes in the medium can be increased or decreased as discussed herein to isolate a selected pen from solutes from other upstream pens.

Accordingly, in some variations, the width (e.g., $W_{ch}$) of the microfluidic channel at the proximal opening to the connection region of a sequestration pen may be about 50 to 500 microns, about 50 to 300 microns, about 50 to 200 microns, about 70 to 500 microns, about to 70-300 microns, about 70 to 250 microns, about 70 to 200 microns, about 70 to 150 microns, about 70 to 100 microns, about 80 to 500 microns, about 80 to 300 microns, about 80 to 250 microns, about 80 to 200 microns, about 80 to 150 microns, about 90 to 500 microns, about 90 to 300 microns, about 90 to 250 microns, about 90 to 200 microns, about 90 to 150 microns, about 100 to 500 microns, about 100 to 300 microns, about 100 to 250 microns, about 100 to 200 microns, or about 100 to 150 microns. In some embodiments, the width $W_{ch}$ of the microfluidic channel at the proximal opening to the connection region of a sequestration pen may be about 70 to 250 microns, about 80 to 200 microns, or about 90 to 150 microns. The width $W_{con}$ of the opening of the chamber (e.g., sequestration pen) may be about 20 to 100 microns; about 30 to 90 microns; or about 20 to 60 microns. In some embodiments, $W_{ch}$ is about 70-250 microns and $W_{con}$ is about 20 to 100 microns; $W_{ch}$ is about 80 to 200 microns and $W_{con}$ is about 30 to 90 microns; $W_{ch}$ is about 90 to 150 microns, and $W_{con}$ is about 20 to 60 microns; or any combination of the widths of $W_{ch}$ and $W_{con}$ thereof.

In some embodiments, the proximal opening (e.g., 234 or 334) of the connection region of a sequestration pen has a width (e.g., $W_{con}$ or $W_{con1}$) that is 2.0 times or less (e.g., 2.0, 1.9, 1.8, 1.5, 1.3, 1.0, 0.8, 0.5, or 0.1 times) the height (e.g., $H_{ch}$) of the flow region/microfluidic channel at the proximal opening, or has a value that lies within a range defined by any two of the foregoing values.

In some embodiments, the width $W_{con1}$ of a proximal opening (e.g., 234 or 334) of a connection region of a sequestration pen may be the same as a width $W_{con2}$ of the distal opening (e.g., 238 or 338) to the isolation region thereof. In some embodiments, the width $W_{con1}$ of the proximal opening may be different than a width $W_{con2}$ of the distal opening, and $W_{con1}$ and/or $W_{con2}$ may be selected from any of the values described for $W_{con}$ or $W_{con1}$. In some embodiments, the walls (including a connection region wall) that define the proximal opening and distal opening may be substantially parallel with respect to each other. In some embodiments, the walls that define the proximal opening and distal opening may be selected to not be parallel with respect to each other.

The length (e.g., $L_{con}$) of the connection region can be about 1-600 microns, 5-550 microns, 10-500 microns, 15-400 microns, 20-300 microns, 20-500 microns, 40-400 microns, 60-300 microns, 80-200 microns, about 100-150 microns, about 20-300 microns, about 20-250 microns, about 20-200 microns, about 20-150 microns, about 20-100 microns, about 30-250 microns, about 30-200 microns, about 30-150 microns, about 30-100 microns, about 30-80 microns, about 30-50 microns, about 45-250 microns, about 45-200 microns, about 45-100 microns, about 45-80 microns, about 45-60 microns, about 60-200 microns, about 60-150 microns, about 60-100 microns or about 60-80 microns. The foregoing are examples only, and length (e.g., $L_{con}$) of a connection region can be selected to be a value that is between any of the values listed above.

The connection region wall of a sequestration pen may have a length (e.g., $L_{wall}$) that is at least 0.5 times, at least 0.6 times, at least 0.7 times, at least 0.8 times, at least 0.9 times, at least 1.0 times, at least 1.1 times, at least 1.2 times, at least 1.3 times, at least 1.4 times, at least 1.5 times, at least 1.75 times, at least 2.0 times, at least 2.25 times, at least 2.5 times, at least 2.75 times, at least 3.0 times, or at least 3.5 times the width (e.g., $W_{con}$ or $W_{con1}$) of the proximal opening of the connection region of the sequestration pen. In some embodiments, the connection region wall may have a length $L_{wall}$ of about 20-200 microns, about 20-150 microns, about 20-100 microns, about 20-80 microns, or about 20-50 microns. The foregoing are examples only, and a connection region wall may have a length $L_{wall}$ selected to be between any of the values listed above.

A sequestration pen may have a length $L_s$ of about 40-600 microns, about 40-500 microns, about 40-400 microns, about 40-300 microns, about 40-200 microns, about 40-100 microns or about 40-80 microns. The foregoing are examples only, and a sequestration pen may have a length $L_s$ selected to be between any of the values listed above.

According to some embodiments, a sequestration pen may have a specified height (e.g., $H_s$). In some embodiments, a sequestration pen has a height $H_s$ of about 20 microns to about 200 microns (e.g., about 20 microns to about 150 microns, about 20 microns to about 100 microns, about 20 microns to about 60 microns, about 30 microns to about 150 microns, about 30 microns to about 100 microns, about 30 microns to about 60 microns, about 40 microns to about 150 microns, about 40 microns to about 100 microns, or about 40 microns to about 60 microns). The foregoing are examples only, and a sequestration pen can have a height $H_s$ selected to be between any of the values listed above.

The height $H_{con}$ of a connection region at a proximal opening of a sequestration pen can be a height within any of the following heights: 20-100 microns, 20-90 microns, 20-80 microns, 20-70 microns, 20-60 microns, 20-50 microns, 30-100 microns, 30-90 microns, 30-80 microns, 30-70 microns, 30-60 microns, 30-50 microns, 40-100 microns, 40-90 microns, 40-80 microns, 40-70 microns, 40-60 microns, or 40-50 microns. The foregoing are examples only, and the height $H_{con}$ of the connection region can be selected to be between any of the values listed above. Typically, the height $H_{con}$ of the connection region is selected to be the same as the height $H_{ch}$ of the microfluidic channel at the proximal opening of the connection region. Additionally, the height $H_s$ of the sequestration pen is typically selected to be the same as the height $H_{con}$ of a connection region and/or the height $H_{ch}$ of the microfluidic channel. In some embodiments, $H_s$, $H_{con}$, and $H_{ch}$ may be selected to be the same value of any of the values listed above for a selected microfluidic device.

The isolation region can be configured to contain only one, two, three, four, five, or a similar relatively small number of micro-objects. In other embodiments, the isolation region may contain more than 10, more than 50 or more than 100 micro-objects. Accordingly, the volume of an isolation region can be, for example, at least $1 \times 10^4$, $1 \times 10^5$, $5 \times 10^5$, $8 \times 10^5$, $1 \times 10^6$, $2 \times 10^6$, $4 \times 10^6$, $6 \times 10^6$, $1 \times 10^7$, $3 \times 10^7$, $5 \times 10^7$ $1 \times 10^8$, $5 \times 10^8$, or $8 \times 10^8$ cubic microns, or more. The foregoing are examples only, and the isolation region can be configured to contain numbers of micro-objects and volumes selected to be between any of the values listed above (e.g., a volume between $1 \times 10^5$ cubic microns and $5 \times 10^5$ cubic microns, between $5 \times 10^5$ cubic microns and $1 \times 10^6$ cubic microns, between $1 \times 10^6$ cubic microns and $2 \times 10^6$ cubic microns, or between $2 \times 10^6$ cubic microns and $1 \times 10^7$ cubic microns).

According to some embodiments, a sequestration pen of a microfluidic device may have a specified volume. The specified volume of the sequestration pen (or the isolation region of the sequestration pen) may be selected such that a single cell or a small number of cells (e.g., 2-10 or 2-5) can rapidly condition the medium and thereby attain favorable (or optimal) growth conditions. In some embodiments, the sequestration pen has a volume of about $5 \times 10^5$, $6 \times 10^5$, $8 \times 10^5$, $1 \times 10^6$, $2 \times 10^6$, $4 \times 10^6$, $8 \times 10^6$, $1 \times 10^7$, $3 \times 10^7$, $5 \times 10^7$, or about $8 \times 10^7$ cubic microns, or more. In some embodiments, the sequestration pen has a volume of about 1 nanoliter to about 50 nanoliters, 2 nanoliters to about 25 nanoliters, 2 nanoliters to about 20 nanoliters, about 2 nanoliters to about 15 nanoliters, or about 2 nanoliters to about 10 nanoliters. The foregoing are examples only, and a sequestration pen can have a volume selected to be any value that is between any of the values listed above.

According to some embodiments, the flow of fluidic medium within the microfluidic channel (e.g., 122 or 322) may have a specified maximum velocity (e.g., $V_{max}$). In some embodiments, the maximum velocity (e.g., $V_{max}$) may be set at around 0.2, 0.5, 0.7, 1.0, 1.3, 1.5, 2.0, 2.5, 3.0, 3.5, 4.0, 4.5, 5.0, 5.5, 6.0, 6.7, 7.0, 7.5, 8.0, 8.5, 9.0, 10, 11, 12, 13, 14, 15, 16, 17, 18, 19, 20, 22, 24, or 25 microliters/sec. The foregoing are examples only, and the flow of fluidic medium within the microfluidic channel can have a maximum velocity (e.g., $V_{max}$) selected to be a value between any of the values listed above. The flow of fluidic medium within the microfluidic channel typically may be flowed at a rate less than the $V_{max}$. While the $V_{max}$ may vary depending on the specific size and numbers of channel and sequestration pens opening thereto, a fluidic medium may be flowed at about 0.1 microliters/sec to about 20 microliters/sec; about 0.1 microliters/sec to about 15 microliters/sec; about 0.1 microliters/sec to about 12 microliters/sec, about 0.1 microliters/sec to about 10 microliters/sec; about 0.1 microliter/ sec to about 7 microliters/sec without exceeding the $V_{max}$. In some portions of a typical workflow, a flow rate of a fluidic medium may be about 0.1 microliters/sec; about 0.5 microliters/sec; about 1.0 microliters/sec; about 2.0 microliters/ sec; about 3.0 microliters/sec; about 4.0 microliters/sec; about 5.0 microliters/sec; about 6.0 microliters/sec; about 7.0 microliters/sec; about 8.0 microliters/sec; about 9.0 microliters/sec; about 10.0 microliters/sec; about 11.0 microliters/sec; or any range defined by two of the foregoing values, e.g., 1-5 microliters/sec or 5-10 microliters/sec. The flow rate of a fluidic medium in the microfluidic channel may be equal to or less than about 12 microliters/sec; about 10 microliters/sec; about 8 microliters/sec, or about 6 microliters/sec.

In various embodiment, the microfluidic device has sequestration pens configured as in any of the embodiments discussed herein where the microfluidic device has about 5 to about 10 sequestration pens, about 10 to about 50 sequestration pens, about 25 to about 200 sequestration pens, about 100 to about 500 sequestration pens, about 200 to about 1000 sequestration pens, about 500 to about 1500 sequestration pens, about 1000 to about 2500 sequestration pens, about 2000 to about 5000 sequestration pens, about 3500 to about 7000 sequestration pens, about 5000 to about 10,000 sequestration pens, about 7,500 to about 15,000 sequestration pens, about 12,500 to about 20,000 sequestration pens, about 15,000 to about 25,000 sequestration pens, about 20,000 to about 30,000 sequestration pens, about 25,000 to about 35,000 sequestration pens, about 30,000 to about 40,000 sequestration pens, about 35,000 to about 45,000 sequestration pens, or about 40,000 to about 50,000 sequestration pens. The sequestration pens need not all be the same size and may include a variety of configurations (e.g., different widths, different features within the sequestration pen).

Coating solutions and coating agents. In some embodiments, at least one inner surface of the microfluidic device includes a coating material that provides a layer of organic and/or hydrophilic molecules suitable for maintenance, expansion and/or movement of biological micro-object(s) (i.e., the biological micro-object exhibits increased viability, greater expansion and/or greater portability within the microfluidic device). The conditioned surface may reduce surface fouling, participate in providing a layer of hydration, and/or otherwise shield the biological micro-objects from contact with the non-organic materials of the microfluidic device interior.

In some embodiments, substantially all the inner surfaces of the microfluidic device include the coating material. The coated inner surface(s) may include the surface of a flow region (e.g., channel), chamber, or sequestration pen, or a combination thereof. In some embodiments, each of a plurality of sequestration pens has at least one inner surface coated with coating materials. In other embodiments, each of a plurality of flow regions or channels has at least one inner surface coated with coating materials. In some embodiments, at least one inner surface of each of a plurality of sequestration pens and each of a plurality of channels is coated with coating materials. The coating may be applied before or after introduction of biological micro-object(s), or may be introduced concurrently with the biological micro-object(s). In some embodiments, the biological micro-object(s) may be imported into the microfluidic device in a fluidic medium that includes one or more coating agents. In other embodiments, the inner surface(s) of the microfluidic device (e.g., a microfluidic device having an electrode activation substrate such as, but not limited to, a device including dielectrophoresis (DEP) electrodes) may be treated or "primed" with a coating solution comprising a coating agent prior to introduction of the biological micro-object(s) into the microfluidic device. Any convenient coating agent/coating solution can be used, including but not limited to: serum or serum factors, bovine serum albumin (BSA), polymers, detergents, enzymes, and any combination thereof.

Synthetic polymer-based coating materials. The at least one inner surface may include a coating material that comprises a polymer. The polymer may be non-covalently bound (e.g., it may be non-specifically adhered) to the at least one surface. The polymer may have a variety of structural motifs, such as found in block polymers (and copolymers), star polymers (star copolymers), and graft or comb polymers (graft copolymers), all of which may be suitable for the methods disclosed herein. A wide variety of alkylene ether containing polymers may be suitable for use in the microfluidic devices described herein, including but not limited to Pluronic® polymers such as Pluronic® L44, L64, P85, and F127 (including F127NF). Other examples of suitable coating materials are described in US2016/ 0312165, the contents of which are herein incorporated by reference in their entirety.

Covalently linked coating materials. In some embodiments, the at least one inner surface includes covalently linked molecules that provide a layer of organic and/or hydrophilic molecules suitable for maintenance/expansion of biological micro-object(s) within the microfluidic device, providing a conditioned surface for such cells. The covalently linked molecules include a linking group, wherein the linking group is covalently linked to one or more surfaces of the microfluidic device, as described below. The linking group is also covalently linked to a surface modifying moiety configured to provide a layer of organic and/or hydrophilic molecules suitable for maintenance/expansion/ movement of biological micro-object(s).

In some embodiments, the covalently linked moiety configured to provide a layer of organic and/or hydrophilic molecules suitable for maintenance/expansion of biological micro-object(s) may include alkyl or fluoroalkyl (which includes perfluoroalkyl) moieties; mono- or polysaccharides (which may include but is not limited to dextran); alcohols (including but not limited to propargyl alcohol); polyalcohols, including but not limited to polyvinyl alcohol; alkylene ethers, including but not limited to polyethylene glycol; polyelectrolytes (including but not limited to polyacrylic acid or polyvinyl phosphonic acid); amino groups (including derivatives thereof, such as, but not limited to alkylated amines, hydroxyalkylated amino group, guanidinium, and heterocylic groups containing an unaromatized nitrogen ring atom, such as, but not limited to morpholinyl or piperazinyl); carboxylic acids including but not limited to propiolic acid (which may provide a carboxylate anionic surface); phosphonic acids, including but not limited to ethynyl phosphonic acid (which may provide a phosphonate anionic surface); sulfonate anions; carboxybetaines; sulfobetaines; sulfamic acids; or amino acids.

In various embodiments, the covalently linked moiety configured to provide a layer of organic and/or hydrophilic molecules suitable for maintenance/expansion of biological micro-object(s) in the microfluidic device may include non-polymeric moieties such as an alkyl moiety, amino acid moiety, alcohol moiety, amino moiety, carboxylic acid moiety, phosphonic acid moiety, sulfonic acid moiety, sulfamic acid moiety, or saccharide moiety. Alternatively, the covalently linked moiety may include polymeric moieties, which may include any of these moieties.

In some embodiments, a microfluidic device may have a hydrophobic layer upon the inner surface of the base which includes a covalently linked alkyl moiety. The covalently linked alkyl moiety may comprise carbon atoms forming a linear chain (e.g., a linear chain of at least 10 carbons, or at least 14, 16, 18, 20, 22, or more carbons) and may be an unbranched alkyl moiety. In some embodiments, the alkyl group may include a substituted alkyl group (e.g., some of the carbons in the alkyl group can be fluorinated or perfluorinated). In some embodiments, the alkyl group may include a first segment, which may include a perfluoroalkyl group, joined to a second segment, which may include a non-substituted alkyl group, where the first and second segments may be joined directly or indirectly (e.g., by means of an ether linkage). The first segment of the alkyl group may be located distal to the linking group, and the second segment of the alkyl group may be located proximal to the linking group.

In other embodiments, the covalently linked moiety may include at least one amino acid, which may include more than one type of amino acid. Thus, the covalently linked moiety may include a peptide or a protein. In some embodiments, the covalently linked moiety may include an amino acid which may provide a zwitterionic surface to support cell growth, viability, portability, or any combination thereof.

In other embodiments, the covalently linked moiety may further include a streptavidin or biotin moiety. In some embodiments, a modified biological moiety such as, for example, a biotinylated protein or peptide may be introduced to the inner surface of a microfluidic device bearing covalently linked streptavidin, and couple via the covalently linked streptavidin to the surface, thereby providing a modified surface presenting the protein or peptide.

In other embodiments, the covalently linked moiety may include at least one alkylene oxide moiety and may include any alkylene oxide polymer as described above. One useful class of alkylene ether containing polymers is polyethylene glycol (PEG $M_w$<100,000 Da) or alternatively polyethylene oxide (PEO, $M_w$>100,000). In some embodiments, a PEG may have an $M_w$ of about 1000 Da, 5000 Da, 10,000 Da or 20,000 Da. In some embodiments, the PEG polymer may further be substituted with a hydrophilic or charged moiety, such as but not limited to an alcohol functionality or a carboxylic acid moiety.

The covalently linked moiety may include one or more saccharides. The covalently linked saccharides may be mono-, di-, or polysaccharides. The covalently linked saccharides may be modified to introduce a reactive pairing moiety which permits coupling or elaboration for attachment to the surface. One exemplary covalently linked moiety may include a dextran polysaccharide, which may be coupled indirectly to a surface via an unbranched linker.

The coating material providing a conditioned surface may comprise only one kind of covalently linked moiety or may include more than one different kind of covalently linked moiety. For example, a polyethylene glycol conditioned surface may have covalently linked alkylene oxide moieties having a specified number of alkylene oxide units which are all the same, e.g., having the same linking group and covalent attachment to the surface, the same overall length, and the same number of alkylene oxide units. Alternatively, the coating material may have more than one kind of covalently linked moiety attached to the surface. For example, the coating material may include the molecules having covalently linked alkylene oxide moieties having a first specified number of alkylene oxide units and may further include a further set of molecules having bulky moieties such as a protein or peptide connected to a covalently attached alkylene oxide linking moiety having a greater number of alkylene oxide units. The different types of molecules may be varied in any suitable ratio to obtain the surface characteristics desired. For example, the conditioned surface having a mixture of first molecules having a chemical structure having a first specified number of alkylene oxide units and second molecules including peptide or protein moieties, which may be coupled via a biotin/streptavidin binding pair to the covalently attached alkylene linking moiety, may have a ratio of first molecules:second molecules of about 99:1; about 90:10; about 75:25; about 50:50; about 30:70; about 20:80; about 10:90; or any ratio selected to be between these values. In this instance, the first set of molecules having different, less sterically demanding termini and fewer backbone atoms can help to functionalize the entire substrate surface and thereby prevent undesired adhesion or contact with the silicon/silicon oxide, hafnium oxide or alumina making up the substrate itself. The selection of the ratio of mixture of first molecules to second molecules may also modulate the surface modification introduced by the second molecules bearing peptide or protein moieties.

Conditioned surface properties. Various factors can alter the physical thickness of the conditioned surface, such as the manner in which the conditioned surface is formed on the substrate (e.g., vapor deposition, liquid phase deposition, spin coating, flooding, and electrostatic coating). In some embodiments, the conditioned surface may have a thickness of about 1 nm to about 10 nm. In some embodiments, the covalently linked moieties of the conditioned surface may form a monolayer when covalently linked to the surface of the microfluidic device (which may include an electrode activation substrate having dielectrophoresis (DEP) or electrowetting (EW) electrodes) and may have a thickness of less than 10 nm (e.g., less than 5 nm, or about 1.5 to 3.0 nm). These values are in contrast to that of a surface prepared by spin coating, for example, which may typically have a thickness of about 30 nm. In some embodiments, the conditioned surface does not require a perfectly formed monolayer to be suitably functional for operation within a DEP-configured microfluidic device. In other embodiments, the conditioned surface formed by the covalently linked moieties may have a thickness of about 10 nm to about 50 nm.

Unitary or Multi-part conditioned surface. The covalently linked coating material may be formed by reaction of a molecule which already contains the moiety configured to provide a layer of organic and/or hydrophilic molecules suitable for maintenance/expansion of biological micro-object(s) in the microfluidic device, and may have a structure of Formula I, as shown below. Alternatively, the covalently linked coating material may be formed in a two-part sequence, having a structure of Formula II, by coupling the moiety configured to provide a layer of organic and/or hydrophilic molecules suitable for maintenance and/or expansion of biological micro-object(s) to a surface modifying ligand that itself has been covalently linked to the surface. In some embodiments, the surface may be formed in a two-part or three-part sequence, including a streptavidin/biotin binding pair, to introduce a protein, peptide, or mixed modified surface.

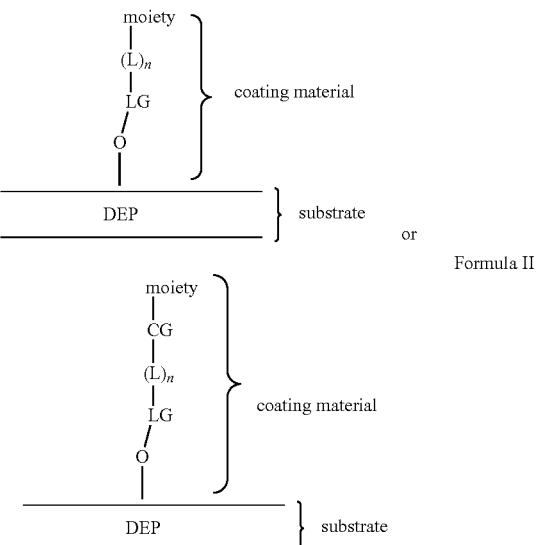

Formula I

Formula II

The coating material may be linked covalently to oxides of the surface of a DEP-configured or EW-configured substrate. The coating material may be attached to the oxides via a linking group ("LG"), which may be a siloxy or phosphonate ester group formed from the reaction of a siloxane or phosphonic acid group with the oxides. The moiety configured to provide a layer of organic and/or hydrophilic molecules suitable for maintenance/expansion of biological micro-object(s) in the microfluidic device can be any of the moieties described herein. The linking group LG may be directly or indirectly connected to the moiety configured to provide a layer of organic and/or hydrophilic molecules suitable for maintenance/expansion of biological micro-object(s) in the microfluidic device. When the linking group LG is directly connected to the moiety, optional linker ("L") is not present and n is 0. When the linking group LG is indirectly connected to the moiety, linker L is present and n is 1. The linker L may have a linear portion where a backbone of the linear portion may include 1 to 200 non-hydrogen atoms selected from any combination of silicon, carbon, nitrogen, oxygen, sulfur and/or phosphorus atoms, subject to chemical bonding limitations as is known in the art. It may be interrupted with any combination of one or more moieties, which may be chosen from ether, amino, carbonyl, amido, and/or phosphonate groups, arylene, heteroarylene, or heterocyclic groups. In some embodiments, the coupling group CG represents the resultant group from reaction of a reactive moiety $R_x$ and a reactive pairing moiety $R_{px}$ (i.e., a moiety configured to react with the reactive moiety $R_x$). CG may be a carboxamidyl group, a triazolylene group, substituted triazolylene group, a carboxamidyl, thioamidyl, an oxime, a mercaptyl, a disulfide, an ether, or alkenyl group, or any other suitable group that may be formed upon reaction of a reactive moiety with its respective reactive pairing moiety. In some embodiments, CG may further represent a streptavidin/biotin binding pair.

Further details of suitable coating treatments and modifications, as well as methods of preparation, may be found at U.S. Patent Application Publication No. US2016/0312165 (Lowe, Jr., et al.), U.S. Patent Application Publication No US2017/0173580 (Lowe, Jr., et al), International Patent Application Publication WO2017/205830 (Lowe, Jr., et al.), and International Patent Application Publication WO2019/01880 (Beemiller et al.), each of which disclosures is herein incorporated by reference in its entirety.

Microfluidic device motive technologies. The microfluidic devices described herein can be used with any type of motive technology. As described herein, the control and monitoring equipment of the system can comprise a motive module for selecting and moving objects, such as micro-objects or droplets, in the microfluidic circuit of a microfluidic device. The motive technology(ies) may include, for example, dielectrophoresis (DEP), electrowetting (EW), and/or other motive technologies. The microfluidic device can have a variety of motive configurations, depending upon the type of object being moved and other considerations. Returning to FIG. 1A, for example, the support structure 104 and/or cover 110 of the microfluidic device 100 can comprise DEP electrode activation substrates for selectively inducing motive forces on micro-objects in the fluidic medium 180 in the microfluidic circuit 120 and thereby select, capture, and/or move individual micro-objects or groups of micro-objects.

In some embodiments, motive forces are applied across the fluidic medium 180 (e.g., in the flow path and/or in the sequestration pens) via one or more electrodes (not shown) to manipulate, transport, separate and sort micro-objects located therein. For example, in some embodiments, motive forces are applied to one or more portions of microfluidic circuit 120 in order to transfer a single micro-object from the flow path 106 into a desired microfluidic sequestration pen. In some embodiments, motive forces are used to prevent a micro-object within a sequestration pen from being displaced therefrom. Further, in some embodiments, motive forces are used to selectively remove a micro-object from a sequestration pen that was previously collected in accordance with the embodiments of the current disclosure.

In some embodiments, the microfluidic device is configured as an optically-actuated electrokinetic device, such as in optoelectronic tweezer (OET) and/or optoelectrowetting (OEW) configured device. Examples of suitable OET configured devices (e.g., containing optically actuated dielectrophoresis electrode activation substrates) can include those illustrated in U.S. Pat. No. RE 44,711 (Wu, et al.) (originally issued as U.S. Pat. No. 7,612,355), U.S. Pat. No. 7,956,339 (Ohta, et al.), U.S. Pat. No. 9,908,115 (Hobbs et al.), and U.S. Pat. No. 9,403,172 (Short et al), each of which is incorporated herein by reference in its entirety. Examples of suitable OEW configured devices can include those illustrated in U.S. Pat. No. 6,958,132 (Chiou, et al.), and U.S. Pat. No. 9,533,306 (Chiou, et al.), each of which is incorporated herein by reference in its entirety. Examples of suitable optically-actuated electrokinetic devices that include combined OET/OEW configured devices can include those illustrated in U.S. Patent Application Publication No. 2015/0306598 (Khandros, et al.), U.S. Patent Application Publication No 2015/0306599 (Khandros, et al.), and U.S. Patent Application Publication No. 2017/0173580 (Lowe, et al.), each of which is incorporated herein by reference in its entirety.

It should be understood that, for purposes of simplicity, the various examples of FIGS. 1-5B may illustrate portions of microfluidic devices while not depicting other portions. Further, FIGS. 1-5B may be part of, and implemented as, one or more microfluidic systems. In one non-limiting example, FIGS. 4A and 4B show a side cross-sectional view and a top cross-sectional view, respectively, of a portion of an enclosure 102 of the microfluidic device 400 having a region/chamber 402, which may be part of a fluidic circuit element having a more detailed structure, such as a growth chamber, a sequestration pen (which may be like any sequestration pen described herein), a flow region, or a flow channel. For instance, microfluidic device 400 may be similar to microfluidic devices 100, 175, 200, 300, 520 or any other microfluidic device as described herein. Furthermore, the microfluidic device 400 may include other fluidic circuit elements and may be part of a system including control and monitoring equipment 152, described above, having one or more of the media module 160, motive module 162, imaging module 164, optional tilting module 166, and other modules 168. Microfluidic devices 175, 200, 300, 520 and any other microfluidic devices described herein may similarly have any of the features described in detail for FIGS. 1A-1B and 4A-4B.

Figure 4A:
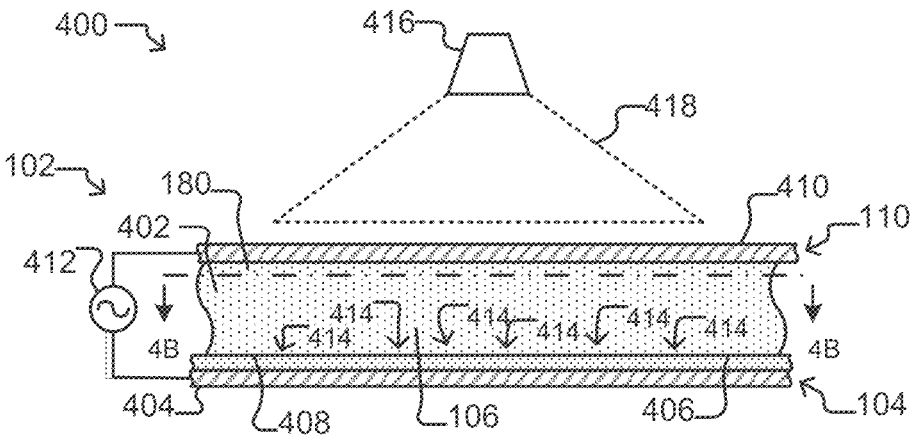
FIGS. 4A to 4B illustrate electrokinetic features of a microfluidic device according to some embodiments of the disclosure.

As shown in the example of FIG. 4A, the microfluidic device 400 includes a support structure 104 having a bottom electrode 404 and an electrode activation substrate 406 overlying the bottom electrode 404, and a cover 110 having a top electrode 410, with the top electrode 410 spaced apart from the bottom electrode 404. The top electrode 410 and the electrode activation substrate 406 define opposing surfaces of the region/chamber 402. A fluidic medium 180 contained in the region/chamber 402 thus provides a resistive connection between the top electrode 410 and the electrode activation substrate 406. A power source 412 configured to be connected to the bottom electrode 404 and the top electrode 410 and create a biasing voltage between the electrodes, as required for the generation of DEP forces in the region/chamber 402, is also shown. The power source 412 can be, for example, an alternating current (AC) power source.

Figure 4B:
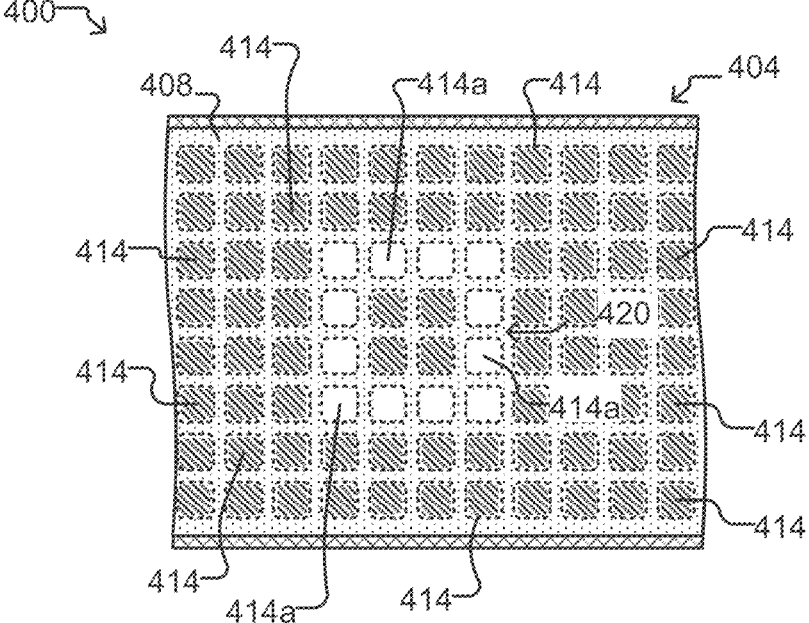

In certain embodiments, the microfluidic device 400 illustrated in FIGS. 4A and 4B can have an optically-actuated DEP electrode activation substrate. Accordingly, changing patterns of light 418 from the light source 416, which may be controlled by the motive module 162, can selectively activate and deactivate changing patterns of DEP electrodes at regions 414 of the inner surface 408 of the electrode activation substrate 406. (Hereinafter the regions 414 of a microfluidic device having a DEP electrode activation substrate are referred to as "DEP electrode regions.") As illustrated in FIG. 4B, a light pattern 418 directed onto the inner surface 408 of the electrode activation substrate 406 can illuminate select DEP electrode regions 414a (shown in white) in a pattern, such as a square. The non-illuminated DEP electrode regions 414 (cross-hatched) are hereinafter referred to as "dark" DEP electrode regions 414. The relative electrical impedance through the DEP electrode activation substrate 406 (i.e., from the bottom electrode 404 up to the inner surface 408 of the electrode activation substrate 406 which interfaces with the fluidic medium 180 in the flow region 106) is greater than the relative electrical impedance through the fluidic medium 180 in the region/chamber 402 (i.e., from the inner surface 408 of the electrode activation substrate 406 to the top electrode 410 of the cover 110) at each dark DEP electrode region 414. An illuminated DEP electrode region 414a, however, exhibits a reduced relative impedance through the electrode activation substrate 406 that is less than the relative impedance through the fluidic medium 180 in the region/chamber 402 at each illuminated DEP electrode region 414a.

With the power source 412 activated, the foregoing DEP configuration creates an electric field gradient in the fluidic medium 180 between illuminated DEP electrode regions 414a and adjacent dark DEP electrode regions 414, which in turn creates local DEP forces that attract or repel nearby micro-objects (not shown) in the fluidic medium 180. DEP electrodes that attract or repel micro-objects in the fluidic medium 180 can thus be selectively activated and deactivated at many different such DEP electrode regions 414 at the inner surface 408 of the region/chamber 402 by changing light patterns 418 projected from a light source 416 into the microfluidic device 400. Whether the DEP forces attract or repel nearby micro-objects can depend on such parameters as the frequency of the power source 412 and the dielectric properties of the fluidic medium 180 and/or micro-objects (not shown). Depending on the frequency of the power applied to the DEP configuration and selection of fluidic media (e.g., a highly conductive media such as PBS or other media appropriate for maintaining biological cells), negative DEP forces may be produced. Negative DEP forces may repel the micro-objects away from the location of the induced non-uniform electrical field. In some embodiments, a microfluidic device incorporating DEP technology may generate negative DEP forces.

The square pattern 420 of illuminated DEP electrode regions 414a illustrated in FIG. 4B is an example only. Any pattern of the DEP electrode regions 414 can be illuminated (and thereby activated) by the pattern of light 418 projected into the microfluidic device 400, and the pattern of illuminated/activated DEP electrode regions 414 can be repeatedly changed by changing or moving the light pattern 418.

In some embodiments, the electrode activation substrate 406 can comprise or consist of a photoconductive material. In such embodiments, the inner surface 408 of the electrode activation substrate 406 can be featureless. For example, the electrode activation substrate 406 can comprise or consist of a layer of hydrogenated amorphous silicon (a-Si:H). The a-Si:H can comprise, for example, about 8% to 40% hydrogen (calculated as 100*the number of hydrogen atoms/the total number of hydrogen and silicon atoms). The layer of a-Si:H can have a thickness of about 500 nm to about 2.0 μm. In such embodiments, the DEP electrode regions 414 can be created anywhere and in any pattern on the inner surface 408 of the electrode activation substrate 406, in accordance with the light pattern 418. The number and pattern of the DEP electrode regions 414 thus need not be fixed, but can correspond to the light pattern 418. Examples of microfluidic devices having a DEP configuration comprising a photoconductive layer such as discussed above have been described, for example, in U.S. Pat. No. RE 44,711 (Wu, et al.) (originally issued as U.S. Pat. No. 7,612,355), each of which is incorporated herein by reference in its entirety.

In other embodiments, the electrode activation substrate 406 can comprise a substrate comprising a plurality of doped layers, electrically insulating layers (or regions), and electrically conductive layers that form semiconductor integrated circuits, such as is known in semiconductor fields. For example, the electrode activation substrate 406 can comprise a plurality of phototransistors, including, for example, lateral bipolar phototransistors, with each phototransistor corresponding to a DEP electrode region 414. Alternatively, the electrode activation substrate 406 can comprise electrodes (e.g., conductive metal electrodes) controlled by phototransistor switches, with each such electrode corresponding to a DEP electrode region 414. The electrode activation substrate 406 can include a pattern of such phototransistors or phototransistor-controlled electrodes. The pattern, for example, can be an array of substantially square phototransistors or phototransistor-controlled electrodes arranged in rows and columns. Alternatively, the pattern can be an array of substantially hexagonal phototransistors or phototransistor-controlled electrodes that form a hexagonal lattice. Regardless of the pattern, electric circuit elements can form electrical connections between the DEP electrode regions 414 at the inner surface 408 of the electrode activation substrate 406 and the bottom electrode 404, and those electrical connections (i.e., phototransistors or electrodes) can be selectively activated and deactivated by the light pattern 418, as described above.

Examples of microfluidic devices having electrode activation substrates that comprise phototransistors have been described, for example, in U.S. Pat. No. 7,956,339 (Ohta et al.) and U.S. Pat. No. 9,908,115 (Hobbs et al.), the entire contents of each of which are incorporated herein by reference. Examples of microfluidic devices having electrode activation substrates that comprise electrodes controlled by phototransistor switches have been described, for example, in U.S. Pat. No. 9,403,172 (Short et al.), which is incorporated herein by reference in its entirety.

In some embodiments of a DEP configured microfluidic device, the top electrode 410 is part of a first wall (or cover 110) of the enclosure 402, and the electrode activation substrate 406 and bottom electrode 404 are part of a second wall (or support structure 104) of the enclosure 102. The region/chamber 402 can be between the first wall and the second wall. In other embodiments, the electrode 410 is part of the second wall (or support structure 104) and one or both of the electrode activation substrate 406 and/or the electrode 410 are part of the first wall (or cover 110). Moreover, the light source 416 can alternatively be used to illuminate the enclosure 102 from below.

With the microfluidic device 400 of FIGS. 4A-4B having a DEP electrode activation substrate, the motive module 162 of control and monitoring equipment 152, as described for FIG. 1A herein, can select a micro-object (not shown) in the fluidic medium 180 in the region/chamber 402 by projecting a light pattern 418 into the microfluidic device 400 to activate a first set of one or more DEP electrodes at DEP electrode regions 414a of the inner surface 408 of the electrode activation substrate 406 in a pattern (e.g., square pattern 420) that surrounds and captures the micro-object. The motive module 162 can then move the in situ-generated captured micro-object by moving the light pattern 418 relative to the microfluidic device 400 to activate a second set of one or more DEP electrodes at DEP electrode regions 414. Alternatively, the microfluidic device 400 can be moved relative to the light pattern 418.

In other embodiments, the microfluidic device 400 may be a DEP configured device that does not rely upon light activation of DEP electrodes at the inner surface 408 of the electrode activation substrate 406. For example, the electrode activation substrate 406 can comprise selectively addressable and energizable electrodes positioned opposite to a surface including at least one electrode (e.g., cover 110). Switches (e.g., transistor switches in a semiconductor substrate) may be selectively opened and closed to activate or inactivate DEP electrodes at DEP electrode regions 414, thereby creating a net DEP force on a micro-object (not shown) in region/chamber 402 in the vicinity of the activated DEP electrodes. Depending on such characteristics as the frequency of the power source 412 and the dielectric properties of the medium (not shown) and/or micro-objects in the region/chamber 402, the DEP force can attract or repel a nearby micro-object. By selectively activating and deactivating a set of DEP electrodes (e.g., at a set of DEP electrodes regions 414 that forms a square pattern 420), one or more micro-objects in region/chamber 402 can be selected and moved within the region/chamber 402. The motive module 162 in FIG. 1A can control such switches and thus activate and deactivate individual ones of the DEP electrodes to select, and move particular micro-objects (not shown) around the region/chamber 402. Microfluidic devices having a DEP electrode activation substrate that includes selectively addressable and energizable electrodes are known in the art and have been described, for example, in U.S. Pat. No. 6,294,063 (Becker, et al.) and U.S. Pat. No. 6,942,776 (Medoro), each of which is incorporated herein by reference in its entirety.

Regardless of whether the microfluidic device 400 has a dielectrophoretic electrode activation substrate, an electrowetting electrode activation substrate or a combination of both a dielectrophoretic and an electrowetting activation substrate, a power source 412 can be used to provide a potential (e.g., an AC voltage potential) that powers the electrical circuits of the microfluidic device 400. The power source 412 can be the same as, or a component of, the power source 192 referenced in FIG. 1A. Power source 412 can be configured to provide an AC voltage and/or current to the top electrode 410 and the bottom electrode 404. For an AC voltage, the power source 412 can provide a frequency range and an average or peak power (e.g., voltage or current) range sufficient to generate net DEP forces (or electrowetting forces) strong enough to select and move individual micro-objects (not shown) in the region/chamber 402, as discussed above, and/or to change the wetting properties of the inner surface 408 of the support structure 104 in the region/chamber 202, as also discussed above. Such frequency ranges and average or peak power ranges are known in the art. See, e.g., U.S. Pat. No. 6,958,132 (Chiou, et al.), U.S. Pat. No. RE44,711 (Wu, et al.) (originally issued as U.S. Pat. No. 7,612,355), and U.S. Patent Application Publication Nos. 2014/0124370 (Short, et al.), 2015/0306598 (Khandros, et al.), 2015/0306599 (Khandros, et al.), and 2017/0173580 (Lowe, Jr. et al.), each of which disclosures are herein incorporated by reference in its entirety.

Other forces may be utilized within the microfluidic devices, alone or in combination, to move selected micro-objects. Bulk fluidic flow within the microfluidic channel may move micro-objects within the flow region. Localized fluidic flow, which may be operated within the microfluidic channel, within a sequestration pen, or within another kind of chamber (e.g., a reservoir) can also be used to move selected micro-objects. Localized fluidic flow can be used to move selected micro-objects out of the flow region into a non-flow region such as a sequestration pen or the reverse, from a non-flow region into a flow region. The localized flow can be actuated by deforming a deformable wall of the microfluidic device, as described in U.S. Pat. No. 10,058,865 (Breinlinger, et al.), which is incorporated herein by reference in its entirety.

Gravity may be used to move micro-objects within the microfluidic channel, into a sequestration pen, and/or out of a sequestration pen or other chamber, as described in U.S. Pat. No. 9,744,533 (Breinlinger, et al.), which is incorporated herein by reference in its entirety. Use of gravity (e.g., by tilting the microfluidic device and/or the support to which the microfluidic device is attached) may be useful for bulk movement of cells into or out of the sequestration pens from/to the flow region. Magnetic forces may be employed to move micro-objects including paramagnetic materials, which can include magnetic micro-objects attached to or associated with a biological micro-object. Alternatively, or in additional, centripetal forces may be used to move micro-objects within the microfluidic channel, as well as into or out of sequestration pens or other chambers in the microfluidic device.

In another alternative mode of moving micro-objects, laser-generated dislodging forces may be used to export micro-objects or assist in exporting micro-objects from a sequestration pen or any other chamber in the microfluidic device, as described in International Patent Publication No. WO2017/117408 (Kurz, et al.), which is incorporated herein by reference in its entirety.

In some embodiments, DEP forces are combined with other forces, such as fluidic flow (e.g., bulk fluidic flow in a channel or localized fluidic flow actuated by deformation of a deformable surface of the microfluidic device, laser generated dislodging forces, and/or gravitational force), so as to manipulate, transport, separate and sort micro-objects and/or droplets within the microfluidic circuit 120. In some embodiments, the DEP forces can be applied prior to the other forces. In other embodiments, the DEP forces can be applied after the other forces. In still other instances, the DEP forces can be applied in an alternating manner with the other forces. For the microfluidic devices described herein, repositioning of micro-objects may not generally rely upon gravity or hydrodynamic forces to position or trap micro-objects at a selected position. Gravity may be chosen as one form of repositioning force, but the ability to reposition of micro-objects within the microfluidic device does not rely solely upon the use of gravity. While fluid flow in the microfluidic channels may be used to introduce micro-objects into the microfluidic channels (e.g., flow region), such regional flow is not relied upon to pen or unpen micro-objects, while localized flow (e.g., force derived from actuating a deformable surface) may, in some embodiments, be selected from amongst the other types of repositioning forces described herein to pen or unpen micro-objects or to export them from the microfluidic device.

When DEP is used to reposition micro-objects, bulk fluidic flow in a channel is generally stopped prior to applying DEP to micro-objects to reposition the micro-objects within the microfluidic circuit of the device, whether the micro-objects are being repositioned from the channel into a sequestration pen or from a sequestration pen into the channel. Bulk fluidic flow may be resumed thereafter.

System. Returning to FIG. 1A, a system 150 for operating and controlling microfluidic devices is shown, such as for controlling the microfluidic device 100. The electrical power source 192 can provide electric power to the microfluidic device 100, providing biasing voltages or currents as needed. The electrical power source 192 can, for example, comprise one or more alternating current (AC) and/or direct current (DC) voltage or current sources.

System 150 can further include a media source 178. The media source 178 (e.g., a container, reservoir, or the like) can comprise multiple sections or containers, each for holding a different fluidic medium 180. Thus, the media source 178 can be a device that is outside of and separate from the microfluidic device 100, as illustrated in FIG. 1A. Alternatively, the media source 178 can be located in whole or in part inside the enclosure 102 of the microfluidic device 100. For example, the media source 178 can comprise reservoirs that are part of the microfluidic device 100.

FIG. 1A also illustrates simplified block diagram depictions of examples of control and monitoring equipment 152 that constitute part of system 150 and can be utilized in conjunction with a microfluidic device 100. As shown, examples of such control and monitoring equipment 152 can include a master controller 154 comprising a media module 160 for controlling the media source 178, a motive module 162 for controlling movement and/or selection of micro-objects (not shown) and/or medium (e.g., droplets of medium) in the microfluidic circuit 120, an imaging module 164 for controlling an imaging device (e.g., a camera, microscope, light source or any combination thereof) for capturing images (e.g., digital images), and an optional tilting module 166 for controlling the tilting of the microfluidic device 100. The control equipment 152 can also include other modules 168 for controlling, monitoring, or performing other functions with respect to the microfluidic device 100. As shown, the monitoring equipment 152 can further include a display device 170 and an input/output device 172.

The master controller 154 can comprise a control module 156 and a digital memory 158. The control module 156 can comprise, for example, a digital processor configured to operate in accordance with machine executable instructions (e.g., software, firmware, source code, or the like) stored as non-transitory data or signals in the memory 158. Alternatively, or in addition, the control module 156 can comprise hardwired digital circuitry and/or analog circuitry. The media module 160, motive module 162, imaging module 164, optional tilting module 166, and/or other modules 168 can be similarly configured. Thus, functions, processes acts, actions, or steps of a process discussed herein as being performed with respect to the microfluidic device 100 or any other microfluidic apparatus can be performed by any one or more of the master controller 154, media module 160, motive module 162, imaging module 164, optional tilting module 166, and/or other modules 168 configured as discussed above. Similarly, the master controller 154, media module 160, motive module 162, imaging module 164, optional tilting module 166, and/or other modules 168 may be communicatively coupled to transmit and receive data used in any function, process, act, action or step discussed herein.

The media module 160 controls the media source 178. For example, the media module 160 can control the media source 178 to input a selected fluidic medium 180 into the enclosure 102 (e.g., through an inlet port 107). The media module 160 can also control removal of media from the enclosure 102 (e.g., through an outlet port (not shown)). One or more media can thus be selectively input into and removed from the microfluidic circuit 120. The media module 160 can also control the flow of fluidic medium 180 in the flow path 106 inside the microfluidic circuit 120. The media module 160 may also provide conditioning gaseous conditions to the media source 178, for example, providing an environment containing 5% $CO_2$ (or higher). The media module 160 may also control the temperature of an enclosure of the media source, for example, to provide feeder cells in the media source with proper temperature control.

Motive module. The motive module 162 can be configured to control selection and movement of micro-objects (not shown) in the microfluidic circuit 120. The enclosure 102 of the microfluidic device 100 can comprise one or more electrokinetic mechanisms including a dielectrophoresis (DEP) electrode activation substrate, optoelectronic tweezers (OET) electrode activation substrate, electrowetting (EW) electrode activation substrate, and/or an opto-electrowetting (OEW) electrode activation substrate, where the motive module 162 can control the activation of electrodes and/or transistors (e.g., phototransistors) to select and move micro-objects and/or droplets in the flow path 106 and/or within sequestration pens 124, 126, 128, and 130. The electrokinetic mechanism(s) may be any suitable single or combined mechanism as described within the paragraphs describing motive technologies for use within the microfluidic device. A DEP configured device may include one or more electrodes that apply a non-uniform electric field in the microfluidic circuit 120 sufficient to exert a dielectrophoretic force on micro-objects in the microfluidic circuit 120. An OET configured device may include photo-activatable electrodes to provide selective control of movement of micro-objects in the microfluidic circuit 120 via light-induced dielectrophoresis.

The imaging module 164 can control the imaging device. For example, the imaging module 164 can receive and process image data from the imaging device. Image data from the imaging device can comprise any type of information captured by the imaging device (e.g., the presence or absence of micro-objects, droplets of medium, accumulation of label, such as fluorescent label, etc.). Using the information captured by the imaging device, the imaging module 164 can further calculate the position of objects (e.g., micro-objects, droplets of medium) and/or the rate of motion of such objects within the microfluidic device 100.

The imaging device (part of imaging module 164, discussed below) can comprise a device, such as a digital camera, for capturing images inside microfluidic circuit 120. In some instances, the imaging device further comprises a detector having a fast frame rate and/or high sensitivity (e.g., for low light applications). The imaging device can also include a mechanism for directing stimulating radiation and/or light beams into the microfluidic circuit 120 and collecting radiation and/or light beams reflected or emitted from the microfluidic circuit 120 (or micro-objects contained therein). The emitted light beams may be in the visible spectrum and may, e.g., include fluorescent emissions. The reflected light beams may include reflected emissions originating from an LED or a wide spectrum lamp, such as a mercury lamp (e.g., a high-pressure mercury lamp) or a Xenon arc lamp. The imaging device may further include a microscope (or an optical train), which may or may not include an eyepiece.

Support Structure. System 150 may further comprise a support structure 190 configured to support and/or hold the enclosure 102 comprising the microfluidic circuit 120. In some embodiments, the optional tilting module 166 can be configured to activate the support structure 190 to rotate the microfluidic device 100 about one or more axes of rotation. The optional tilting module 166 can be configured to support and/or hold the microfluidic device 100 in a level orientation (i.e., at 0° relative to x- and y-axes), a vertical orientation (i.e., at 90° relative to the x-axis and/or the y-axis), or any orientation therebetween. The orientation of the microfluidic device 100 (and the microfluidic circuit 120) relative to an axis is referred to herein as the "tilt" of the microfluidic device 100 (and the microfluidic circuit 120). For example, support structure 190 can optionally be used to tilt the microfluidic device 100 (e.g., as controlled by optional tilting module 166) to 0.1°, 0.2°, 0.3°, 0.4°, 0.5°, 0.6°, 0.7°, 0.8°, 0.9°, 1°, 2°, 3°, 4°, 5°, 10°, 15°, 20°, 25°, 30°, 35°, 40°, 45°, 50°, 55°, 60°, 65°, 70°, 75°, 80°, 90° relative to the x-axis or any degree therebetween. When the microfluidic device is tilted at angles greater than about 15, tilting may be performed to create bulk movement of micro-objects into/out of sequestration pens from/into the flow region (e.g., microfluidic channel). In some embodiments, the support structure 190 can hold the microfluidic device 100 at a fixed angle of 0.1°, 0.2°, 0.3°, 0.4°, 0.5°, 0.6°, 0.7°, 0.8°, 0.9°, 1°, 2°, 3°, 4°, or 10° relative to the x-axis (horizontal), so long as DEP is an effective force to move micro-objects out of the sequestration pens into the microfluidic channel. Since the surface of the electrode activation substrate is substantially flat, DEP forces may be used even when the far end of the sequestration pen, opposite its opening to the microfluidic channel, is disposed at a position lower in a vertical direction than the microfluidic channel.

In some embodiments where the microfluidic device is tilted or held at a fixed angle relative to horizontal, the microfluidic device 100 may be disposed in an orientation such that the inner surface of the base of the flow path 106 is positioned at an angle above or below the inner surface of the base of the one or more sequestration pens opening laterally to the flow path. The term "above" as used herein denotes that the flow path 106 is positioned higher than the one or more sequestration pens on a vertical axis defined by the force of gravity (i.e., an object in a sequestration pen above a flow path 106 would have a higher gravitational potential energy than an object in the flow path), and inversely, for positioning of the flow path 106 below one or more sequestration pens. In some embodiments, the support structure 190 may be held at a fixed angle of less than about 5°, about 4°, about 3° or less than about 2° relative to the x-axis (horizontal), thereby placing the sequestration pens at a lower potential energy relative to the flow path. In some other embodiments, when long term culturing (e.g., for more than about 2, 3, 4, 5, 6, 7 or more days) is performed within the microfluidic device, the device may be supported on a culturing support and may be tilted at a greater angle of about 10°, 15°, 20°, 25°, 30°, or any angle therebetween to retain biological micro-objects within the sequestration pens during the long-term culturing period. At the end of the culturing period, the microfluidic device containing the cultured biological micro-objects may be returned to the support 190 within system 150, where the angle of tilting is decreased to values as described above, affording the use of DEP to move the biological micro-objects out of the sequestration pens. Further examples of the use of gravitational forces induced by tilting are described in U.S. Pat. No. 9,744,533 (Breinlinger et al.), the contents of which are herein incorporated by reference in its entirety.

Figure 5A:
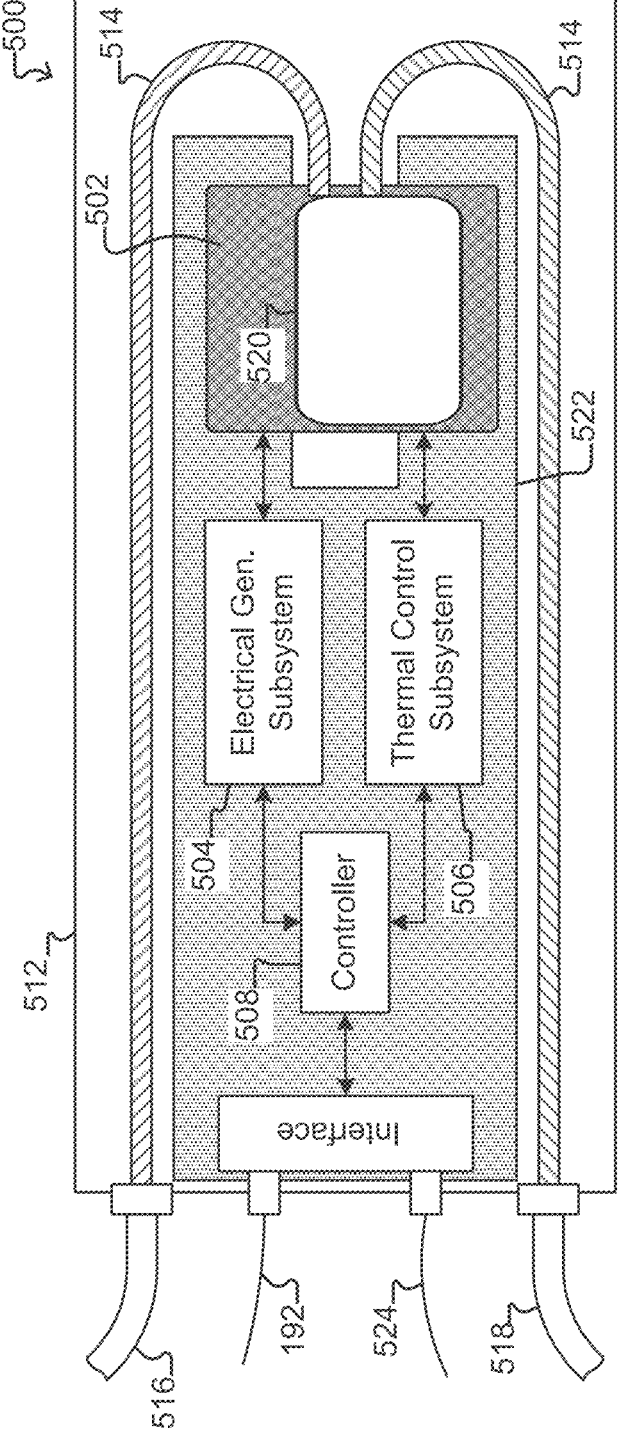
FIG. 5A illustrates a system for use with a microfluidic device and associated control equipment according to some embodiments of the disclosure.

Nest. Turning now to FIG. 5A, the system 150 can include a structure (also referred to as a "nest") 500 configured to hold a microfluidic device 520, which may be like microfluidic device 100, 200, or any other microfluidic device described herein. The nest 500 can include a socket 502 capable of interfacing with the microfluidic device 520 (e.g., an optically actuated electrokinetic device 100, 200, etc.) and providing electrical connections from power source 192 to microfluidic device 520. The nest 500 can further include an integrated electrical signal generation subsystem 504. The electrical signal generation subsystem 504 can be configured to supply a biasing voltage to socket 502 such that the biasing voltage is applied across a pair of electrodes in the microfluidic device 520 when it is being held by socket 502. Thus, the electrical signal generation subsystem 504 can be part of power source 192. The ability to apply a biasing voltage to microfluidic device 520 does not mean that a biasing voltage will be applied at all times when the microfluidic device 520 is held by the socket 502. Rather, in most cases, the biasing voltage will be applied intermittently, e.g., only as needed to facilitate the generation of electrokinetic forces, such as dielectrophoresis or electrowetting, in the microfluidic device 520.

As illustrated in FIG. 5A, the nest 500 can include a printed circuit board assembly (PCBA) 522. The electrical signal generation subsystem 504 can be mounted on and electrically integrated into the PCBA 522. The exemplary support includes socket 502 mounted on PCBA 522, as well.

In some embodiments, the nest 500 can comprise an electrical signal generation subsystem 504 configured to measure the amplified voltage at the microfluidic device 520 and then adjust its own output voltage as needed such that the measured voltage at the microfluidic device 520 is the desired value. In some embodiments, the waveform amplification circuit can have a +6.5V to −6.5V power supply generated by a pair of DC-DC converters mounted on the PCBA 522, resulting in a signal of up to 13 Vpp at the microfluidic device 520.

In certain embodiments, the nest 500 further comprises a controller 508, such as a microprocessor used to sense and/or control the electrical signal generation subsystem 504. Examples of suitable microprocessors include the Arduino™ microprocessors, such as the Arduino Nano™. The controller 508 may be used to perform functions and analysis or may communicate with an external master controller 154 (shown in FIG. 1A) to perform functions and analysis. In the embodiment illustrated in FIG. 5A the controller 508 communicates with the master controller 154 (of FIG. 1A) through an interface (e.g., a plug or connector).

As illustrated in FIG. 5A, the support structure 500 (e.g., nest) can further include a thermal control subsystem 506. The thermal control subsystem 506 can be configured to regulate the temperature of microfluidic device 520 held by the support structure 500. For example, the thermal control subsystem 506 can include a Peltier thermoelectric device (not shown) and a cooling unit (not shown). In the embodiment illustrated in FIG. 5A, the support structure 500 comprises an inlet 516 and an outlet 518 to receive cooled fluid from an external reservoir (not shown) of the cooling unit, introduce the cooled fluid into the fluidic path 514 and through the cooling block, and then return the cooled fluid to the external reservoir. In some embodiments, the Peltier thermoelectric device, the cooling unit, and/or the fluidic path 514 can be mounted on a casing 512 of the support structure 500. In some embodiments, the thermal control subsystem 506 is configured to regulate the temperature of the Peltier thermoelectric device so as to achieve a target temperature for the microfluidic device 520. Temperature regulation of the Peltier thermoelectric device can be achieved, for example, by a thermoelectric power supply, such as a Pololu™ thermoelectric power supply (Pololu Robotics and Electronics Corp.). The thermal control subsystem 506 can include a feedback circuit, such as a temperature value provided by an analog circuit. Alternatively, the feedback circuit can be provided by a digital circuit.

The nest 500 can include a serial port 524 which allows the microprocessor of the controller 508 to communicate with an external master controller 154 via the interface. In addition, the microprocessor of the controller 508 can communicate (e.g., via a Plink tool (not shown)) with the electrical signal generation subsystem 504 and thermal control subsystem 506. Thus, via the combination of the controller 508, the interface, and the serial port 524, the electrical signal generation subsystem 504 and the thermal control subsystem 506 can communicate with the external master controller 154. In this manner, the master controller 154 can, among other things, assist the electrical signal generation subsystem 504 by performing scaling calculations for output voltage adjustments. A Graphical User Interface (GUI) (not shown) provided via a display device 170 coupled to the external master controller 154, can be configured to plot temperature and waveform data obtained from the thermal control subsystem 506 and the electrical signal generation subsystem 504, respectively. Alternatively, or in addition, the GUI can allow for updates to the controller 508, the thermal control subsystem 506, and the electrical signal generation subsystem 504.

Figure 5B:
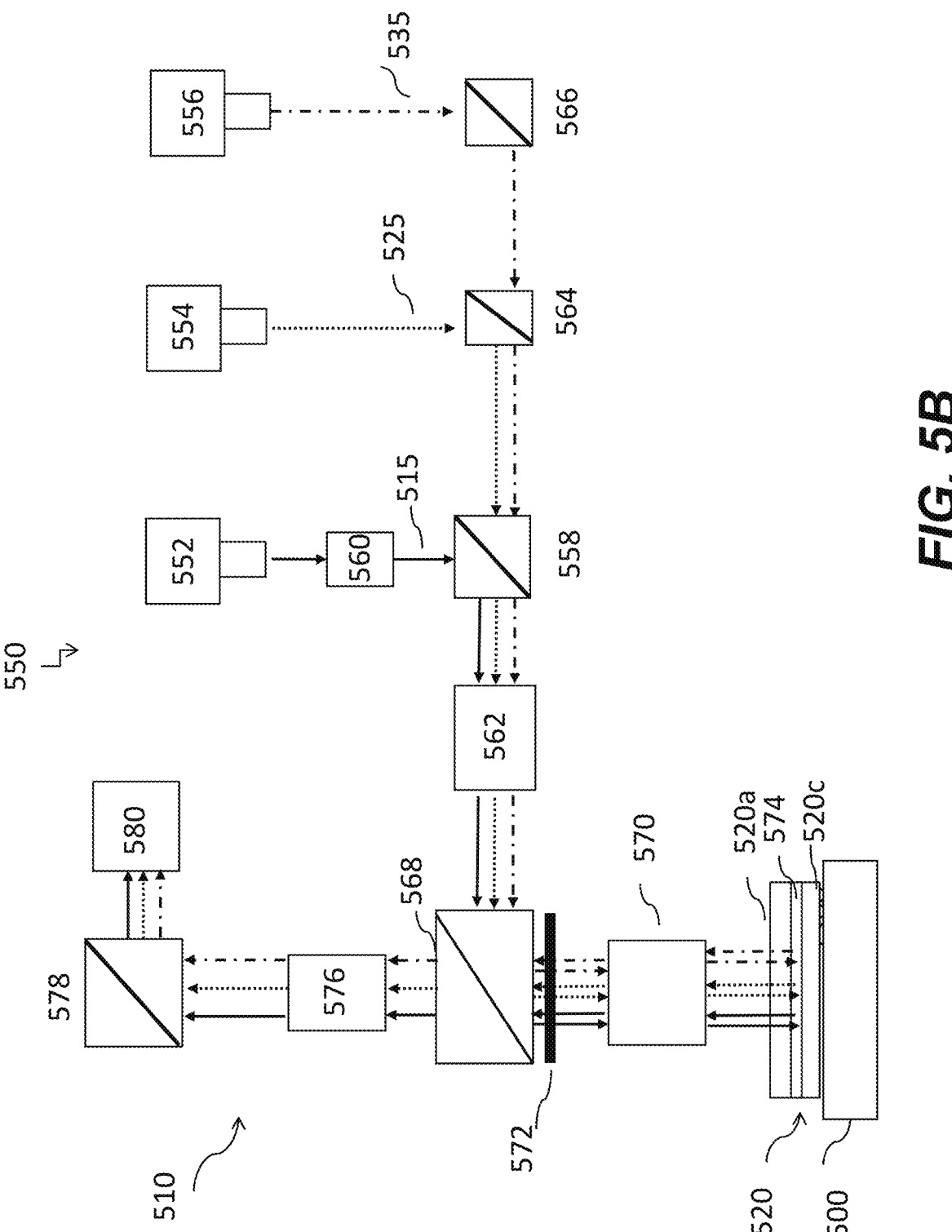
FIG. 5B illustrates an imaging device according to some embodiments of the disclosure.

Optical sub-system. FIG. 5B is a schematic of an optical sub-system 550 having an optical apparatus 510 for imaging and manipulating micro-objects in a microfluidic device 520, which can be any microfluidic device described herein. The optical apparatus 510 can be configured to perform imaging, analysis and manipulation of one or more micro-objects within the enclosure of the microfluidic device 520.

The optical apparatus 510 may have a first light source 552, a second light source 554, and a third light source 556. The first light source 552 can transmit light to a structured light modulator 560, which can include a digital mirror device (DMD) or a microshutter array system (MSA), either of which can be configured to receive light from the first light source 552 and selectively transmit a subset of the received light into the optical apparatus 510. Alternatively, the structured light modulator 560 can include a device that produces its own light (and thus dispenses with the need for a light source 552), such as an organic light emitting diode display (OLED), a liquid crystal on silicon (LCOS) device, a ferroelectric liquid crystal on silicon device (FLCOS), or a transmissive liquid crystal display (LCD). The structured light modulator 560 can be, for example, a projector. Thus, the structured light modulator 560 can be capable of emitting both structured and unstructured light. In certain embodiments, an imaging module and/or motive module of the system can control the structured light modulator 560.

In embodiments when the structured light modulator 560 includes a mirror, the modulator can have a plurality of mirrors. Each mirror of the plurality of mirrors can have a size of about 5 microns×5 microns to about 10 microns×10 microns, or any values therebetween. The structured light modulator 560 can include an array of mirrors (or pixels) that is 2000×1000, 2580×1600, 3000×2000, or any values therebetween. In some embodiments, only a portion of an illumination area of the structured light modulator 560 is used. The structured light modulator 560 can transmit the selected subset of light to a first dichroic beam splitter 558, which can reflect this light to a first tube lens 562.

The first tube lens 562 can have a large clear aperture, for example, a diameter larger than about 40 mm to about 50 mm, or more, providing a large field of view. Thus, the first tube lens 562 can have an aperture that is large enough to capture all (or substantially all) of the light beams emanating from the structured light modulator 560.

The structured light 515 having a wavelength of about 400 nm to about 710 nm, may alternatively or in addition, provide fluorescent excitation illumination to the microfluidic device.

The second light source 554 may provide unstructured brightfield illumination. The brightfield illumination light 525 may have any suitable wavelength, and in some embodiments, may have a wavelength of about 400 nm to about 760 nm. The second light source 554 can transmit light to a second dichroic beam splitter 564 (which also may receive illumination light 535 from the third light source 556), and the second light, brightfield illumination light 525, may be transmitted therefrom to the first dichroic beam splitter 558. The second light, brightfield illumination light 525, may then be transmitted from the first dichroic beam splitter 558 to the first tube lens 562.

The third light source 556 can transmit light through a matched pair relay lens (not shown) to a mirror 566. The third illumination light 535 may therefrom be reflected to the second dichroic beam splitter 564 and be transmitted therefrom to the first beam splitter 558, and onward to the first tube lens 562. The third illumination light 535 may be a laser and may have any suitable wavelength. In some embodiments, the laser illumination 535 may have a wavelength of about 350 nm to about 900 nm. The laser illumination 535 may be configured to heat portions of one or more sequestration pens within the microfluidic device. The laser illumination 535 may be configured to heat fluidic medium, a micro-object, a wall or a portion of a wall of a sequestration pen, a metal target disposed within a microfluidic channel or sequestration pen of the microfluidic channel, or a photoreversible physical barrier within the microfluidic device, and described in more detail in U.S. Application Publication Nos. 2017/0165667 (Beaumont, et al.) and 2018/0298318 (Kurz, et al.), each of which disclosure is herein incorporated by reference in its entirety. In other embodiments, the laser illumination 535 may be configured to initiate photocleavage of surface modifying moieties of a modified surface of the microfluidic device or photocleavage of moieties providing adherent functionalities for micro-objects within a sequestration pen within the microfluidic device. Further details of photocleavage using a laser may be found in International Application Publication No. WO2017/205830 (Lowe, Jr. et al.), which disclosure is herein incorporated by reference in its entirety.

The light from the first, second, and third light sources (552, 554, 556) passes through the first tube lens 562 and is transmitted to a third dichroic beam splitter 568 and filter changer 572. The third dichroic beam splitter 568 can reflect a portion of the light and transmit the light through one or more filters in the filter changer 572 and to the objective 570, which may be an objective changer with a plurality of different objectives that can be switched on demand. Some of the light (515, 525, and/or 535) may pass through the third dichroic beam splitter 568 and be terminated or absorbed by a beam block (not shown). The light reflected from the third dichroic beam splitter 568 passes through the objective 570 to illuminate the sample plane 574, which can be a portion of a microfluidic device 520 such as the sequestration pens described herein.

The nest 500, as described in FIG. 5A, can be integrated with the optical apparatus 510 and be a part of the apparatus 510. The nest 500 can provide electrical connection to the enclosure and be further configured to provide fluidic connections to the enclosure. Users may load the microfluidic apparatus 520 into the nest 500. In some other embodiments, the nest 500 can be a separate component independent of the optical apparatus 510.

Light can be reflected off and/or emitted from the sample plane 574 to pass back through the objective 570, through the filter changer 572, and through the third dichroic beam splitter 568 to a second tube lens 576. The light can pass through the second tube lens 576 (or imaging tube lens 576) and be reflected from a mirror 578 to an imaging sensor 580. Stray light baffles (not shown) can be placed between the first tube lens 562 and the third dichroic beam splitter 568, between the third dichroic beam splitter 568 and the second tube lens 576, and between the second tube lens 576 and the imaging sensor 580.

Objective. The optical apparatus can comprise the objective lens 570 that is specifically designed and configured for viewing and manipulating of micro-objects in the microfluidic device 520. For example, conventional microscope objective lenses are designed to view micro-objects on a slide or through 5 mm of aqueous fluid, while micro-objects in the microfluidic device 520 are inside the plurality of sequestration pens within the viewing plane 574 which have a depth of 20, 30, 40, 50, 60 70, 80 microns or any values therebetween. In some embodiments, a transparent cover 520a, for example, glass or ITO cover with a thickness of about 750 microns, can be placed on top of the plurality of sequestration pens, which are disposed above a microfluidic substrate 520c. Thus, the images of the micro-objects obtained by using the conventional microscope objective lenses may have large aberrations such as spherical and chromatic aberrations, which can degrade the quality of the images. The objective lens 570 of the optical apparatus 510 can be configured to correct the spherical and chromatic aberrations in the optical apparatus 510. The objective lens 570 can have one or more magnification levels available such as, 4×, 10×, 20×.

Modes of illumination. In some embodiments, the structured light modulator 560 can be configured to modulate light beams received from the first light source 552 and transmits a plurality of illumination light beams 515, which are structured light beams, into the enclosure of the microfluidic device, e.g., the region containing the sequestration pens. The structured light beams can comprise the plurality of illumination light beams. The plurality of illumination light beams can be selectively activated to generate a plurality of illuminations patterns. In some embodiments, the structured light modulator 560 can be configured to generate an illumination pattern, similarly as described for FIGS. 4A-4B, which can be moved and adjusted. The optical apparatus 510 can further comprise a control unit (not shown) which is configured to adjust the illumination pattern to selectively activate the one or more of the plurality of DEP electrodes of a substrate 520c and generate DEP forces to move the one or more micro-objects inside the plurality of sequestration pens within the microfluidic device 520. For example, the plurality of illuminations patterns can be adjusted over time in a controlled manner to manipulate the micro-objects in the microfluidic device 520. Each of the plurality of illumination patterns can be shifted to shift the location of the DEP force generated and to move the structured light for one position to another in order to move the micro-objects within the enclosure of the microfluidic apparatus 520.

In some embodiments, the optical apparatus 510 may be configured such that each of the plurality of sequestration pens in the sample plane 574 within the field of view is simultaneously in focus at the image sensor 580 and at the structured light modulator 560. In some embodiments, the structured light modulator 560 can be disposed at a conjugate plane of the image sensor 580. In various embodiments, the optical apparatus 510 can have a confocal configuration or confocal property. The optical apparatus 510 can be further configured such that only each interior area of the flow region and/or each of the plurality of sequestration pens in the sample plane 574 within the field of view is imaged onto the image sensor 580 in order to reduce overall noise to thereby increase the contrast and resolution of the image.

In some embodiments, the first tube lens 562 can be configured to generate collimated light beams and transmit the collimated light beams to the objective lens 570. The objective 570 can receive the collimated light beams from the first tube lens 562 and focus the collimated light beams into each interior area of the flow region and each of the plurality of sequestration pens in the sample plane 574 within the field of view of the image sensor 580 or the optical apparatus 510. In some embodiments, the first tube lens 562 can be configured to generate a plurality of collimated light beams and transmit the plurality of collimated light beams to the objective lens 570. The objective 570 can receive the plurality of collimated light beams from the first tube lens 562 and converge the plurality of collimated light beams into each of the plurality of sequestration pens in the sample plane 574 within the field of view of the image sensor 580 or the optical apparatus 510.

In some embodiments, the optical apparatus 510 can be configured to illuminate the at least a portion of sequestration pens with a plurality of illumination spots. The objective 570 can receive the plurality of collimated light beams from the first tube lens 562 and project the plurality of illumination spots, which may form an illumination pattern, into each of the plurality of sequestration pens in the sample plane 574 within the field of view. For example, each of the plurality of illumination spots can have a size of about 5 microns×5 microns; 10 microns×10 microns; 10 microns× 30 microns, 30 microns×60 microns, 40 microns×40 microns, 40 microns×60 microns, 60 microns×120 microns, 80 microns×100 microns, 100 microns×140 microns and any values there between. The illumination spots may individually have a shape that is circular, square, or rectangular. Alternatively, the illumination spots may be grouped within a plurality of illumination spots (e.g., an illumination pattern) to form a larger polygonal shape such as a rectangle, square, or wedge shape. The illumination pattern may enclose (e.g., surround) an unilluminated space that may be square, rectangular or polygonal. For example, each of the plurality of illumination spots can have an area of about 150 to about 3000, about 4000 to about 10000, or 5000 to about 15000 square microns. An illumination pattern may have an area of about 1000 to about 8000, about 4000 to about 10000, 7000 to about 20000, 8000 to about 22000, 10000 to about 25000 square microns and any values there between.

The optical system 510 may be used to determine how to reposition micro-objects and into and out of the sequestration pens of the microfluidic device, as well as to count the number of micro-objects present within the microfluidic circuit of the device. Further details of repositioning and counting micro-objects are found in U.S. Application Publication No. 2016/0160259 (Du); U.S. Pat. No. 9,996,920 (Du et al.); and International Application Publication No. WO2017/102748 (Kim, et al.). The optical system 510 may also be employed in assay methods to determine concentrations of reagents/assay products, and further details are found in U.S. Pat. No. 8,921,055 (Chapman), U.S. Pat. No. 10,010,882 (White et al.), and U.S. Pat. No. 9,889,445 (Chapman et al.); International Application Publication No. WO2017/181135 (Lionberger, et al.); and International Application Serial No. PCT/US2018/055918 (Lionberger, et al.). Further details of the features of optical apparatuses suitable for use within a system for observing and manipulating micro-objects within a microfluidic device, as described herein, may be found in WO2018/102747 (Lundquist, et al), the disclosure of which is herein incorporated by reference in its entirety.

Additional system components for maintenance of viability of cells within the sequestration pens of the microfluidic device. In order to promote growth and/or expansion of cell populations, environmental conditions conducive to maintaining functional cells may be provided by additional components of the system. For example, such additional components can provide nutrients, cell growth signaling species, pH modulation, gas exchange, temperature control, and removal of waste products from cells.

EXPERIMENTAL

System and device: An OptoSelect™ device, a nanofluidic device controlled by an optical instrument, Beacon® were employed (Both are manufactured by Berkeley Lights, Inc.) The instrument includes: a mounting stage for the chip coupled to a temperature controller; a pump and fluid medium conditioning component; and an optical train including a camera and a structured light source suitable for activating phototransistors within the chip. The OptoSelect device includes a substrate configured with OptoElectroPositioning (OEP™) technology, which provides a phototransistor-activated OET force. The chip also included a plurality of microfluidic channels, each having a plurality of NanoPen™ chambers (or chambers) fluidically connected thereto. The volume of each chamber is around $1 \times 10^6$ cubic microns.

Device priming. 250 microliters of 100% carbon dioxide was flowed in to the OptoSelect device at a rate of 12 microliters/sec, followed by 250 microliters of PBS containing 0.1% Pluronic® F27 (Life Technologies® Cat #P6866) flowed in at 12 microliters/sec, and finally 250 microliters of PBS flowed in at 12 microliters/sec. Introduction of a Wetting Solution follows, which introduces a conditioned surface to the surfaces within the microfluidic device. The details of the surface and its introduction are described in US Application Publication US 2016/0312165, filed on Apr. 22, 2016 and U.S. Application Publication No. US2019/0275516, filed on Nov. 20, 2018, each of which disclosures are herein incorporated by reference in its entirety.

Media perfusion during culture. Medium is perfused through the OptoSelect™ device according to either of the following two methods: (1) Perfuse at 0.01 microliters/sec for 2 h; perfuse at 2 microliters/sec for 64 sec; and repeat. (2) Perfuse at 0.02 microliters/sec for 100 sec; stop flow 500 sec; perfuse at 2 microliters/sec for 64 sec; and repeat.

System Preparation. Prior to initiating the workflow, the Beacon instrument was sterilized by purging all fluidic lines with SporGon decontamination reagent (Decon Labs, Inc.). After soaking for 2 hours, lines were rinsed with sterile water for 1 hour to eliminate residual SporGon.

Following sterilization, OptoSelect™ chips were loaded onto Beacon instrument for a sequence of pre-workflow operations. The Wetting Solution was introduced to the chip and then incubated to functionalize the surfaces. DI water was then flushed through each chip to remove the Wetting Solution.

After wetting and priming, the Beacon instrument automatically located the fiducial markers on the chips for x-y stage and focus calibration. Lastly, two types of reference imaging were performed sequentially. The bright-field high-magnification (10× objective) images were taken across the chips as a reference for the quantification of colony size during cell culture. Subsequently, the fluorescence images (4× objective, FITC channel) were captured before and after equilibrating 50 mg/L of the final product throughout all OptoSelect chips. The fluorescence images taken before and after equilibration were used as the background reference and the normalization reference, respectively, for the quantification of product concentration during the productivity assay.

Single-Cell Loading. Broth from microplate precultures or mutagenesis recovery was diluted in PBS to a target OD600 of 0.1 and transferred to a 300-microliter 96-well plate for import (Corning). The import plate was then loaded into the well-plate incubator on the Beacon instrument for single cell loading. During the loading process, the temperatures of the well-plate incubator and the OptoS elect chips were set at 4° C. and 18° C., respectively, to reduce cell proliferation during the loading period.

For each strain to be loaded into the NanoPen chambers, 25 μL of cell suspension was imported from the well-plate incubator to the channels of the OptoSelect chips. Single cells were identified automatically by the Beacon instrument control software using a convolutional neural network algorithm optimized for yeast cells. A positioning strategy was then automatically implemented to maximize loading throughput using the OEP technology. Residual cells in the channels were flushed to waste after loading. In general, it took roughly 4-5 hours to load the cells across all 4 chips in a single library screen workflow.

Experiment 1: Biomass Measurement of Nonmammalian Cells

Example 1-1: Yeast Culture and Standard Curve

Cells from a *Pichia* cell population engineered to secrete a non-endogenous product, e.g., protein, organic molecule, and the like, were suspended in PBS and introduced into an OptoSelect™ microfluidic device, e.g., chip, in a Beacon® Optofluidic system for biomass measurement. In Examples 1-1 to 1-5, the chip is a sealed chip, which prevents exchange of gaseous components through the edges of the chip construction. The sealed chip is described in further detail in International Application Serial No. PCT/US2021/048196, entitled "Apparatuses, Methods and Kits for Microfluidic Assays", filed on Aug. 30, 2021, and published as International Application Publication WO2022/047290, the entire disclosure of which is herein incorporated by reference. Single cells were disposed into respective sequestration pens and cultured on-chip at 27° C. with constant perfusion of fresh medium BMMY (Buffered Methanol-Complex Medium) 1% methanol and 80% air fraction. Time-lapse bright-field images were taken every 30 minutes to keep track of cell growth for each colony. After 48 hours, the bright-field biomass measurements were analyzed using the Cell Analysis Suite 2.1 Software from Berkeley Lights (See International Application No. PCT/US2020/060784, entitled "Systems and Methods for Analysis of Biological Samples, filed on Nov. 16, 2020 and published as International Application Publication WO20210987449 A1, the entire disclosure of which is incorporated by reference for any purpose).

The OD score of the colony in each sequestration pen was quantified as described above in the section entitled "Biomass Measurement". However, other methods of measuring OD may be used in other variations of this experiment.

The cells in each sequestration pen were also counted by using the Dalmatian algorithm as described in Sergey A Shuvaev et al., DALMATIAN: An Algorithm for Automatic Cell Detection and Counting in 3D., *Front Neuroanat* 2017 Dec. 12; 11:117, which disclosure is herein incorporated by reference in its entirety. The OD scores were plotted against the cell counts, and the linear correlation between the OD scores and the cell counts were determined by using a linear regression model. The coefficient of variations (CV) of cell counts according to 0.02 OD score intervals were determined respectively.

The results show that the OD scores obtained by the method of the present disclosure were correlated with the cell count number using Dalmatian algorithm (FIG. 9A). Furthermore, the CV values were below 15% by any OD scores above 0.04 and below 10% for any OD scores above around 0.09 (FIG. 9B). These results prove the method of the present disclosure can provide liable biomass measurement that is relative to actual cell counts.

Experiment 2: Bioproductivity Assessment: Bead Assay, Diffusion Gradient Assay, and Accumulation Assay

Example 2-1: Hydrogels Forming Assay Barriers

In Examples 1-2 through 1-4, variations on an 8 arm 20K PEG polymer were used to form the hydrogel barriers. The extent of crosslinking with resultant effects on permeability/impermeability was controlled by varying the length of photopatterning (about 1000 msec to about 5 sec, or repeated exposures of about 1000 msec); the concentration of inhibitor present in the hydrogel solution introduced into the microfluidic device; and the proportion of crosslinkable moieties on the 8 armed modified PEG polymer.

Variation A. The effect of hydrogel composition and extent of crosslinking was examined. Two polymer compositions were examined: the first as an 8 arm, 8 acrylamide terminated 20K PEG polymer. The second composition was a 90:10 mixture of the 8 arm, 8 acrylamide terminated 20K PEG polymer: linear (larm) acrylamide 20 kDa PEG polymer. Each was introduced to a microfluidic chip and polymerized in different sections using different lengths of exposure and power, ranging from 40% power to 100% power, and 3 sec to 20 sec. Some of these conditions did not create fully polymerized hydrogel barriers (FIG. 6A, 605 type having a thickness of about 100 microns). However, 50% power, 20 sec ensures fully sealing barriers and was used for diffusion experiments.

A mixture of FITC-labelled IgG (150 kDA) and Alexa-647 labeled streptavidin (66 kDa) was perfused through the device after hydrogel formation. Images were obtained 1hr after initial introduction of the labelled materials in the respective color cube. As seen in FIG. 10A, the hydrogel barrier permitted a significant amount of fluorescently labeled streptavidin to diffuse into the culturing area distal to the hydrogel barrier. In contrast, in FIG. 10B, the same pen (annotated as 336) did not permit diffusion of the FITC-IgG across the hydrogel barrier. Results (data not shown) were the same with the hydrogel barrier formed from the 90:10 mixture of 8 arm: linear PEG polymers.

Variation B. Permeability control was examined by creating hydrogel barriers fully spanning the width of the sequestration pen.

The behavior of two different formulations was examined (formulation F1 equals 100% 8 arm 20K PEG having 8 acrylamide termini; formulation F2 equals 25% 8 arm 20K PEG having 8 acrylamide termini: 75% 8 arm 20K PEG having 1 acrylamide terminus, 7 non-crosslinkable termini (e.g., hydroxyl termini). The initiator and inhibitor ratios were the same (Lithium phenyl-2,4,6 trimethylbenzoylphosphinate, LAP) and photoinitiator (hydroquinone monomethyl ether, MEHQ). Different sections of sequestration pens on the same microfluidic chip had two different types of hydrogel barriers introduced. The first type was a mid-pen barrier having a thickness of about 15 microns, leaving a culturing region distal to the barrier. The second type of barrier was a hydrogel plug that extended to the distal end of the sequestration pen. F1 formulation barriers were introduced using a 1 to 1.5 second exposure, 10× objective, 50% power for both types of barriers. F2 formulation barriers were introduced using a 3.5 sec to 5 sec exposure, 10× objective, 50% power.

Three different reagent flows were successively introduced. For each reagent flow, images were obtained after a 90 min period of equilibration.

Flow 1: Fluorescent anti-Spot nanobody (MW=30 kDa), shown in FIG. 11A.

Flow 2: Fluorescent anti-SPOT nanobody plus Protein (MW=50-55 kDa), shown in FIG. 11B.

Flow 3: Fluorescent anti-SPOT nanobody plus Protein (MW=50-55 kDa) plus anti-FLAG antibody (MW=150 kDa), shown in FIG. 11C.

Figures 11A, 11B, 11C:
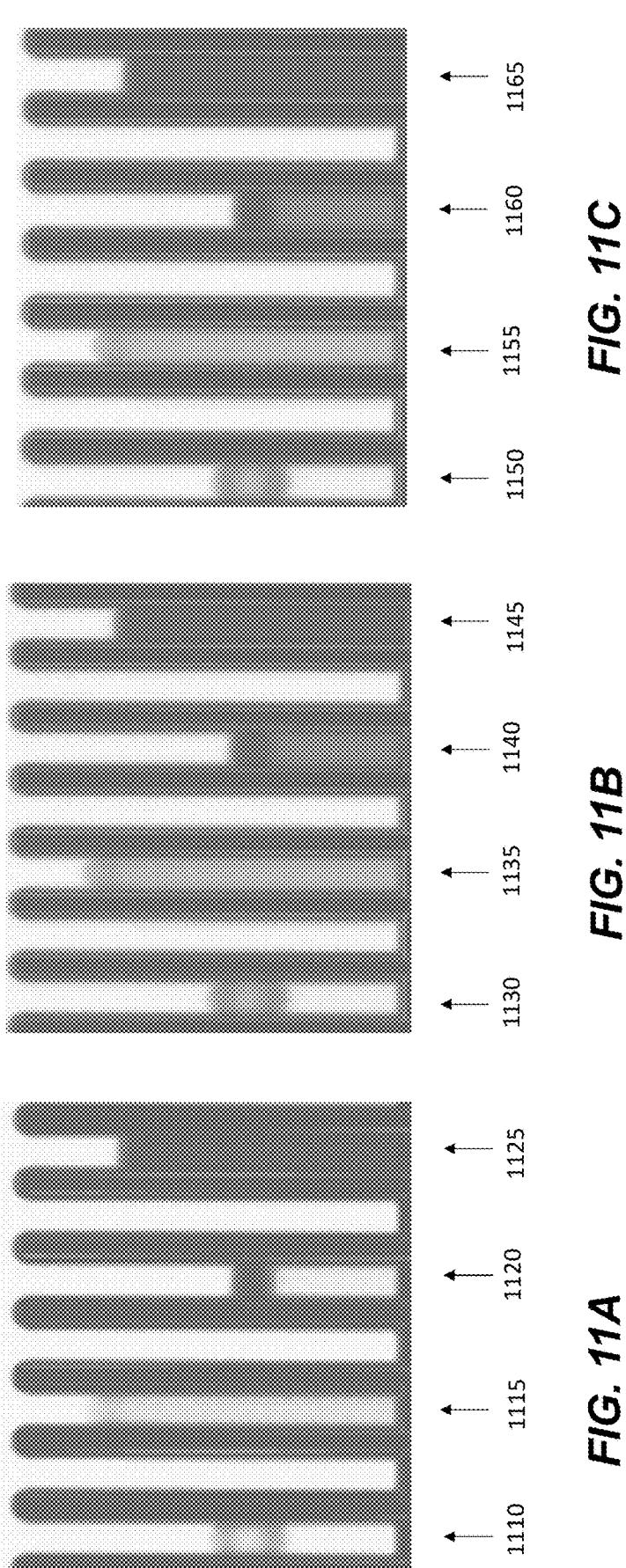
FIGS. 11A to 11C are photographic representation of fluorescent images of chamber with size dependent permeability according to some embodiments of the disclosure.

As is shown in FIGS. 11A-11C, the low molecular weight labelled nanobody can easily diffuse through the F2 mid-pen 15 micron barrier, as shown in each of pens 1110, 1130, 1150, equilibrating to essentially the same concentration as that of the channel and the area of the pen proximal to the barrier. In FIG. 11A, the hydrogel plug in pen 1115 showed significant amounts of the small labelled reagent, demonstrating that diffusion occurs through the hydrogel and is not due to diffusion around the barrier. Additionally, the barrier having the denser F1 formulation, as shown in pen 1120 also permits diffusion through the barrier, but at a reduced concentration. In pen 1125, the denser F1 formulation hydrogel plus shows quite limited diffusion of the low molecular weight reagent.

In FIG. 11B, where the larger protein is present and which binds to the fluorescently labelled reagent, forming a higher weight complex, affecting diffusion of the bound pair. While not easily seen in pen 1130, the effect is more evident in pen 1135, having the hydrogel plug. The larger bound complex cannot as easily diffuse into the hydrogel, even with the F2 formulation. The denser hydrogels of pens 1140 and 1145 show increasingly decreased amounts of fluorescent reagent, and the large reagent: analyte complex is cannot easily diffuse through.

FIG. 11C shows the effect of adding an anti-FLAG antibody to the reagent mixture, which can also bind to the protein, thus making an even larger tri-component complex. The levels of diffusion were slightly more inhibited in pens 1150, 1155, 1160, 1165.

Further variations: The ratios of 8 arm, 8 acrylamide termini polymer: 8 arm, 1 acrylamide termini polymer may be varied to be in any suitable ratio, e.g., about 10:90; 20:80; 30:70; 40:60; 50:50; 60:40; 70:30; 80:20; 90:10 w/w % or any value therebetween. The molecular weights of the PEG polymers may be varied and do not need to be 20K polymers, but may have a MW of about 5 kDA, 10 kDa, 15 kDa, 20 kDa or more. A consideration in combining polymers of different molecular weights that the rate of diffusion into the pen depends upon the molecular weight. Therefore, the actual ratio of polymers in the pen available for polymerization will therefore reflect the difference in diffusion rates.

Example 2-2: Hydrogel Geometry for Assaying Soluble Bioproduct

In this example, various hydrogel shapes were formed in the sequestration pen. They were tested for their performance for retaining cells within the distal culturing region of the sequestration pen, as well as assaying productivity, for example, but not limited to using a diffusion gradient assay. Protocols for typical diffusion gradient assays are more fully described in International Application Serial No. PCT/2017/027795, entitled "Methods, Systems, and Kits for In-Pen Assays", filed on Apr. 14, 2017, published as International Application Publication WO2017/1811135; International Application Serial No. PCT/US2018/055918, entitled "Methods, Systems, and Kits for In-Pen Assays", filed on Oct. 15, 2018, published as International Application Publication WO2019/075476; and International Application Serial No. PCT/US2021/021417, entitled "Methods, Systems, and Kits for In-Pen Assays", filed on Mar. 9, 2020, published as International Application Publication WO2021/184458, the entirety of each of which disclosures are herein incorporated by reference for any purpose.).

*Pichia* cells engineered to secrete a non-endogenous protein were suspended in BMGY (Buffered Glycerol-complex Medium) medium before loading. The engineered non-endogenous protein sequence also included Spot-tag, an inert, unstructured 12 amino acid sequence added to the genetic insert. The additional 12 amino acid sequence is added to a region of the engineered insertion sequence located outside (to the N-terminal end or the C-terminal end) of the desired non-endogenous protein sequence, which can be detected by anti-SPOT nanobodies (Chromotek™). The cells were introduced and disposed into respective sequestration pens by gravity. Hydrogel mixture was introduced into the flow region and allowed to diffuse into the sequestration pens. Then, gel polymerization was initiated by photoactivation at selected area to form various shapes, including full cap (15 μm band fully spanning pen, FIG. 6A, barrier 605, center bar (15 microns, as measured in the distal-to-pen opening to proximal-to-pen opening dimension "thickness"×20 microns, "width", as measured from pen wall to pen wall, forming a pillar centered in the pen leaving a 10 micron gap to the pen walls on each side, FIG. 6A, barrier 610, half bar (15 micron thick band extending from the left wall to the center of the pen, FIG. 6A, barrier 615, and side bars (Two 15 micron thick bands extending from left and right wall leaving an approximately 20 micron gap at the center of the pen, FIG. 6A, barrier 620. The hydrogel barrier(s) were formed in mid-pen and separated the sequestration pen into two areas. The area distal from the opening of the sequestration pen was used as a culture area for cells to live and expand.

Cells were cultured on-chip with constant perfusion of fresh BMGY medium at 30° C. and 80% air fraction (cycle duration was 10 minutes and the flow rate was 0.1 microliters/s) for 17 hours. Then, BM1M medium with 10% MeOH was introduced to induce the secretion for 4 hours (27° C., 5 microliters/s flow rate). After that, BM1M medium with anti-SPOT nanobodies (labeled with ATTO594, Chromotek™) was introduced. The perfusion was continued at 0.014 microliters/s for 45 minutes for equilibration, and then BM1M medium without anti-SPOT nanobodies was introduced and flushed at 0.1 microliters/s for 30 minutes. Images were taken to observe the gradient of soluble fluorescently labeled product at indicated time points.

FIGS. 12A-12C shows cell expansion in the sequestration pens and that the hydrogel barrier succeeded in containing the cells within the culturing area, for a variety of hydrogel barrier shapes. In some circumstances, a small number of cells might breach the hydrogel barrier; nevertheless, substantially most, e.g., more than about 80%, more than about 90%, more than about 95% or more than about 99% of all cells were still contained inside the culture area. The results (FIGS. 12D-12F) of a diffusion gradient assay for each respective barrier type, performed as described within Example 1-3, showed that the free anti-SPOT nanobodies rapidly equilibrated in pens with partial hydrogels (center bar, half bar, and side bars) and different intensities can be observed between pens.

Example 2-3: Bioproductivity Assessment Assays

In this example, four different *Pichia* strains (Strains 1-4) engineered to secrete a first protein (Protein 1), three different *Pichia* strains (Strains 5-7) engineered to secrete a second protein (Protein 2), and four further different strains (Strains 8-11) engineered to secrete a third protein (Protein 3), were tested in this assay, but already had known productivities. Each of Proteins 1, 2, and 3 were labeled with Spot-tag, which can be detected by anti-SPOT nanobodies (Chromotek™) as well as the FLAG-tag.Cells were resuspended in PBS before loading and introduced into the flow region. For each stain, single cells were disposed into respective individual sequestration pens using dielectrophoretic forces, which in this example, are optically actuated dielectrophoretic forces. In this example, a single cell was disposed into an individual sequestration pen using positive light actuated dielectrophoretic forces. Details of positive dielectrophoretic transport of cells are described in International Application Serial No. PCT/US2020/066229, entitled "Methods of Penning Micro-Objects Using Positive Dielectrophoresis", filed on Dec. 18, 2020, and published as International Patent Application Publication WO2021/127576, the entire disclosure of which is herein incorporated by reference in its entirety for any purpose. However, the invention is not so limited, for example, when other cell types such as bacterial cells, negative dielectrophoretic forces may be used to selectively place a single cell (or more than one cell) into each individual sequestration pen.

Hydrogel formation. In assays where hydrogel barriers were used in the productivity assay, flowable hydrogel polymer was introduced in solution, and allowed to diffuse into the sequestration pens. Photoinitiator was also included within the solution containing the flowable hydrogel polymer. The hydrogel barriers were formed by photopatterning, e.g., photoactivation of polymerization to form the solidified hydrogel barriers. The formed hydrogel defined the sequestration pen into two regions (e.g., areas). The region that was furthest away from the opening and contained cells therewithin was a culture area. In some instances, the other region that was closest to the opening was an assay area (See FIG. 7A), for example using a bead assay and a hydrogel barrier.

Variation 1. Culturing, Induction and Assay using Capture Bead. Strains 1-11 were used in this experiment. The hydrogel formulation included 8 arm 20K PEG having 8 acrylamide termini, included inhibitor (Lithium phenyl-2,4,6 trimethylbenzoylphosphinate, LAP) and photoinitiator (hydroquinone monomethyl ether, MEHQ). A nitrogen gas purge followed the introduction of the flowable polymer mixture. Gel polymerization was initiated by photoactivation in the DAPI filter cube, using 10× objective, for 1 s at 50% power. Gel polymerization was initiated by photoactivation at midpen to form a cap formed from two individual triangular gel barriers, like the barrier shown in FIG. 6A, barrier 625. The nominal size of the illumination used to form the barrier produced a "bowtie" shape with about a gap in the center) in each pen. Depending on the exposure time, exact amount of initiator, inhibitor and/or polymer composition, the triangular gel barriers may meet in the center rather than leaving a discernable gap. In other instances, the triangular barriers may leave a gap that is less than about 1, 2, 3, 4, 5, 6, 7, 8, 9 or about 10 microns wide. "Bowtie" barriers can function equally well in either case. What these barriers share is a non-uniform thickness. That non-uniformity may be in the width (pen wall to pen wall dimension), in the "thickness" dimension (from distal-to-pen opening to proximal-to-pen opening dimension), and/or the "height" dimension (from inner surface of the substrate to the inner surface of the cover of the microfluidic device, e.g., z-dimension). The non-uniformity in the "thickness" dimension, e.g., the center of the "bowtie", provides a convenient and standard location for bead disposition for the assay. The "bowtie" barrier had a "thickness" at its largest dimension of the triangular shaped individual gel form of about 15 microns. This dimension is not limiting and the "thickness" of the bowtie may be less than about 15 microns, less than about 12 microns, less than about 10 microns, less than about 8 microns, or less than about 5 microns. In other embodiments, the "thickness" of a triangular segment of the "bowtie" barrier may be more than about 10 microns, more than about 15 microns, or more than about 18 microns. As shown in FIG. 6B-6C, two different embodiments of hydrogel barriers having a "bowtie" non-uniform shape are shown, where the dimension 660 of the triangular segment forming the barrier ("thickness" dimension) is larger in the barrier of FIG. 6C than the dimension of the segment 650 of the barrier of FIG. 6B. Since the pens are of the same width, it can be seen that the barrier formed in FIG. 6B has a distinct gap between the two barriers, while the barrier of FIG. 6C does not have an obvious gap. While in the embodiment of FIG. 6B, a few cells have escaped the culture area below the barrier, the barrier of FIG. 6C does not permit cells to move past the barrier.

Further variations. While the "bowtie" non-uniform barrier was used in this experiment, other non-uniform barriers may be suitable barriers for productivity assays using beads to capture secreted biomolecules, and may include some of the non-uniform barriers shown in FIG. 6A. Depending on culture period duration and the specific type of cells being assayed, many different configurations of barriers will work. The specific type of cell may determine what type of barrier may be used, as cells that tend to grow in close association within the culturing region of the divided pen, may not even require a barrier that blocks more than half the width of the pen.

Cell culture, Bead Load, and Induction. Cells were then cultured on chip with constant perfusion of fresh BMGY medium at 30° C. and 80% air fraction (cycle duration was 10 minutes and the flow rate was 0.1 μL/s) for 14 hours. The period of time for culturing may be selected as desired, and may be less than about 14 h, 12 h, 10 h, 8 h, or less or may be more than about 10 h, 12 h, 14 h, 16 h, 18 h, or about 20 h. Overgrowth of the culturing area may be a determining factor in selecting the culturing period.

Assay beads coated with anti-FLAG antibodies which bind to the FLAG® peptide sequence) were suspended in loading buffer and then introduced into the flow region before the induction. Single beads were disposed into each pen and located in the assay region. In some further variations, a second period of culturing may be added after bead introduction. This period of culture may be for about 1 h, 2 h, 3 h, 4 h, or any value therebetween, and assures that the cells are in a state such that induction will be more uniformly successful. Flow of liquid media (BMGY) is alternated with air perfusion, in a ratio of 20% liquid:80% gaseous (air) in a 10 min cycle, at 1 microliter/sec.

After introduction of the bead (and in some variations, after the second period of culturing), BM1M medium with 10% MeOH was introduced to induce secretion of the molecule of interest (the analyte). The induction was performed for 5 hours with the perfusion of the BM1M medium continued (1 microliter/s, 27° C.). In some variations, the induction period is varied from a 5 h period, and may be selected to be about 1 h, 2 h, 3 h, 4 h, 6 h, 7 h or more.

Assaying. BM1M medium with anti-SPOT nanobodies (labeled with ATTO594, Chromotek™) was introduced. The perfusion was continued at 0.011 μL/s for 30 minutes for equilibration, and then BM1M medium without anti-SPOT nanobodies was introduced and flushed at 5 μL/s for 60 minutes. Brightfield images were taken before assaying for biomass measurement, which was used to normalize the results of the measurement.

Figure 13:
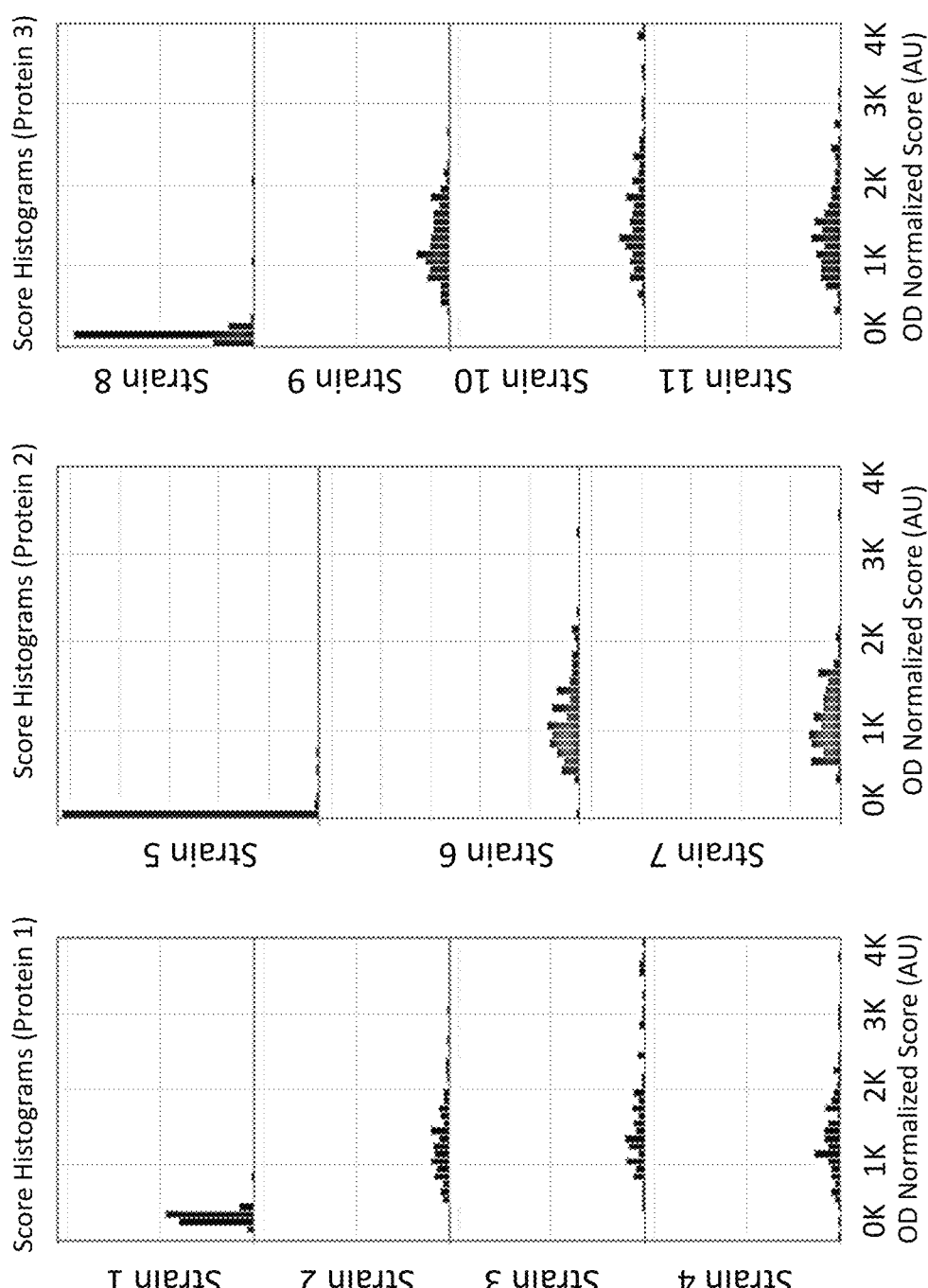
FIG. 13 is a graphical representation of results of productivity assays according to some embodiments of the disclosure.

Mean bead fluorescent signal was detected and normalized with biomass (OD score). The results were shown in the histograms of FIG. 13 showing the production results for Protein 1, Protein 2, and Protein 3 (from left column to right column) for respective Strains 1-11. The x-axis shows the OD normalized score (AU) (marked at 1K, 2K, 3K,and the y-axis shows count (0 to 100). The histograms match the expectation of productivities as Strain 1, Strain 5, and Strain 8 were expected to be the worst producers of the respective proteins of the tested groups. Furthermore, it was observed that there were different levels of productivities between sequestration pens containing cells from the same strain. The locations of the highest scoring pens were stored by the analysis software of the Beacon system and can be used to export the cells exhibiting high productivities in this assay. Therefore, the better producers from each strain may be exported for expansion and further development.

Further variation. In another variation, the "bowtie" or other non-uniform hydrogel barrier may be introduced, where the hydrogel is permeable to the secreted analyte or where there is a gap between portions of the hydrogel barrier. The secreted analyte, being a soluble product may diffuse out of the culturing area, through the hydrogel and/or through a gap in portions of the hydrogel barrier. A diffusion gradient assay may then be performed in an area of interest that is selected to be located between the opening of the pen into the channel and the surface of the hydrogel facing the opening of the pen into the channel ("assay area" as shown in FIG. 7B). BM1M medium with anti-SPOT nanobodies (labeled with ATTO594, Chromotek™) is introduced, and the soluble analyte is labelled with the anti-SPOT nanobodies. Many variations of diffusion gradient assay imaging may be used, and details of these variations are described in International Application Serial No. PCT/2017/027795, entitled "Methods, Systems, and Kits for In-Pen Assays", filed on Apr. 14, 2017, published as International Application Publication WO2017/1811135; International Application Serial No. PCT/US2018/055918, entitled "Methods, Systems, and Kits for In-Pen Assays", filed on Oct. 15, 2018, published as International Application Publication WO2019/075476; and International Application Serial No. PCT/US2021/021417, entitled "Methods, Systems, and Kits for In-Pen Assays", filed on Mar. 9, 2020, published as International Application Publication WO2021/184458, the entirety of each of which disclosures are herein incorporated by reference for any purpose.

Variation 2. Accumulation Assay. In another variation, secreted product was accumulated within the same region as the cells, below a hydrogel barrier which substantially spans the width of the sequestration pen, as described herein (e.g., located within a pen to divide the pen into two regions, distal and proximal to the opening, forming a full cap as shown in FIG. 6A, barrier 605. Cells were cultured within the distal, culturing region. An area of interest for monitoring the amount of detectable product was located within the culturing region, but in a portion of the region that preferably does not contain any cells. For example, a portion of the culturing region closest to the distal side of the hydrogel barrier was defined as the area of interest for the assay. The area of interest typically may not include any portion of the gel itself, when performing this assay. An accumulation-type assay may be useful where the culturing cells produce the bioproduct at a low rate, which may be difficult to detect using a bead to capture secreted bioproduct.

Cell culture and Induction. After introduction of individual cells into respective sequestration pens, as described above for Strains 1-11, cells were then cultured on chip with constant perfusion of fresh BMGY medium at 30° C. and 80% air fraction (cycle duration was 10 minutes and the flow rate was 0.1 μL/s) for 14 hours. The period of time for culturing may be selected as desired, and may be less than about 14 h, 12 h, 10 h, 8 h, or less or may be more than about 10 h, 12 h, 14h, 16 h, 18 h, or about 20 h. Overgrowth of the culturing area may be a determining factor in selecting the culturing period.

BM1M medium with 10% MeOH was introduced to induce secretion of the molecule of interest (the analyte). The induction was performed for 5 hours with the perfusion of the BM1M medium continued (1 microliter/s, 27° C.). In some variations, the induction period is varied from a 5 h period, and may be selected to be about 1 h, 2 h, 3 h, 4 h, 6 h, 7 h or more.

Accumulation Assay. BM1M medium with anti-SPOT nanobodies (labeled with ATTO594, Chromotek™) was introduced. The perfusion was continued at 0.011 microliters/s for 30 minutes for equilibration, and then BM1M medium without anti-SPOT nanobodies was introduced and flushed at 5 microliters/s for 60 minutes. Brightfield images were taken before assaying for biomass measurement, which was used to normalize the results of the measurement. Fluorescent Images were taken during flushing to determine signal intensities of the anti-SPOT nanobodies within an area of interest that was selected to be within the culture area of each pen.

Figure 14:
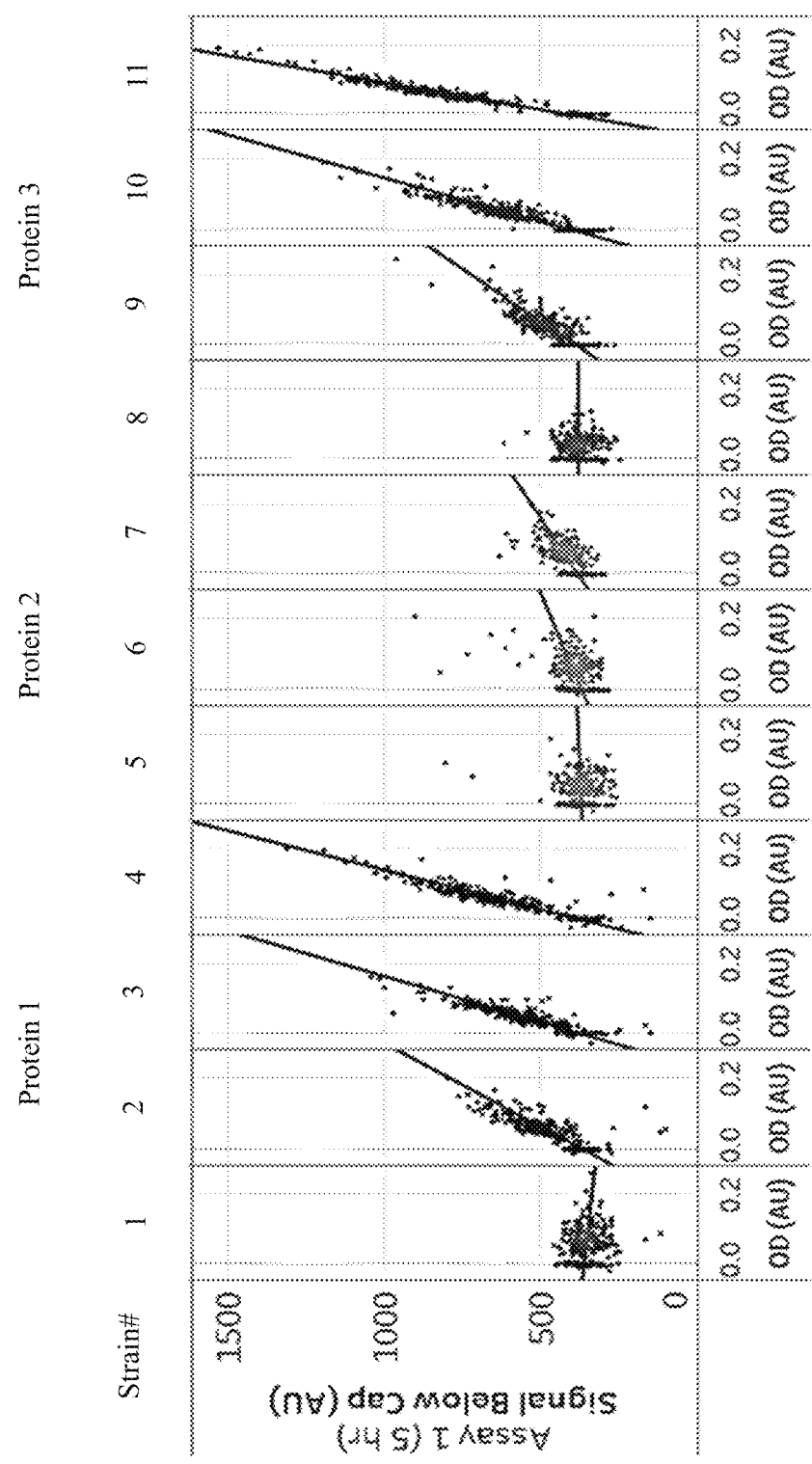
FIG. 14 is a graphical representation of results of productivity assays according to some embodiments of the disclosure.
Figure 15:
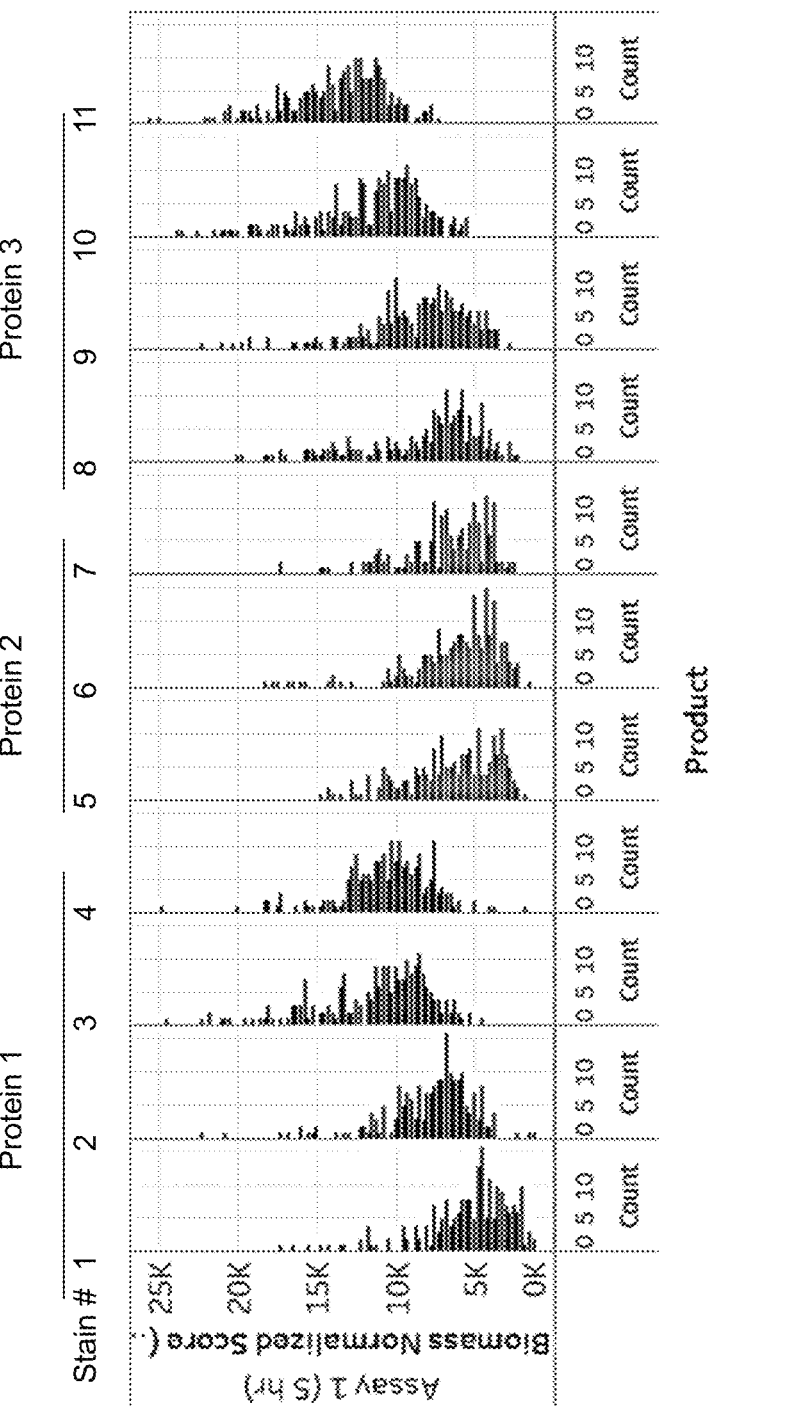
FIG. 15 is a graphical representation of the distribution of productivity assay results according to some embodiments of the disclosure.

The results, shown in FIG. 14, showed that the presence of a hydrogel fully sealing the pen results in concentration of secreted analytes within the culture area that can then be detected by using the anti-SPOT nanobodies. The x-axis shows biomass, as measured by OD, and the y-axis shows signal intensity in the area of interest below the hydrogel barrier. A linear correlation with colony size demonstrates that this method of quantifying secretion is highly predictive of productivity. FIG. 15 shows histograms of the signals normalized to the OD, where the y-axis shows the score (e.g., detectable signal intensity) normalized for biomass and the x-axis shows the number of pens having each score. The results were consistent with expectation, and the distribution of scores provides additional information for selecting a better producer. For example, Strain 3 and Strain 4 were overall better producers than Strain 2. Nevertheless, some pens of Strain 2 exhibited signals stronger than most of the pens of Strain 3 and Strain 4. Accordingly, the diversity of secretion productivity within a given strain can be captured and selection of individual clonal populations from a strain can yield superior candidates for further development.

Example 2-4: Bioproductivity Assessment Using Accumulation Assay

In this example, three Pichia strains, Strain 2, Strain 3, Strain 4, and Strain 11 (the same as in Example 1-3) were assayed for their productivities. The Protein 1 was labeled with Spot-tag, which can be detected by anti-SPOT nanobodies (Chromotek™). Cells were resuspended in PBS before loading and introduced into the flow region. For each stain, single cells were disposed into the respective sequestration pens by OEP, as described above in Example 1-3. Fluorescently labeled dextran TRED was used for in-pen correction.

Hydrogel formation. Then, PBS including a mixture of 75% 8 arm 20K PEG having 8 acrylamide termini) and 25% 8 arm PEG having only one acrylamide terminated arm hydrogel mixture was introduced and allowed to diffuse into the sequestration pens. The flowable polymer mixture also included inhibitor (Lithium phenyl-2,4,6 trimethylbenzoylphosphinate, LAP) and photoinitiator (hydroquinone monomethyl ether, MEHQ). A nitrogen gas purge followed the introduction of the flowable polymer mixture. Gel polymerization was initiated by photoactivation in the DAPI filter cube, using 10×, for 3 s at 50% power, at mid-pen to a fully sealing cap for the accumulation assays. The formed hydrogel defined a culture area within the sequestration (See FIG. 7C, and FIG. 6A, barrier 605).

Cell culture and Induction. Cells were then cultured on chip with constant perfusion of fresh BMGY medium at 30° C. and 80% air fraction (cycle duration was 10 minutes and the flow rate was 0.1 microliters/s) for 14 hours. After culture, BM1M medium with 10% MeOH was introduced to induce the secretion of the molecule of interest (the analyte). The induction was performed for 5 hours with the perfusion of the BM1M medium continued (5 microliters/s, 27° C.).

Assaying. BM1M medium with anti-SPOT nanobodies (labeled with ATTO594, Chromotek™) and BM1M medium with 10 kDa Dextran (Texas Red™, #D1828, Thermo Fisher) were introduced. The perfusion was continued at 0.007 microliters/s for 85 minutes for equilibration. Fluorescent Images were taken to determine signal intensities of the anti-SPOT nanobodies and dextran within the culture area of each pen for measurement under both equilibrium conditions and flush conditions, as described in International Application Serial No. PCT/2017/027795, entitled "Methods, Systems, and Kits for In-Pen Assays", filed on Apr. 14, 2017, published as International Application Publication WO2017/1811135; International Application Serial No. PCT/US2018/055918, entitled "Methods, Systems, and Kits for In-Pen Assays", filed on Oct. 15, 2018, published as International Application Publication WO2019/075476; and International Application Serial No. PCT/US2021/021417, entitled "Methods, Systems, and Kits for In-Pen Assays", filed on Mar. 9, 2020, published as International Application Publication WO2021/184458, the entirety of each of which disclosures are herein incorporated by reference for any purpose. Brightfield images were taken for biomass measurement before assay, which were used to normalize the results of the measurement for biomass (OD).

Figure 22:
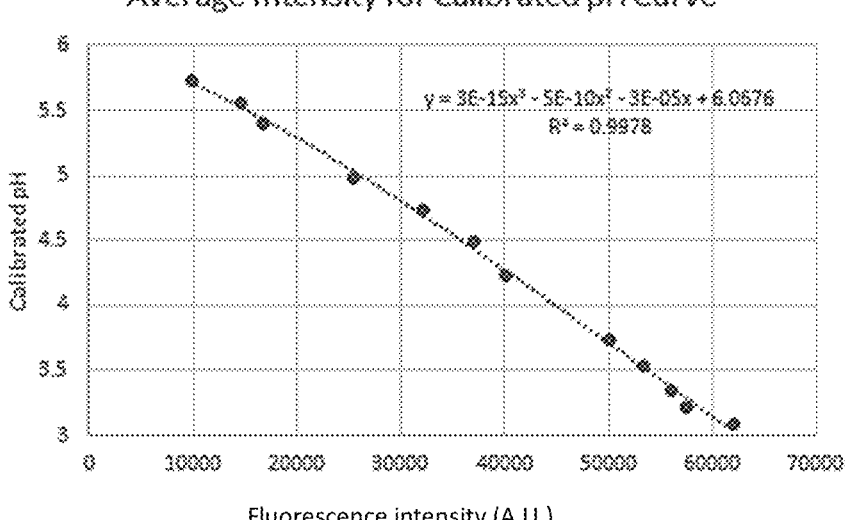
FIG. 22 shows a pH standard curve obtained from the on-chip pH measurement of Example 3-2.
Figure 23:
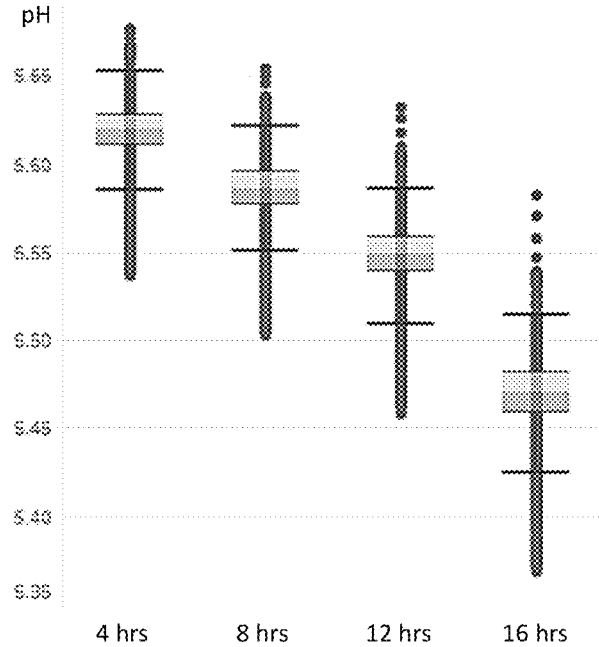
FIG. 23 shows acidification of media in a time lapse measurement represented by true pH value calculated using the standard curve of FIG. 22.

The graphs shown in the left column of FIG. 22 shows the detected signal (raw) of anti-SPOT nanobodies again OD score for each of Stains 2, 3, 4, and 11. Strain 11 and Strain 4 exhibited better secretion than Strain 2 and Strain 3, which were consistent with the known productivities of these strains. The graphs in the right hand column of FIG. 22 shows the same data as that of the graphs in the left hand columns, but corrected against the fluorescent dextran values across the microfluidic chip. FIG. 23 shows the detected signal of in-pen dextran used for the corrections. Because dextran was not secreted by the cells and also did not bind the cells, the signals observed for TRED labelled dextran were flat against the OD score and used as an in-pen control correcting the signals of anti-SPOT nanobodies. The corrected signals of anti-SPOT nanobodies were shown in the right column of FIG. 22. The correction significantly reduced the coefficient of variation as shown in FIG. X24.

Figures 16A, 16B, 16C:
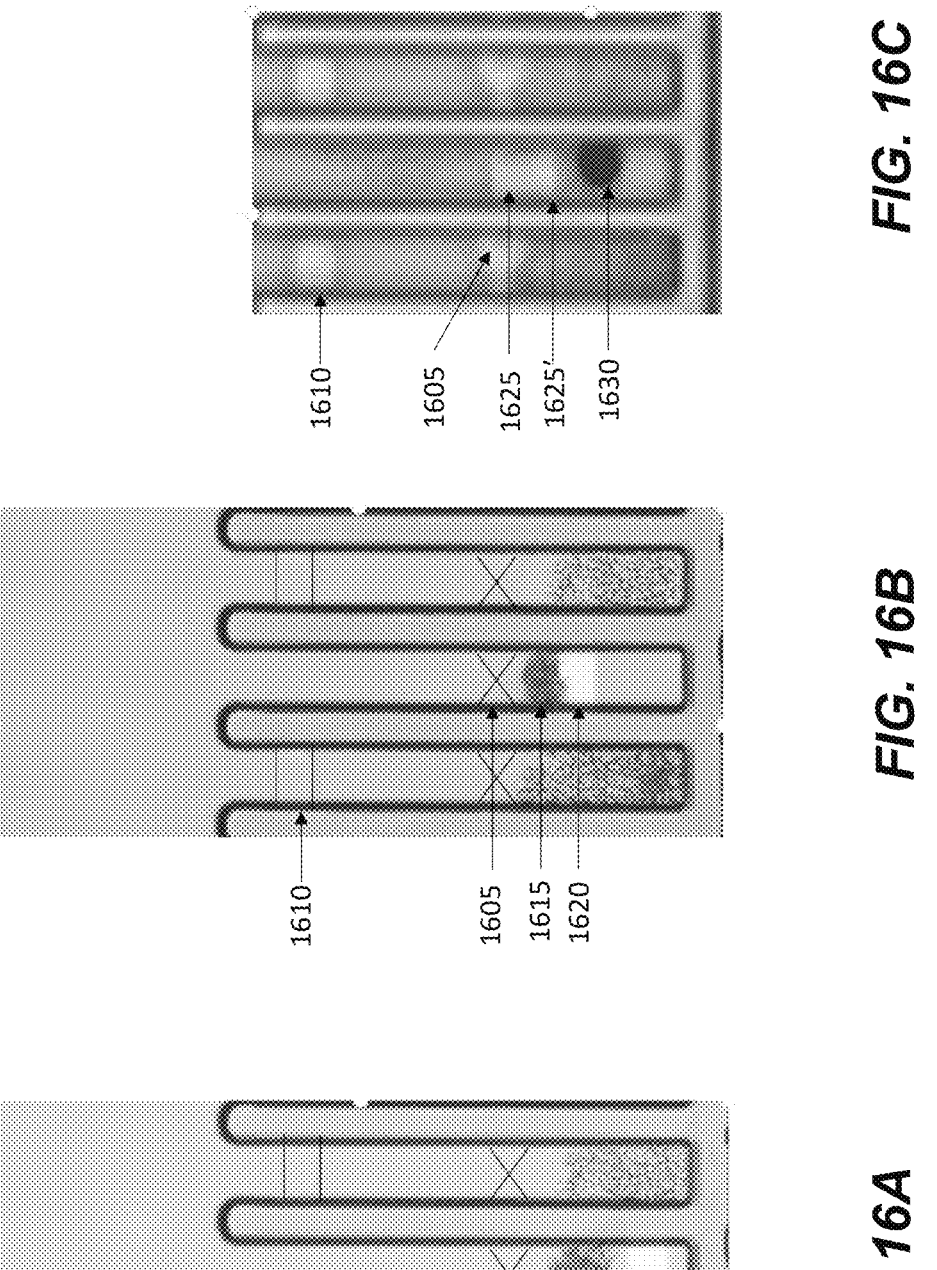
FIGS. 16A to 16F are photographic representations with annotation showing the process of exporting cells from a chamber having a non-uniform hydrogel barrier according to some embodiments of the disclosure.

Example 2-5. Export. Selected pens are prepared in order to export the cells within the culture area, and a sequence of photographs illustrating the export process is shown in FIGS. 16A-16F. In FIG. 16A, the non-uniform hydrogel barrier used for the bead assay ("bowtie") is annotated for clarity as seen in the figures, for example barrier 1605, as well as the uniform barrier 1610. The central pen was the only pen in this view for which export was desired. At this first time point, for all pens for which export is not desired, additional uniform hydrogel barriers 1610 were already introduced, which prevents cells from exiting those pens. This was performed in case any cells in non-desired pens were located in the area proximal to the opening of the pen, thus reducing risk of clonality loss for the cells being exported. Therefore, the non-selected pens have two hydrogel barriers, and the selected pens have a single barrier. Starting export of cells 1615, a light actuated dielectrophoretic bar was programmed to move towards the opening of the pen to the channel. The dielectric force in this instance repels the cells ahead of the light 1620, which is the visible light activating transistors in the substrate, inducing the negative dielectrophoretic force. At a second, later timepoint, as shown in FIG. 16B, the light bar 1620 is shown at a location closer to the opening of the pens, having activated the transistors within the substrate, thus moving the cells closer to the hydrogel barrier 1605. The non-uniform hydrogel barrier, however, prevented cells from moving past the barrier.

At a third still later timepoint, as shown in FIG. 16C, a laser pulse had been directed towards an area of the substrate most distal to the opening of the pen, and the location of the effect 1630 is shown. The dielectrophoretic force had already cleared cells from that portion of the culturing area, so direct impact of laser illumination on cells was prevented. The z-focus was changed for this individual photo, and the focus was resultingly affected. However, it is clear that the laser pulse induced heating and/or a bubble in the media that deformed two triangular segments forming the non-uniform "bowtie" barrier. The two segments 1625 and 1625' have flipped within the pen from their original position, and now provided a passage for cells to move through. The heating (including expansion of the media) or bubble exerts a force towards the proximal end of the pen, e.g., towards the opening of the pen, and therefore exerts a force upon the center of the hydrogel barrier. The "bowtie" non-uniform hydrogel barrier permitted deformation in the center, and more easily deformed to permit passage of cells.

Figures 16D, 16E, 16F:
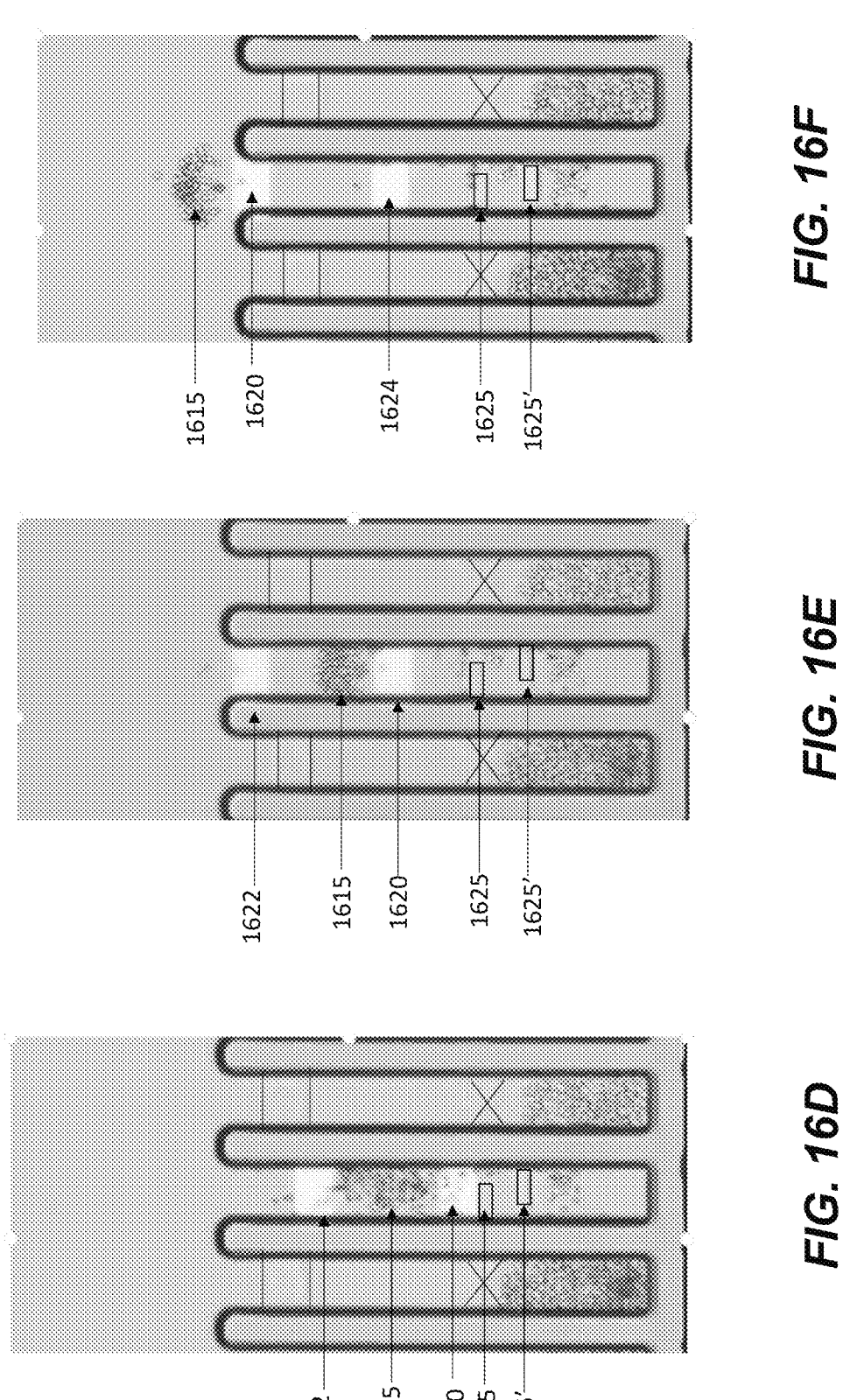

At a fourth time point, as shown in FIG. 16D, (z focus is resumed once the laser is not operating) where the sweep of the pen with the light bar 1620 was resumed, moving cells past the deformed barrier segments 1625 and 1625' (also annotated for clarity) that no longer prevent cell transport. Another light bar 1622 preceded the central group of cells, the dielectrophoretic forces inducing clearance of the path for the cells. At a fifth subsequent time point, as shown in FIG. 16E, the light bar 1620 continues moving the cells towards the opening of the pen, which opens into the channel at the top of the figure. Finally, at a sixth timepoint, as shown in FIG. 16F, the light bar 1620 has initiated dielectrophoretic forces that transported the cells 1615 into the channel. A third light bar 1624 swept through the pen, following the first group of cells 1615, to initiate dielectrophoretic forces to capture any remaining cells into the channel to be joined with the first group of cells. After this timepoint, flow was started in the channel to carry the selected cells to an external vessel such as a well in a wellplate. The cells may be further expanded or processed in another manner.

Experiment 3: pH Measurement

Example 3-1: pH Measurement On-Chip and Well Plate

Materials. Citric acid stock solution (0.1 M) and sodium citrate solution (0.1 M) were prepared to prepare citrate buffer solutions of target pH of 3.0, 3.4, 3.6, 3.8, 4.0, 4.4, 4.6, 4.8, 5.0, 5.4, 5.6, and 6, respectively. A pH-sensitive dye solution (LysoSensorTM Yellow/Blue DND-160, 5 uM) was prepared for this experiment.

Off-chip, well plate standard curve. A pH standard curve plate (96 wells) was prepared by using Mantis™ liquid handler, and the citrate buffer solutions of various pH value prepared were introduced into respective wells (200 uL per well). Specifically in this experiment, Wells A1-G1 were introduced with solutions of pH 3.0; Wells A2-G2 were introduced with solutions of pH 3.4; Wells A3-G3 were introduced with solutions of pH 3.6; Wells A4-G4 were introduced with solutions of pH 3.8; Wells A5-G5 were introduced with solutions of pH 4; Wells A6-G6 were introduced with solutions of pH 4.4; Wells A7-G7 were introduced with solutions of pH 4.6; Wells A8-G8 were introduced with solutions of pH 4.8; Wells A9-G9 were introduced with solutions of pH 5; Wells A10-G10 were introduced with solutions of pH 5.4; Wells A11-G11 were introduced with solutions of pH 5.6; Wells A12-G12 were introduced with solutions of pH 6. Row H was used for NIST standards.

Before the LysoY/B solution was introduced, images were taken at 360 excitation (Ex)/525 emission (Em) wavelength and 360 Ex/490 Em (fixed-point of LysoY/B) as reference images for normalization. Then, the LysoY/B solution was introduced into each well. The plate was measured using BioTek® plate reader at 360 Ex/525 Em wavelength to determine the fluorescent signal in each well. The signal obtained from each well was normalized by the 360 Ex/525 Em reference image and normalized by the fixed-point image of LysoY/B.

On-Chip Measurement:

System and Microfluidic device. The following experiments were performed using an OptoSelect™ microfluidic (or nanofluidic) device manufactured by Berkeley Lights, Inc. and controlled by an optical instrument which was also manufactured by Berkeley Lights, Inc. The instrument included: a mounting stage for the microfluidic device coupled to a temperature controller; a pump and fluid medium conditioning component; an optical train including a camera and a structured light source suitable for activating phototransistors within the microfluidic device; and software for controlling the instrument, including performing image analysis and automated detection and repositioning of micro-objects. The OptoSelect™ device included a substrate configured with OptoElectroPositioning (OEP™) technology, which provides a phototransistor-activated dielectrophoresis (DEP) force. The device also included a plurality of microfluidic channels, each having a plurality of NanoPen™ chambers (or sequestration pens) fluidically connected thereto. The volume of each sequestration pen was around $1 \times 10^6$ cubic microns. The microfluidic device included conditioned interior surfaces, which are described in U.S. Patent Application Publication No. US2016/0312165 (Lowe, Jr., et al.), International Patent Application Publication WO2017/205830 (Lowe, Jr., et al.), and International Patent Application Publication WO2019/01880 (Beemiller et al.), each of which disclosures is herein incorporated by reference in its entirety.

Priming regime. 250 microliters of 100% carbon dioxide were flowed in at a rate of 12 microliters/sec. This was followed by 250 microliters of a wetting solution including surface conditioning reagents to provide conditioned surfaces as described in the referenced publications above.

On-chip measurement. Before introducing the mixtures of the citrate buffer solution and pH-sensitive dye, images were taken at 360 Ex/525 Em wavelength and 360 Ex/490 Em (fixed-point of LysoY/B) as reference images for normalization.

Mixtures in the wells containing the citrate buffer solutions of same pH value were collected and imported into respective chips for on-chip measurement. For instance, the mixtures of the citrate buffer and the pH-sensitive dye in Wells A1-G1 were of the same pH value. The mixtures in Wells A1-G1 were collected and imported to prime the microfluidic device, and then, the mixture in Well D1 was imported to the microfluidic device and allowed to diffuse from the microfluidic channel into the sequestration pen. After the citrate buffer and the pH-sensitive dye reached equilibration across the microfluidic channel and the sequestration pen, images were taken, and the fluorescent signal was determined. Likewise, the mixtures of the citrate buffer and the pH-sensitive dye in Wells A2-G2 were used in another chip, and so on so that the fluorescent signals determined from respective chips were collected. The area of interest for determining the fluorescent signal in this experiment was the entire sequestration pen.

Figure 20B:
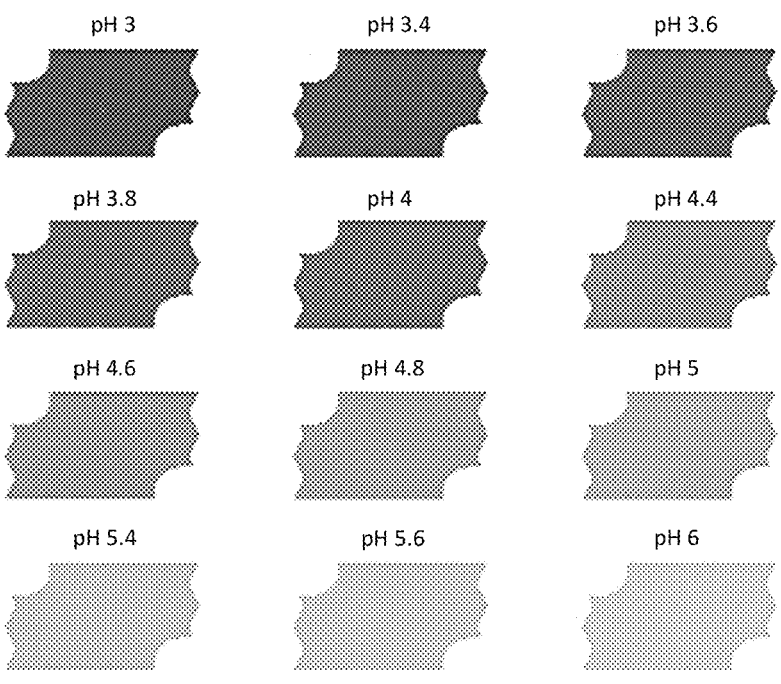
FIG. 20B shows the fluorescent intensities of fluorescent signals obtained from twelve microfluidic devices comprising solutions of pH 3, 3.4, 3.6, 3.8, 4, 4.4, 4.6, 4.8, 5, 5.4, 5.6, and 6 respectively. The fluorescent intensities are represented in color intensities at a scale of 0 to 55K.

Results: FIG. 20A illustrates the microfluidic chip (i.e. microfluidic device) used in this experiment and a top view showing the configuration of the microfluidic channels and the sequestration pens. FIG. 20B shows the fluorescent images of each chip containing the citrate buffer solutions of various pH values. The darker the color, the stronger the intensity of the fluorescent signal is, and hence, lower pH value. The images show that, by detecting the fluorescent signals of the pH-sensitive dye, the pH of the medium disposed in the microfluidic device can be clearly observed.

Figure 20C:
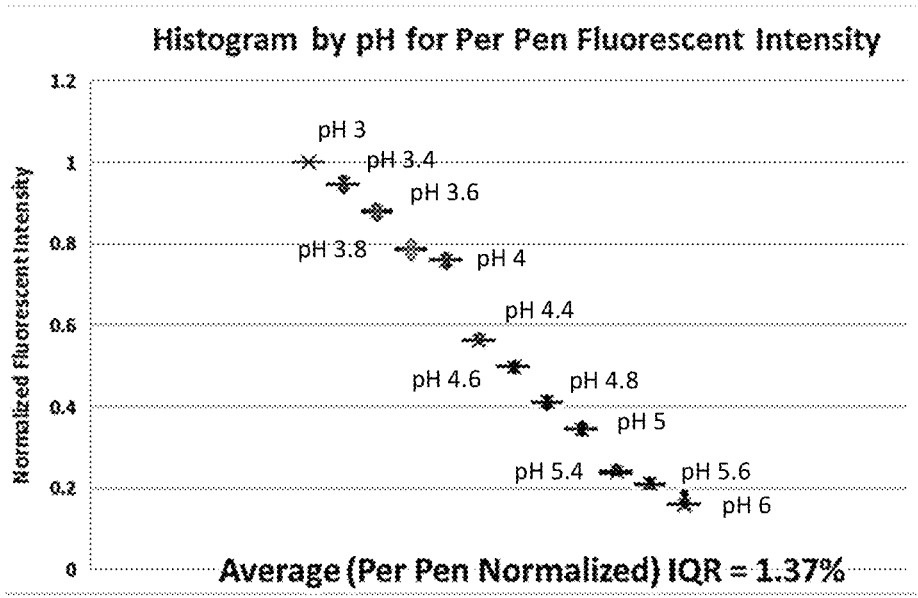
FIG. 20C shows a histogram illustrating the normalized fluorescent intensities derived from the fluorescent signals obtained from the twelve microfluidic devices in FIG. 20B.
Figure 21:
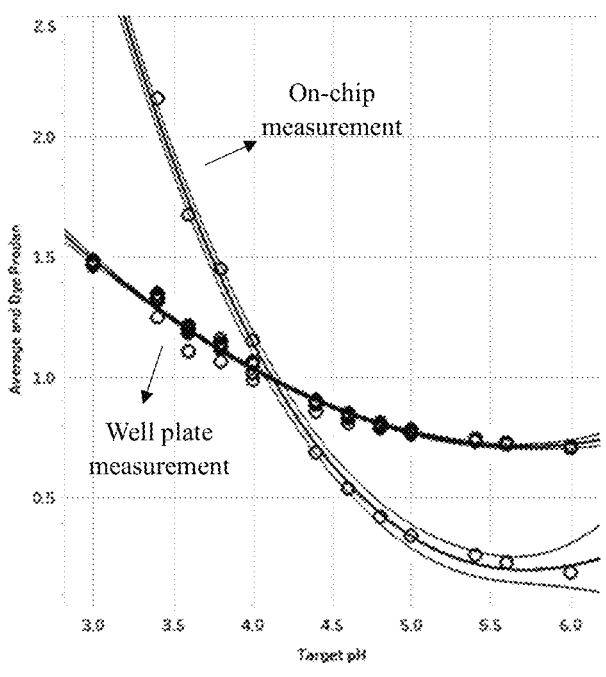
FIG. 21 illustrates the standard curves of pH measurement obtained from the twelve microfluidic devices in FIG. 20B and from a corresponding well plate experiment.

In addition, by normalizing the fluorescent signals with the signal obtained from the microfluidic device containing pH 3 citrate buffer solution, FIG. 20C shows that the fluorescent signals representing each tested pH value can be clearly distinguished from each other. The fluorescent signals obtained from the well plate and microfluidic chip corresponding to various pH values were normalized and plotted into curves (FIG. 21). The curve can be further calculated into a standard curve matching the measurement on chip with true pH value. These results show that the methods of the present disclosure can detect and monitor the pH value of the medium disposed in the microfluidic device as measuring the pH value of the wells of a well plate.

Example 3-2: pH Measurement and In Situ-Generated Hydrogel Barrier

Materials and Cell. Citric acid stock solution (0.1 M) and sodium citrate solution (0.1 M) were prepared to prepare citrate buffer solutions of target pH of 3.0, 3.4, 3.6, 3.8, 4.0, 4.4, 4.6, 4.8, 5.0, 5.6, 5.8, and 6, respectively. A pH-sensitive dye solution (LysoSensor™ Yellow/Blue DND-160, 5 uM, pH 5.6) was prepared for this experiment. Cells (*Saccharomyces cerevisiae*) were obtained from storage and inoculated in batch media (BMGY medium) in a deep well plate at 30 degrees Celsius on a shaker plate until OD 0.6. Cells were then collected and kept on ice until import.

On-chip pH standard curve: as described in Example 1. FIG. 22 shows a standard curve calculated from the measurement of this example.

System and Microfluidic device prep: The following experiments were performed using an OptoSelect™ microfluidic (or nanofluidic) device manufactured by Berkeley Lights, Inc. and controlled by an optical instrument which was also manufactured by Berkeley Lights, Inc. The instrument included: a mounting stage for the microfluidic device coupled to a temperature controller; a pump and fluid medium conditioning component; an optical train including a camera and a structured light source suitable for activating phototransistors within the microfluidic device; and software for controlling the instrument, including performing image analysis and automated detection and repositioning of micro-objects. The OptoSelect™ device included a substrate configured with OptoElectroPositioning (OEP™) technology, which provides a phototransistor-activated dielectrophoresis (DEP) force. The device also included a plurality of microfluidic channels, each having a plurality of NanoPen™ chambers (or sequestration pens) fluidically connected thereto. The volume of each sequestration pen was around $1 \times 10^6$ cubic microns. The microfluidic device included conditioned interior surfaces, which are described in U.S. Patent Application Publication No. US2016/0312165 (Lowe, Jr., et al.), International Patent Application Publication WO2017/205830 (Lowe, Jr., et al.), and International Patent Application Publication WO2019/01880 (Beemiller et al.), each of which disclosures is herein incorporated by reference in its entirety.

Hydrogel composition and polymerization: A hydrogel polymer solution comprising polyethylene glycol acrylamide (8-arm acrylamide-terminated PEG), MEHQ, and LAP was prepared and introduced into the flow region of the microfluidic device. The polymer solution was allowed to diffuse into the chamber for 10 minutes. Then, the flow region was flushed with fresh PBS to remove the polymer solution remaining in the flow region. The solidification of the polymer solution was activated in a selected area within the sequestration pen thereby forming an in situ-generated barrier as shown in FIG. 19A and FIG. 19B.

FIG. 19A illustrates a configuration of a microfluidic device used in this example. The microfluidic device comprises a microfluidic channel 1901 and a plurality of sequestration pen 1902 (only one of the sequestration pens is shown in this figure). The sequestration pen 1902 has a proximal opening 1903 to the microfluidic channel 1901. An in situ-generated barrier 1910 as formed within the sequestration pen 1902 to divide it into a culture area 1904 and an assay area 1905. With respect to the location of the in situ-generated barrier 1910, the assay area 1905 is an area close to a distal end of the chamber, and the culture area 1904 is an area close to a proximal end of the chamber. FIG. 19B shows a photo taken before cells were disposed.

An area of interest for the detection of the pH acidification assay can be within the assay area 1905, for example, the area 1931. Alternatively, the area of interest can be within the culture area 1904 and within an area close to the proximal opening 1903, for example the area 1932. In this example, area 1931 was chosen to be the area of interest.

Cell Loading and culture on chip. The prepared cell suspension was introduced into the flow region and cells were than disposed into respective sequestration pens. Culture media (BMGY; 0.1 uL/s perfusion, pH 6) was then perfused into the flow region for culturing the cells in the sequestration pens. The culture media used in this experiment comprised. With the in situ-generated barrier formed within the sequestration pen, cells were disposed and maintained in the culture area 1904, separated from the assay area 1905. FIG. 19C shows cells grew into colonies 1920 within the culture 1904 while the assay area 1905 was free of cells.

On-chip pH acidification assay. Then, the pH-sensitive dye solution was introduced into the microfluidic channel and allowed to diffuse into the sequestration pen until equilibration (non-buffered; 0.1 uL/s). Images were taken every 4 hours and the intensity of the signal within the assay area 1905 was determined. The pH-sensitive dye solution was perfused continuously (0.014 uL/s) throughout the assay period.

Results: The intensities of fluorescence signals were calculated into true pH values according to the standard curve. FIG. 23 shows that the pH of the medium within the area of interest wasn't changed much after 4 hours but gradually lowered down to below 5.5 after 16 hours into the assay. The trend was consistent with the acidification caused by the wastes secreted by cells while growing within the sequestration pens. It was confirmed that the pH acidification assay of the present invention effectively monitored the changes of local pH within the microfluidic device.

LIST OF EMBODIMENTS

Embodiment 1: A method for preparing a chamber of a microfluidic device to detect an analyte produced within the chamber, the method comprising: disposing a micro-object into the chamber of the microfluidic device, the microfluidic device having a microfluidic circuit comprising a flow region and the chamber, wherein the chamber comprises an opening to the flow region; forming an in situ-generated barrier within the chamber, wherein the in situ-generated barrier defines a first area of the chamber proximal to the opening of the chamber to the flow region and a second area of the chamber that is separated from the first area by the in situ-generated barrier; allowing the micro-object to produce the analyte; defining an area of interest within the first area or the second area; and detecting a signal associated with the analyte within the area of interest.

Embodiment 2: The method of embodiment 1, wherein the micro-object is disposed within the second area.

Embodiment 3: The method of embodiment 2, wherein the area of interest is within the first area or a micro-object-free area of the second area.

Embodiment 4: The method of embodiment 1, wherein the micro-object is disposed within the first area.

Embodiment 5: The method of embodiment 4, wherein the area of interest is within the second area or a micro-object-free area of the first area.

Embodiment 6: The method of any one of embodiments 1 to 5, wherein the in situ-generated barrier comprises one or more discrete sections, each of which is moveably connected to one or more surfaces of the chamber, wherein application of a threshold pressure to the one or more discrete sections of the in situ-generated barrier moves at least one of the one or more discrete sections with respect to the one or more surfaces of the chamber and thereby creates or expands an opening in the second area.

Embodiment 7: The method of embodiment 6, wherein the in situ-generated barrier comprises two or more discrete sections, wherein adjacent sections are separated from one another by a gap.

Embodiment 8: The method of embodiment 6 or embodiment 7, wherein the in situ-generated barrier consists of (or consists essentially of) two discrete sections which are separated from one another by a gap.

Embodiment 9: The method of any one of embodiments 1 to 8, wherein a portion of the in situ-generated barrier has a thickness in the z-direction that is smaller than the height of the chamber.

Embodiment 10: The method of any one of embodiments 1 to 9, wherein the in situ-generated barrier comprises a non-uniform thickness with respect to an axis of the chamber such that a portion of the in situ-generated barrier is less thick than other portions of the in situ-generated barrier.

Embodiment 11: The method of embodiment 10, wherein the less thick portion of the in situ-generated barrier has a thickness in the z-direction that is smaller than the height of the chamber.

Embodiment 12: The method of any one of embodiments 1 to 11, wherein the in situ-generated barrier has a porosity that substantially prevents the micro-object from passing through the in situ-generated barrier.

Embodiment 13: The method of any one of embodiments 1 to 12, wherein allowing the micro-object to produce the analyte comprises inducing the micro-object to produce the analyte.

Embodiment 14: The method of embodiment 13, wherein inducing the micro-object to produce the analyte comprises introducing a second fluidic medium oxygenated with at least about 10%, 15%, 20%, 25%, 30%, 35%, 40%, 45%, 50%, 55%, or 60% of oxygen.

Embodiment 15: The method of any one of embodiments 1 to 14, further comprising introducing a reporter molecule and allowing the reporter molecule to bind or react with the analyte.

Embodiment 16: The method of embodiment 15, wherein the reporter molecule comprises a first detectable label and detecting the signal comprises detecting a signal associated with the first detectable label.

Embodiment 17: The method of embodiment 15 or embodiment 16, wherein the in situ-generated barrier has a first permeability with respect to the analyte and a second permeability with respect to the reporter molecule, and wherein the first permeability is lower than the second permeability.

Embodiment 18: The method of any of embodiments 15 to 17, wherein allowing the reporter molecule to bind with the analyte comprises forming a reporter molecule:produced analyte (RMPA) complex, wherein the in situ-generated barrier has a porosity that impedes the RMPA complex from passing through the in situ-generated barrier.

Embodiment 19: The method of embodiment 18, wherein the porosity of the in situ-generated barrier substantially prevents the RMPA complex from passing through the in situ-generated barrier.

Embodiment 20: The method of embodiment 18, wherein the in situ-generated barrier has a porosity that allows the RMPA complex to pass through the in situ-generated barrier.

Embodiment 21: The method of any one of embodiments 18 to 20, wherein the in situ-generated barrier comprises a gap through which the RMPA complex can pass (e.g., and thereby cross the in situ-generated barrier).

Embodiment 22: The method of any one of embodiments 15 to 21, wherein the reporter molecule further comprises a binding component configured to bind the analyte.

Embodiment 23: The method of embodiment 22, wherein the binding component of the reporter molecule comprises an amino acid, a polypeptide, a nucleotide, a nucleic acid, or a combination thereof.

Embodiment 24: The method of embodiment 23, wherein the binding component of the reporter molecule comprises a protein.

Embodiment 25: The method of any one of embodiments 1 to 24, wherein the signal comprises a visible, luminescent, phosphorescent, or fluorescent signal.

Embodiment 26: The method of any one of embodiments 15 to 25, wherein introducing the reporter molecule comprises introducing a third fluidic medium comprising the reporter molecule into the flow region of the microfluidic device and allowing the reporter molecule to diffuse into the chamber.

Embodiment 27: The method of embodiment 26, wherein allowing the reporter molecule to diffuse into the chamber comprises allowing the reporter molecule to reach a steady state equilibrium between the flow region and the chamber.

Embodiment 28: The method of embodiment 27, wherein the signal associated with the analyte is detected after the steady state equilibrium is reached.

Embodiment 29: The method of any one of embodiments 15 to 28, wherein the signal associated with the analyte is detected while perfusing a fourth fluidic medium into the flow region, wherein the fourth fluidic medium does not comprise the reporter molecule.

Embodiment 30: The method of any one of embodiments 15 to 29, further comprising: introducing a reference molecule into the flow region, wherein the reference molecule comprises a second detectable label different from the first detectable label, and further wherein the reference molecule does not bind the analyte; allowing the reference molecule to diffuse into the chamber; and detecting a reference signal associated with the second detectable label.

Embodiment 31: The method of embodiment 30, wherein the second detectable label comprises a visible, luminescent, phosphorescent, or fluorescent detectable label.

Embodiment 32: The method of embodiment 30 or embodiment 31, wherein a second signal associated with the second detectable label is detected after a steady state equilibrium is reached.

Embodiment 33: The method of any one of embodiments 30 to 32, further comprising normalizing the signal associated with the first detectable label with the reference signal associated with the second detectable label.

Embodiment 34: The method of any one of embodiments 1 to 33, further comprising normalizing the detected signal with a biomass of the micro-object.

Embodiment 35: The method of embodiment 34, wherein the biomass is measured by taking a brightfield image of the microfluidic circuit; and measuring an optical density from the brightfield image, wherein the optical density is measured in a selected area comprising the biomass.

Embodiment 36: The method of any one of embodiments 1 to 35, wherein the chamber is a first chamber of the microfluidic device, and the microfluidic device further comprises a second chamber.

Embodiment 37: The method of embodiment 36, wherein disposing the micro-object into the chamber comprises: disposing a first micro-object into the first chamber and disposing a second micro-object into the second chamber; and detecting the signal associated with the analyte comprises detecting a first signal in the first chamber and detecting a second signal in the second chamber.

Embodiment 38: The method of embodiment 37, further comprising: comparing the first signal and the second signal, and selecting the first micro-object or the second micro-object based on the comparison; and/or comparing the first signal and/or the second signal with a threshold, and selecting the first micro-object and/or the second micro-object based on the comparison.

Embodiment 39: The method of any one of embodiments 1 to 38, further comprising exporting the micro-object from the chamber and, optionally, from the microfluidic device.

Embodiment 40: The method of embodiment 39, wherein exporting the micro-object comprises directing a laser illumination upon a selected area of the chamber to create a bubble pushing the micro-object toward the opening of the chamber.

Embodiment 41: The method of any one of embodiments 1 to 40, wherein the flow region comprises a microfluidic channel, and the opening of the chamber is proximal to the microfluidic channel.

Embodiment 42: The method of any one of embodiments 1 to 41 wherein the chamber comprises an isolation region and a connection region fluidically connecting the isolation region to the flow region; and wherein the connection region comprises the opening to the flow region.

Embodiment 43: The method of embodiment 42, wherein the second area is within the isolation region.

Embodiment 44: The method of any one of embodiments 1 to 43, wherein the in situ-generated barrier comprises a solidified polymer network.

Embodiment 45: The method of embodiment 44, wherein the solidified polymer network comprises a synthetic polymer, a modified synthetic polymer, or a biological polymer.

Embodiment 46: The method of embodiment 44 or embodiment 45, wherein the solidified polymer network comprises at least one of a polyethylene glycol, modified polyethylene glycol, polyglycolic acid (PGA), modified polyglycolic acid, polyacrylamide (PAM), modified polyacrylamide, poly-N-isopropylacrylamide (PNIPAm), modified poly-N-isopropylacrylamide, polyvinyl alcohol (PVA), modified polyvinyl alcohol, polyacrylic acid (PAA), modified polyacrylic acid, fibronectin, modified fibronectin, collagen, modified collagen, laminin, modified laminin, polysaccharide, modified polysaccharide, or a co-polymer in any combination.

Embodiment 47: The method of embodiment 46, wherein the solidified polymer network comprises a polyethylene glycol acrylamide polymer.

Embodiment 48: The method of embodiment 47, wherein the polyethylene glycol acrylamide polymer comprises a linear polyethylene glycol diacrylamide polymer, two arm polyethylene glycol acrylamide polymer, a star polyethylene glycol acrylamide polymer, or a mixture of any combination thereof.

Embodiment 49: The method of embodiment 48, wherein when the polyethylene glycol acrylamide polymer is other than a linear polyethylene glycol acrylamide polymer, all of the termini comprise an acrylamide moiety.

Embodiment 50: The method of embodiment 48 or embodiment 49, wherein when the polyethylene glycol acrylamide polymer is other than a linear polyethylene glycol acrylamide polymer, less than all of the termini comprise an acrylamide moiety.

Embodiment 51: The method of any one of embodiments 1 to 50, wherein forming the in situ-generated barrier within the chamber further comprises flowing a fifth fluidic medium comprising a flowable polymer solution into the flow region of the microfluidic device; and allowing the flowable polymer solution to diffuse into the chamber.

Embodiment 52: The method of embodiment 51, wherein forming the in situ-generated barrier within the chamber further comprises solidifying the flowable polymer solution within the chamber using photopatterning.

Embodiment 53: The method of any one of embodiments 1 to 52, wherein the micro-object is a bead or a cell.

Embodiment 54: The method of embodiment 53, wherein the micro-object is a bead that is conjugated with a nucleic acid encoding the analyte.

Embodiment 55: The method of embodiment 53, wherein the cell is an animal cell, a plant cell, or a bacterial cell.

Embodiment 56: The method of embodiment 53, wherein the cell is a fungus cell.

Embodiment 57: The method of embodiment 56, wherein the cell is a yeast cell.

Embodiment 58: The method of embodiment 57, wherein the yeast cell is a *Saccharomyces* cell (e.g. *Saccharomyces cerevisiae*) or a *Pichia* cell (e.g. *Pichia pastoris*).

Embodiment 59: The method of any one of embodiments 1 to 58, wherein the analyte is an amino acid, a polypeptide, a nucleotide, a nucleic acid, or a combination thereof Embodiment 60: A method for preparing a chamber of a microfluidic device to export a micro-object selectively from the chamber, the method comprising: disposing individual micro-objects of a plurality of micro-objects into respective chambers of plurality of chambers of a microfluidic device, the microfluidic device having a microfluidic circuit comprising a flow region and the plurality of chambers, wherein each chamber comprises an opening to the flow region; identifying a micro-object of interest disposed in its respective chamber of the plurality of chambers; forming an in situ-generated hydrogel barrier across the opening of every other chamber of the plurality of chambers, thereby preventing other micro-objects contained in the other chambers from exiting their respective other chambers; and exporting the micro-object of interest out of its respective chamber.

Embodiment 61: The method of embodiment 60, wherein exporting the micro-object of interest comprises selectively exporting only the micro-object of interest.

Embodiment 62: The method of embodiment 61, wherein selectively exporting only the micro-object of interest further comprises reducing clonality risk.

Embodiment 64: The method of any one of embodiments 60 to 62, further comprising assaying the individual micro-objects disposed in the respective chambers of the plurality of chambers, wherein the micro-object of interest is identified based upon a result of the assaying.

What is claimed:

1. A method for preparing a chamber of a microfluidic device to detect an analyte produced within the chamber, the microfluidic device having a microfluidic circuit comprising a flow region and the chamber, wherein the chamber comprises an opening to the flow region, the method comprising:
forming an in situ-generated barrier within the chamber, wherein the in situ-generated barrier defines a first area of the chamber proximal to the opening of the chamber to the flow region and a second area of the chamber that is separated from the first area by the in situ-generated barrier, wherein a portion of the in situ-generated barrier has a thickness that is smaller than a height of the chamber;
disposing a micro-object into the first area of the chamber;
allowing the micro-object to produce the analyte within the first area of the chamber, wherein at least some of the analyte passes through the in situ-generated barrier into the second area of the chamber, wherein the in situ-generated barrier prevents the micro-object from crossing through the situ-generated barrier into the second area;

defining an area of interest within the first area of the second area; and detecting a signal associated with the analyte within the area of interest.

2. The method of claim 1, wherein the in situ-generated barrier comprises one or more discrete sections, each of which is moveably connected to one or more surfaces of the chamber, wherein application of a threshold pressure to the one or more discrete sections of the in situ-generated barrier moves at least one of the one or more discrete sections with respect to the one or more surfaces of the chamber and thereby creates or expands an opening in the second area.

3. The method of claim 2, wherein the in situ-generated barrier comprises two or more discrete sections, wherein adjacent sections are separated from one another by a gap.

4. The method of claim 2, wherein the in situ-generated barrier consists of two discrete sections which are separated from one another by a gap.

5. The method of claim 1, wherein the in situ-generated barrier comprises a non-uniform thickness with respect to an axis of the chamber such that a portion of the in situ-generated barrier is less thick than other portions of the in situ-generated barrier.

6. The method of claim 5, wherein the less thick portion of the in situ-generated barrier has a thickness in a z-direction that is smaller than the height of the chamber.

7. The method of claim 1, wherein the in situ-generated barrier has a porosity prevents the micro-object from passing through the in situ-generated barrier.

8. The method of claim 1, wherein allowing the micro-object to produce the analyte comprises inducing the micro-object to produce the analyte.

9. The method of claim 8, wherein inducing the micro-object to produce the analyte comprises introducing a second fluidic medium oxygenated with at least about 10% of oxygen.

10. The method of claim 1, further comprising introducing a reporter molecule and allowing the reporter molecule to bind or react with the analyte.

11. The method of claim 10, wherein the reporter molecule comprises a first detectable label and detecting the signal comprises detecting a signal associated with the first detectable label.

12. The method of claim 10, wherein the in situ-generated barrier has a first permeability with respect to the analyte and a second permeability with respect to the reporter molecule, and wherein the first permeability is lower than the second permeability.

13. The method of claim 10, wherein allowing the reporter molecule to bind with the analyte comprises forming a reporter molecule: produced analyte (RMPA) complex, wherein the in situ-generated barrier has a porosity that impedes the RMPA complex from passing through the in situ-generated barrier.

14. The method of claim 10, wherein the reporter molecule further comprises a binding component configured to bind the analyte; wherein the binding component of the reporter molecule comprises an amino acid, a polypeptide, a nucleotide, a nucleic acid, or a combination thereof.

15. The method of claim 11, further comprising:

introducing a reference molecule into the flow region, wherein the reference molecule comprises a second detectable label different from the first detectable label, and further wherein the reference molecule does not bind the analyte;

allowing the reference molecule to diffuse into the chamber; and detecting a reference signal associated with the second detectable label.

16. The method of claim 1, further comprising exporting the micro-object from the chamber and, optionally, from the microfluidic device.

17. The method of claim 1, wherein the in situ-generated barrier comprises a solidified polymer network; wherein the solidified polymer network comprises a synthetic polymer, a modified synthetic polymer, or a biological polymer.

18. The method of claim 1, further comprising:

introducing a fluorescent dye into the chamber and allowing the fluorescent dye to diffuse within the area of interest; and detecting a fluorescence signal from the fluorescent dye in the area of interest.

19. The method of claim 18, wherein the fluorescent dye is pH sensitive, wherein the fluorescence signal is associated with a pH of a medium within the area of interest.

20. A method of using a microfluidic device, the microfluidic device having a microfluidic circuit comprising a flow region and a chamber, wherein the chamber comprises an opening to the flow region, the method comprising:

disposing micro-objects into the chamber;

forming an in situ-generated barrier within the chamber, wherein the in situ-generated barrier defines a first area of the chamber proximal to the opening of the chamber to the flow region and a second area of the chamber that is separated from the first area by the in situ-generated barrier, wherein the micro-objects are disposed within the first area of the chamber, and the second area of the chamber is micro-object-free;

allowing the micro-objects to produce an analyte within the first area of the chamber, wherein at least some of the analyte passes through the in situ-generated barrier into the second area of the chamber, wherein the in situ-generated barrier prevents the micro-objects from crossing through the situ-generated barrier into the second area of the chamber;

detecting a signal associated with the analyte within the second area of the chamber; and exporting the micro-objects out of the chamber.

21. A method for preparing a chamber of a microfluidic device to detect an analyte produced within the chamber, the microfluidic device having a microfluidic circuit comprising a flow region and the chamber, wherein the chamber comprises an opening to the flow region, the method comprising:

disposing a micro-object into the chamber of the microfluidic device;

forming an in situ-generated barrier within the chamber, wherein the in situ-generated barrier defines a first area of the chamber proximal to the opening of the chamber to the flow region and a second area of the chamber that is separated from the first area by the in situ-generated barrier, wherein the micro-object is disposed within the first area of the chamber, and the second area of the chamber is micro-object-free;

allowing the micro-object to produce the analyte within the first area of the chamber, wherein at least some of the analyte diffuses through the in situ-generated barrier into the second area of the chamber, wherein the in situ-generated barrier prevents the micro-object from crossing through the situ-generated barrier into the second area;

defining an area of interest within the first area or the second area; and detecting a signal associated with the analyte within the area of interest.

22. The method of claim 21, further comprising moving the micro-object into the first area of the chamber prior to forming the in situ-generated barrier.

\* \* \* \* \*